US012779928B2

(12) United States Patent
Carr et al.

(10) Patent No.: US 12,779,928 B2
(45) Date of Patent: Nov. 3, 2026

(54) ADJUSTABLE SHOCK ABSORBER SYSTEM AND DEVICE

(71) Applicant: Bernard J. Carr, Santa Barbara, CA (US)

(72) Inventors: Bernard J. Carr, Santa Barbara, CA (US); Kevin Birch, Santa Barbara, CA (US); Max O. Hanberg, Solvang, CA (US)

(73) Assignee: Bernard J. Carr, Solvang, CA (US)

( * ) Notice: Subject to any disclaimer, the term of this patent is extended or adjusted under 35 U.S.C. 154(b) by 368 days.

(21) Appl. No.: 18/391,118

(22) Filed: Dec. 20, 2023

(65) Prior Publication Data

US 2024/0116322 A1 Apr. 11, 2024

Related U.S. Application Data

(63) Continuation-in-part of application No. 17/745,237, filed on May 16, 2022, now Pat. No. 11,873,874, which is a continuation-in-part of application No. 17/564,992, filed on Dec. 29, 2021, now Pat. No. 11,878,562.

(60) Provisional application No. 63/458,004, filed on Apr. 7, 2023, provisional application No. 63/286,777, filed on Dec. 7, 2021, provisional application No. 63/272,099, filed on Oct. 26, 2021.

(51) Int. Cl.

| | |
|---|---|
| ***B60G 17/02*** | (2006.01) |
| ***B25B 13/52*** | (2006.01) |
| ***B60G 15/06*** | (2006.01) |

(52) U.S. Cl.
CPC ............ *B60G 17/021* (2013.01); *B25B 13/52* (2013.01); *B60G 15/063* (2013.01); *B60G 2202/312* (2013.01)

(58) Field of Classification Search
CPC ................ B60G 17/021; B60G 15/063; B60G 2202/312; B60G 2204/61; B60G 2500/20; B60G 2500/30; B60G 2500/22; B60G 2206/93; F16F 9/56; F16F 1/121; B25B 13/52; B25B 13/50; B25B 13/54
See application file for complete search history.

(56) References Cited

U.S. PATENT DOCUMENTS 740,878 A * 10/1903 Lewis ........................ B66F 3/08 74/156
1,496,707 A * 6/1924 Gaw ........................ B25B 13/52 81/3.43
1,504,847 A * 8/1924 Tarr ........................ B25B 13/02 81/111
1,528,691 A * 3/1925 Price ........................ B25B 13/52 81/68

(Continued)

*Primary Examiner* — Robert A. Siconolfi
*Assistant Examiner* — James K Hsiao
(74) *Attorney, Agent, or Firm* — Olav M. Underdal; IDP Patent Services

(57) ABSTRACT

An adjustable shock absorber system includes: a coil over shock absorber with a spring and an adjustment ring; an adjustment ring assembly, which detachably connects with the adjustment ring; and a shock adjuster tool with a lever arm and a tool grip portion, including a band assembly; such that the tool grip portion detachably connects to a peripheral mounting surface of the adjustment ring assembly; whereby the shock adjuster tool can be used to adjust a preload of the coil-over shock absorber.

15 Claims, 41 Drawing Sheets

(56) References Cited

U.S. PATENT DOCUMENTS

| | | | | |
|---|---|---|---|---|
| 1,610,387 | A * | 12/1926 | Pennington | B25B 7/02 81/340 |
| 2,094,238 | A * | 9/1937 | Koenig | B60L 15/12 81/65 |
| 2,337,538 | A * | 12/1943 | Arnold | B25B 13/488 81/176.3 |
| 2,465,695 | A * | 3/1949 | Osborne | B25B 13/52 81/61 |
| 2,574,424 | A * | 11/1951 | Szetela | B25B 13/46 81/176.15 |
| 2,810,313 | A * | 10/1957 | Hermanson | B25B 13/46 81/DIG. 8 |
| 3,641,848 | A * | 2/1972 | Franks | B25B 13/08 411/408 |
| 4,474,363 | A * | 10/1984 | Numazawa | B60G 15/063 280/124.147 |
| 4,916,993 | A * | 4/1990 | Siekawitch | B25B 13/52 81/3.43 |
| 5,044,614 | A * | 9/1991 | Rau | B60G 17/021 267/221 |
| 5,320,021 | A * | 6/1994 | Heintz | B25B 13/52 81/3.43 |
| 5,388,485 | A * | 2/1995 | Auble | B25B 27/0042 81/3.43 |
| 5,507,210 | A * | 4/1996 | Paramest | B25B 13/52 81/170 |
| 6,328,295 | B1 * | 12/2001 | Hanks | B25B 13/52 81/3.43 |
| 6,789,450 | B1 * | 9/2004 | Helfet | B25B 13/52 81/3.43 |
| 10,625,402 | B2 * | 4/2020 | Jensen | B25B 13/463 |
| 11,548,342 | B2 * | 1/2023 | Nilsson Gatenholm | B60G 15/062 |
| 2003/0126959 | A1 * | 7/2003 | Khubani | B25B 13/52 81/64 |
| 2003/0177874 | A1 * | 9/2003 | Sipos | B25B 13/52 81/64 |
| 2004/0211298 | A1 * | 10/2004 | Williams, Sr. | B25B 13/46 81/58 |
| 2006/0137492 | A1 * | 6/2006 | Melos | B25B 13/463 81/62 |
| 2010/0122608 | A1 * | 5/2010 | Chen | B25B 13/463 81/60 |
| 2010/0192731 | A1 * | 8/2010 | Idir | B67B 7/186 81/64 |
| 2011/0126677 | A1 * | 6/2011 | Buchanan | B25B 13/48 81/124.2 |
| 2013/0042724 | A1 * | 2/2013 | Hulings | B25B 13/00 81/64 |
| 2014/0260817 | A1 * | 9/2014 | Wilson | B25B 13/5091 81/60 |
| 2016/0046006 | A1 * | 2/2016 | Yang | B25B 13/28 81/176.1 |
| 2016/0097246 | A1 * | 4/2016 | Youngquist, Jr. | E21B 19/164 81/57.33 |
| 2016/0235200 | A1 * | 8/2016 | De Bruin | D06F 39/125 |
| 2017/0151851 | A1 * | 6/2017 | Alpers | B60G 17/021 |
| 2017/0350468 | A1 * | 12/2017 | Groebner | B62K 25/06 |
| 2019/0084132 | A1 * | 3/2019 | Dinihanian, Jr. | B25F 1/04 |
| 2019/0248440 | A1 * | 8/2019 | Winefordner | F16F 1/126 |
| 2021/0114189 | A1 * | 4/2021 | Miller | B25G 3/38 |
| 2023/0127131 | A1 * | 4/2023 | Carr | B60G 17/021 267/286 |

* cited by examiner

ADJUSTABLE SHOCK ABSORBER SYSTEM AND DEVICE

CROSS-REFERENCE TO RELATED APPLICATIONS

This U.S. Non-Provisional Application claims the benefit of U.S. Provisional Application No. 63/458,004, filed Apr. 7, 2023 and is a Continuation-In-Part of U.S. Non-Provisional application Ser. No. 17/745,237, filed May 16, 2022, which is a Continuation-In-Part of U.S. Non-Provisional application Ser. No. 17/564,992, filed Dec. 29, 2021; which claims the benefit of U.S. Provisional Application No. 63/286,777, filed Dec. 7, 2021; and claims the benefit of U.S. Provisional Application No. 63/272,099, filed Oct. 26, 2021.

FIELD OF THE INVENTION

The present invention relates generally to the field of shock absorber systems, and more particularly to methods and systems for adjustable shock absorbers.

BACKGROUND OF THE INVENTION

On a coil-over shock absorber, the coil spring preload can be adjusted. Given typical large static spring rate of a coil spring, to adjust coil spring preload, the coil-over shock's adjustment ring cannot be raised or lowered on the shock body using bare hands. Current methods used to rotate the adjustment ring on its threads include a spanner wrench, pin punch, drift with hammer, chisel with hammer, or even slip-joint pliers.

Current methods used to adjust coil spring preload are crude and inefficient. Automotive service centers typically employ several methods of adjusting coil spring preload, while the spring is attached to a coil over shock absorber and the shock absorber is installed on a chassis or structure. Such common approaches include:

a) a spanner wrench placed tangentially to the adjuster nut tab, followed by the application of a force on the spanner wrench causing turning torque;
b) attachment of a punch, drift, or chisel placed laterally to the adjuster nut surface, followed by a hammer strike on the drift to create a turning force input causing turning torque;
c) using an open jaw slip-joint plier placed around the adjuster nut to grab the adjuster nut tabs, followed by the application of a force on the slip-joint plier causing turning torque; or
d) attachment of a pin punch, placed laterally in to an aperture on the adjuster nut surface, followed by a hand force applied tangentially on the pin punch to create a turning force input causing turning torque.

As such, considering the foregoing, it may be appreciated that there continues to be a need for novel and improved devices and methods for adjustable shock absorbers.

SUMMARY OF THE INVENTION

The foregoing needs are met, to a great extent, by the present invention, wherein in aspects of this invention, enhancements are provided to the existing model of adjustable shock absorbers.

In an Aspect, an Adjustable Shock Absorber System can Include:

a) a coil-over shock absorber, which can include:
  i. a spring;

ii. an adjustment ring, which can adjust a preload of the spring; and
  iii. a lock ring, which can lock the adjustment ring in position;
b) an adjustment ring assembly, which can detachably connect or interlock with the adjustment ring of the coil-over shock absorber, such that a rotation of the adjustment ring assembly causes a rotation of the adjustment ring, wherein the adjustment ring assembly can include:
  i. A first adjustment ring member, which comprises a first peripheral surface; and
  ii. A second adjustment ring member, which comprises a second peripheral surface;
  wherein the left adjustment ring member and the right adjustment ring member can be mounted around the adjustment ring of the coil-over shock absorber, such that the left adjustment ring member and the right adjustment ring member are detachably connected or interlocked;
  such that the adjustment ring assembly can connect or interlock with the adjustment ring, such that a rotation of the adjustment ring assembly causes a rotation of the adjustment ring; and
c) a shock adjuster tool, which can include:
  i. a lever arm;
  ii. a tool grip portion, which is connected to an inner end of the lever arm,
wherein the tool grip portion is configured to detachably connect to the adjustment ring assembly.

In Another Aspect, an Adjustable Shock Absorber System can Include:

a) a coil-over shock absorber, which can include:
  i. a spring; and
  ii. a lockable adjustment ring, which is configured to rotatably adjust a preload of the spring of the coil-over shock absorber, wherein the lockable adjustment ring can include:
    1) a peripheral mounting surface; and
b) a shock adjuster tool, which can include:
  i. a lever arm; and
  ii. a tool grip portion, which is connected to an inner end of the lever arm;
wherein the tool grip portion is configured to detachably connect to the peripheral mounting surface of the lockable adjustment ring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 18 is a top perspective view of an adjustable shock absorber system, with a dual-part mounting ring attached, and a shock adjuster tool removed from the dual-part mounting ring, according to an embodiment of the invention.

DETAILED DESCRIPTION

Figure 1A:
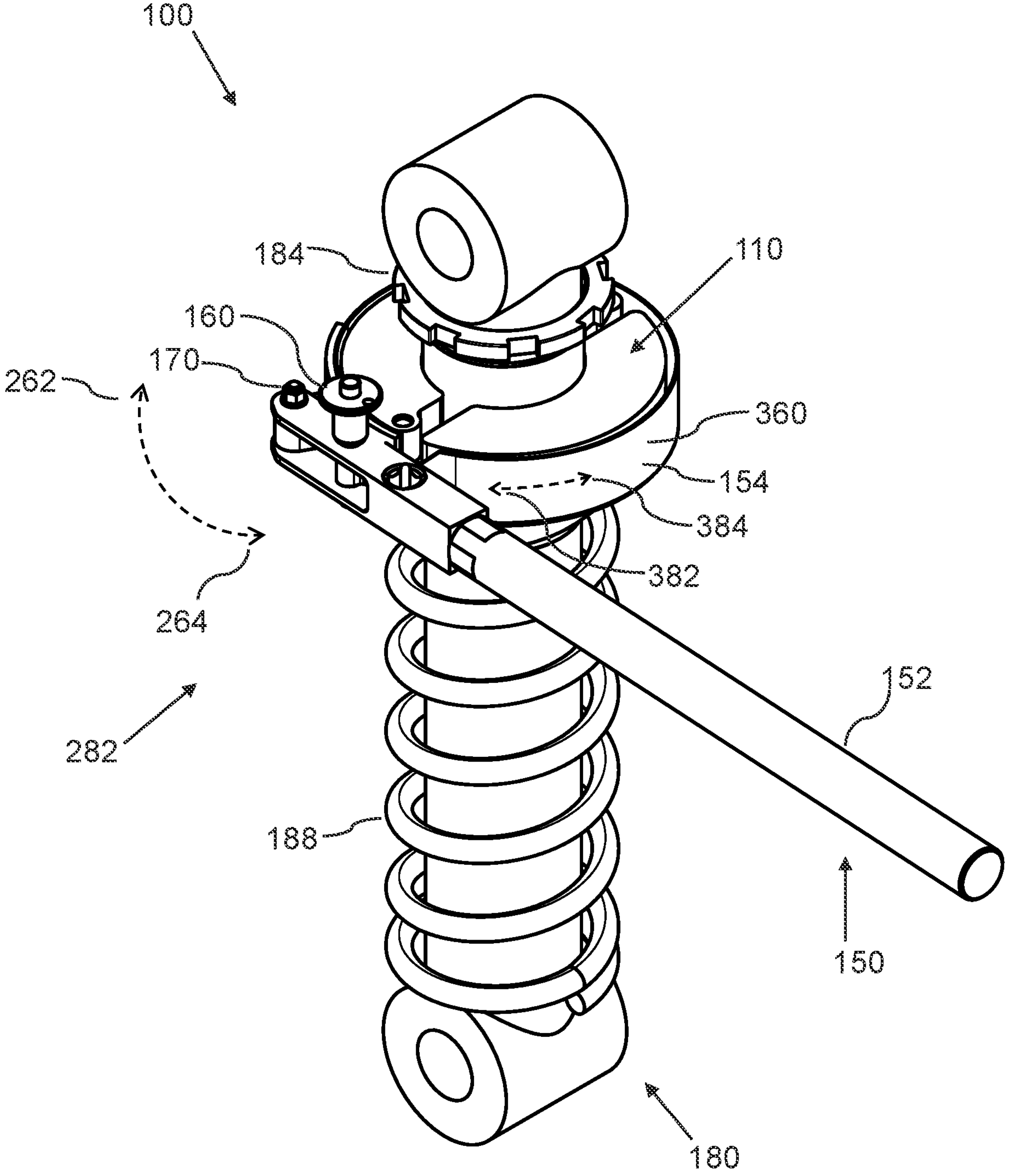
FIG. 1A is a top perspective view of an adjustable shock absorber system, with a dual-part mounting ring attached, and a shock adjuster tool mounted, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of an adjustable shock absorber system 100 with reference to FIG. 1A, in such manner that like reference numerals refer to like components throughout; a convention that we shall employ for the remainder of this specification.

Figure 1B:
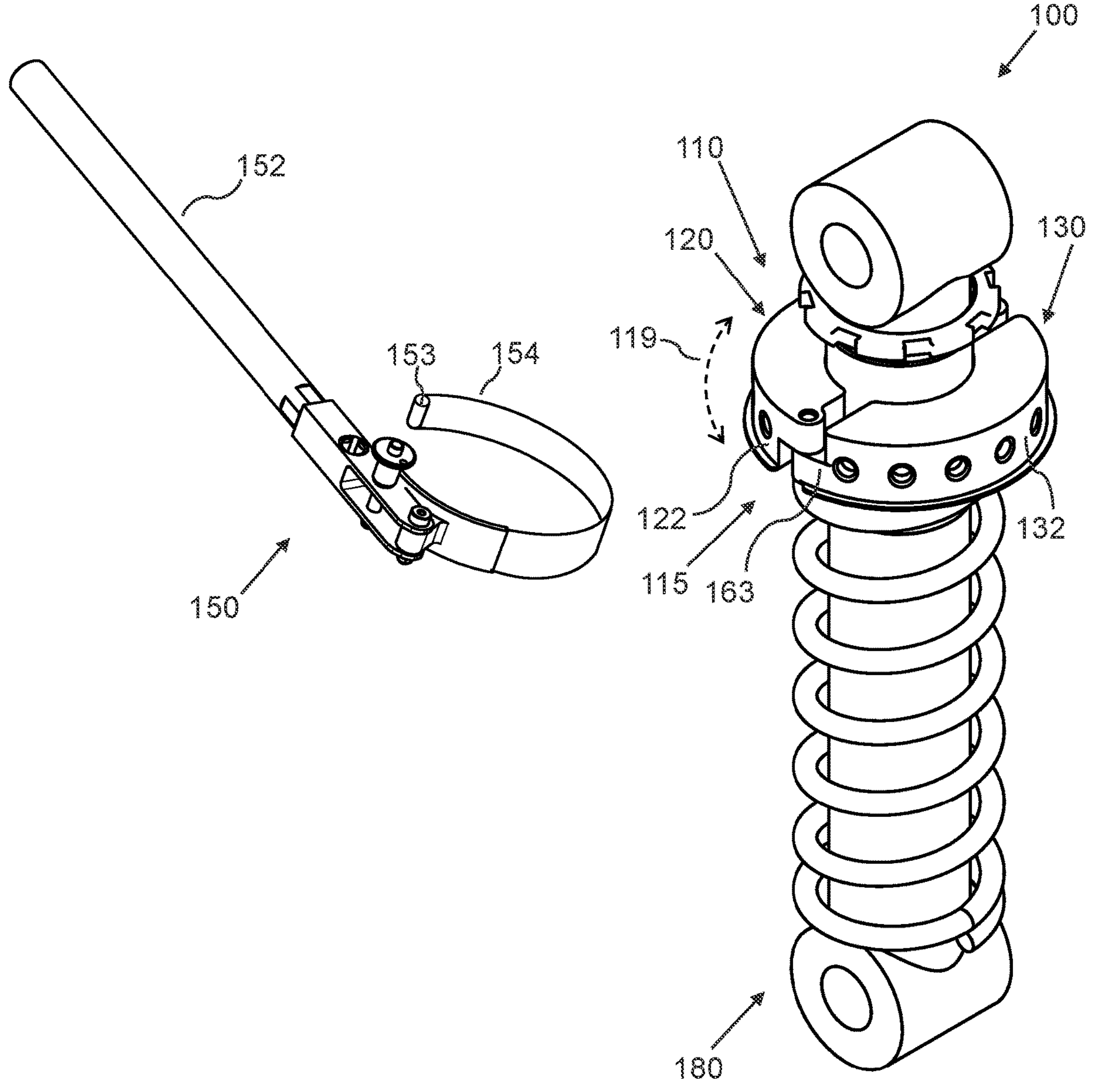
FIG. 1C is a top perspective view of an adjustable shock absorber system, with a dual-part mounting ring attached, and a shock adjuster tool mounted, such that a detachable pin is removed, according to an embodiment of the invention.
Figure 3A:
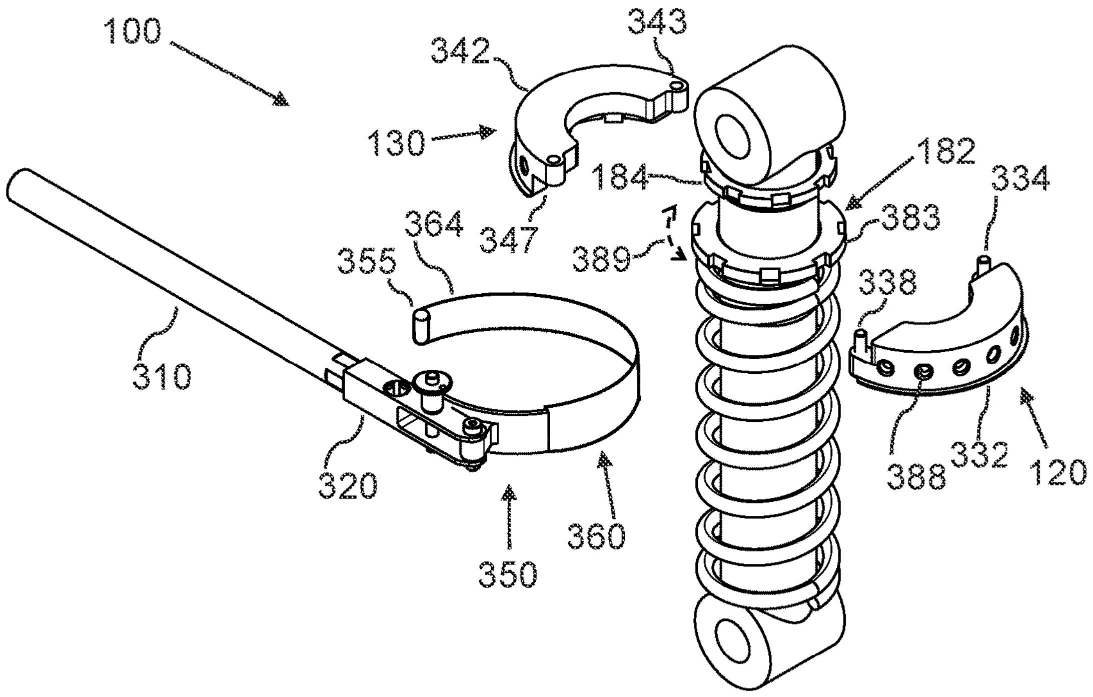
FIG. 3A is an exploded top perspective view of an adjustable shock absorber system, according to the embodiment shown in FIG. 1A.

In an embodiment, as shown in FIGS. 1A-1C, 2A-2E, 3A-3B, 4A-4E, 5A-5E, and 6A-6B, an adjustable shock absorber system 100 can include:

a) a coil-over shock absorber 180, which can include:
  i. a spring 188;
  ii. an adjustment ring 182, which is configured to rotatably adjust a preload of the spring 188 of the coil-over shock absorber 180; and
  iii. a lock ring 184, which is configured to lock the adjustment ring 182 in position;

b) an adjustment ring assembly 110, wherein the adjustment ring assembly 110 further comprises a peripheral mounting surface 115, wherein the adjustment ring assembly 110 is configured to detachably connect (including detachably interlock) with the adjustment ring 182 of the coil-over shock absorber 180, such that a rotation 119 of the adjustment ring assembly 110 causes a rotation 389 of the adjustment ring 182, as shown FIGS. 1B and 3A, such that the rotation 389 of the adjustment ring 182 adjusts the preload of the spring 188, wherein the adjustment ring assembly 110 can include:
  i. a right/first adjustment ring member 120, which comprises a first peripheral surface 122; and
  ii. a left/second adjustment ring member 130, which comprises a second peripheral surface 132;

wherein the right adjustment ring member 120 and the left adjustment ring member 130 are configured to be mounted around the adjustment ring of the coil-over shock absorber, such that the right adjustment ring member 120 and the left adjustment ring member 130 are detachably connected (including detachably interlocked);

such that the first peripheral surface 122 and the second peripheral surface 132, form a peripheral mounting surface 115, which substantially encircles the adjustment ring assembly 110 (with gaps and holes), when the first peripheral surface 122 and the second peripheral surface 132 are mounted on the adjustment ring assembly 110;

such that the adjustment ring assembly 110 connects (including detachably interlocks) with the adjustment ring 182 of the coil-over shock absorber 180, such that a rotation 119 of the adjustment ring assembly 110 causes a rotation 389 of the adjustment ring 182, as shown FIGS. 18 and 3A; and c) a shock adjuster tool 150, which can include:

i. a lever arm 152;

ii. a tool grip portion 154, which is connected to an inner end of the lever arm 152, wherein the tool grip portion 154 is configured to detachably connect to the adjustment ring assembly 110 (i.e., the adjustment ring assembly 110 is configured to accept a detachable connection of the tool grip portion 154 of the shock adjuster tool 150);

such that a first clockwise rotation 262 of the shock adjuster tool 150, when the tool grip portion 154 is connected to the adjustment ring assembly 110 in a first orientation 282 wherein an inner end of the lever arm 152 of the shock adjuster tool 150 is pointing in a clockwise direction 262, causes a frictional grip between the tool grip portion 154 and the adjustment ring assembly 110 to tighten, such that the first clockwise rotation 262 of the shock adjuster tool 150 causes the adjustment ring 182 of the coil-over shock absorber 180 to tighten, thereby increasing a preload of the spring 188 of the coil-over shock absorber 180;

such that a first anti-clockwise rotation 264 of the shock adjuster tool 150, when the tool grip portion 154 is connected to the adjustment ring assembly 110 in the first orientation 282, causes the frictional grip between the tool grip portion 154 and the adjustment ring assembly 110 to loosen, such that the first anti-clockwise rotation 264 of the shock adjuster tool 150 causes a repositioning of the shock adjuster tool 150, to allow space for a repeated clockwise rotation 262 of the shock adjuster tool 150, to allow for further tightening of the adjustment ring 182;

such that a second anti-clockwise rotation 274 of the shock adjuster tool 150, when the tool grip portion 154 is connected to the adjustment ring assembly 110 in a second orientation 284 wherein an inner end of the lever arm 152 of the shock adjuster tool 150 is pointing in an anti-clockwise direction 274, causes a frictional grip between the tool grip portion 154 and the adjustment ring assembly 110 to tighten, such that the anti-clockwise rotation of the shock adjuster tool 150 causes the adjustment ring 182 of the coil-over shock absorber 180 to loosen, thereby decreasing a preload of the spring 188 of the coil-over shock absorber 180;

such that a second clockwise rotation 272 of the shock adjuster tool 150, when the tool grip portion 154 is connected to the adjustment ring assembly 110 in the second orientation 284, causes the frictional grip between the tool grip portion 154 and the adjustment ring assembly 110 to loosen, such that the clockwise rotation of the shock adjuster tool 150 causes a repositioning of the shock adjuster tool 150, to allow space for a repeated anti-clockwise rotation of the shock adjuster tool 150, to allow for further loosening of the adjustment ring 182.

In a Related Embodiment, the Tool Grip Portion 154 can Further Include:

a) a band assembly 350, which can include:

i. an elongated band 360, which is configured to detachably wrap around the adjustment ring assembly, wherein the elongated band 360 further comprises:

1. a vertical band aperture 153 in an outermost portion 355 of a second end 364 of the elongated band 360.

In a further related embodiment, the elongated band 360 can be made of a metal or metal alloy.

Figure 3B:
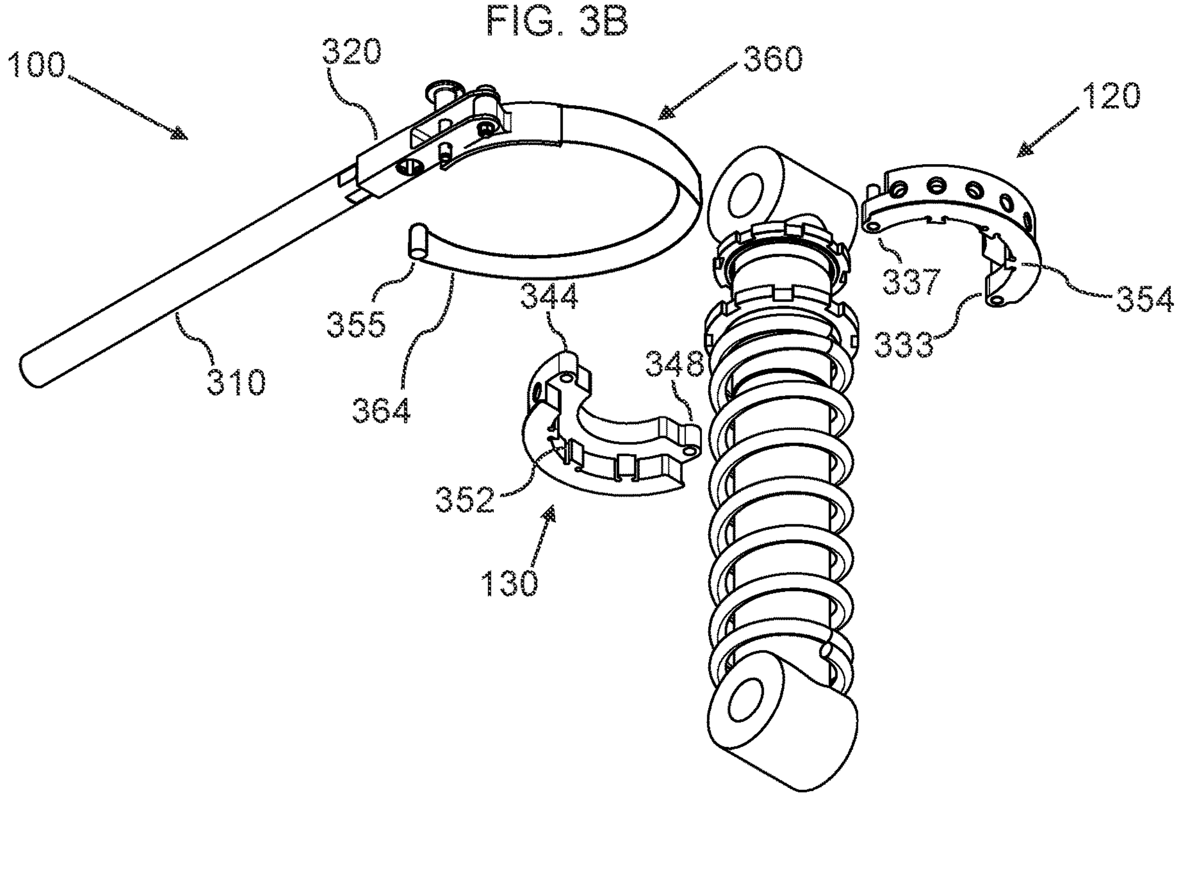
FIG. 3B is an exploded bottom perspective view of an adjustable shock absorber system, according to the embodiment shown in FIG. 1A.
Figure 4A:
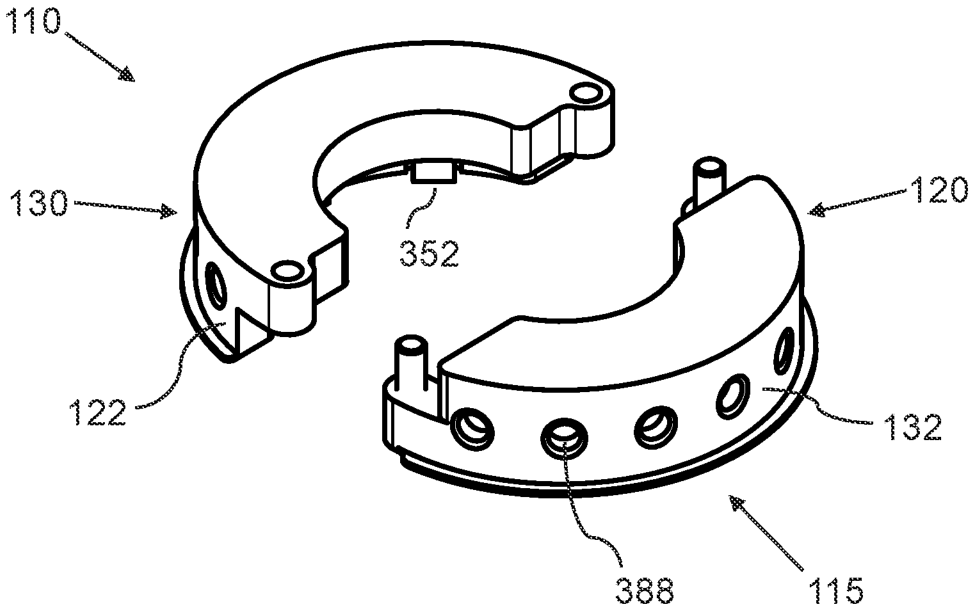
FIG. 4A is a top perspective view of a disassembled adjustment ring assembly, according to an embodiment of the invention.
Figure 4B:
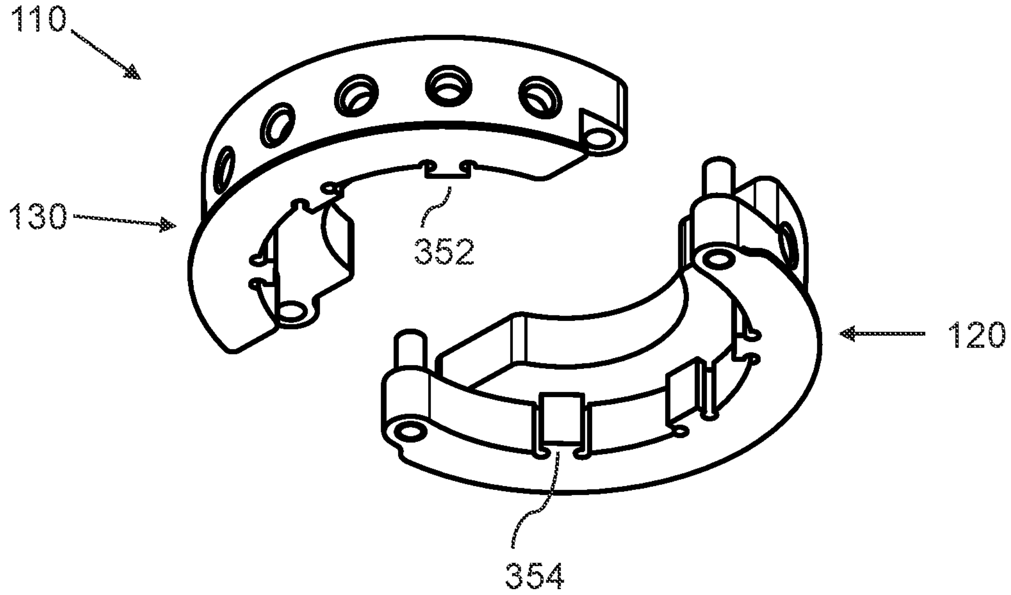
FIG. 4B is a bottom perspective view of a disassembled adjustment ring assembly, according to an embodiment of the invention.
Figure 4C:
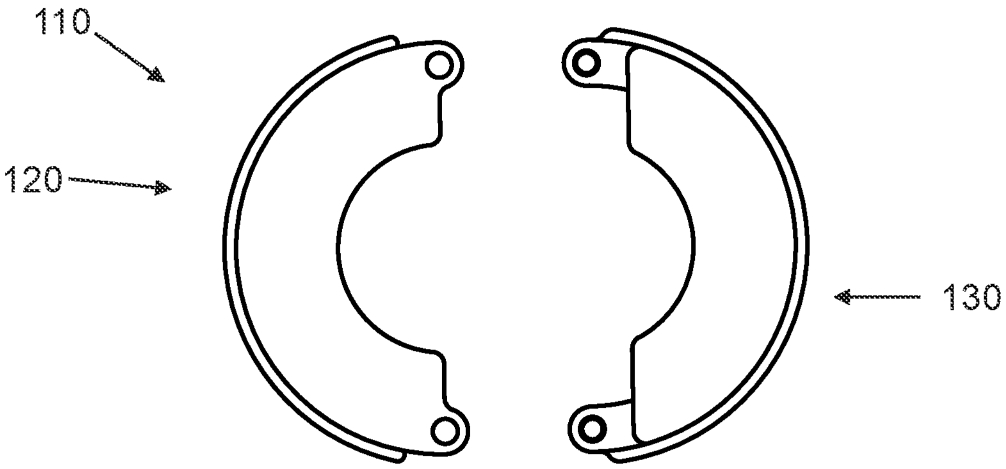
FIG. 4C is a top view of a disassembled adjustment ring assembly, according to an embodiment of the invention.
Figure 4D:
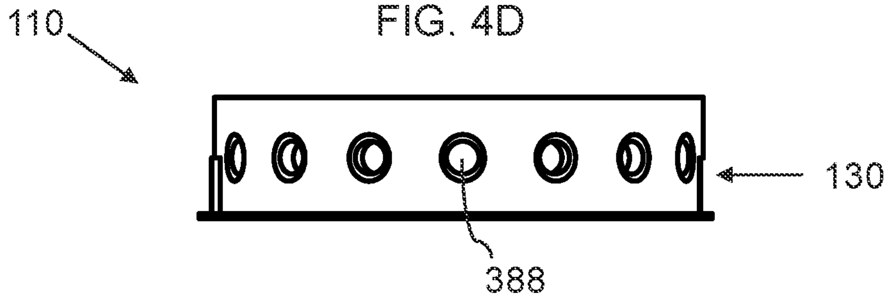
FIG. 4D is a side view of a disassembled adjustment ring assembly, according to an embodiment of the invention.
Figure 4E:
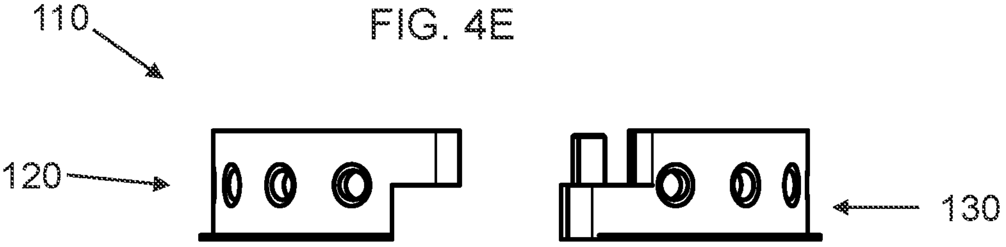
FIG. 4E is a front view of a disassembled adjustment ring assembly, according to an embodiment of the invention.
Figure 6A:
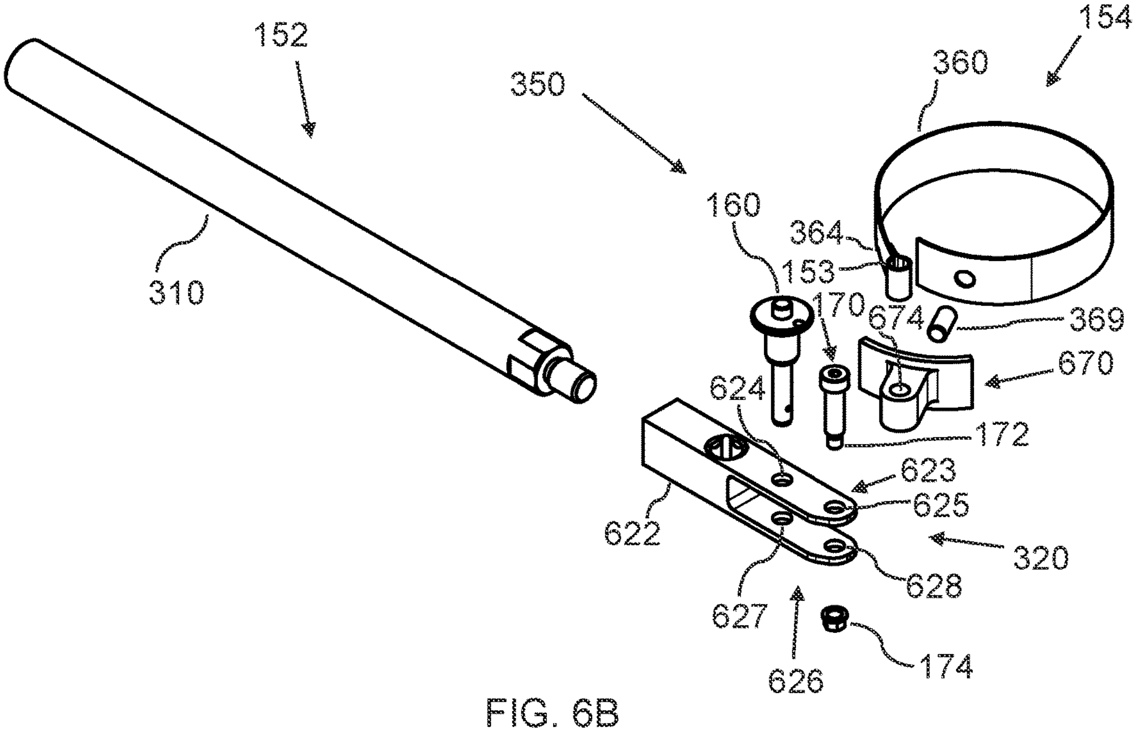
FIG. 6A is a top exploded perspective view of a shock adjuster tool, according to an embodiment of the invention.
Figure 6B:
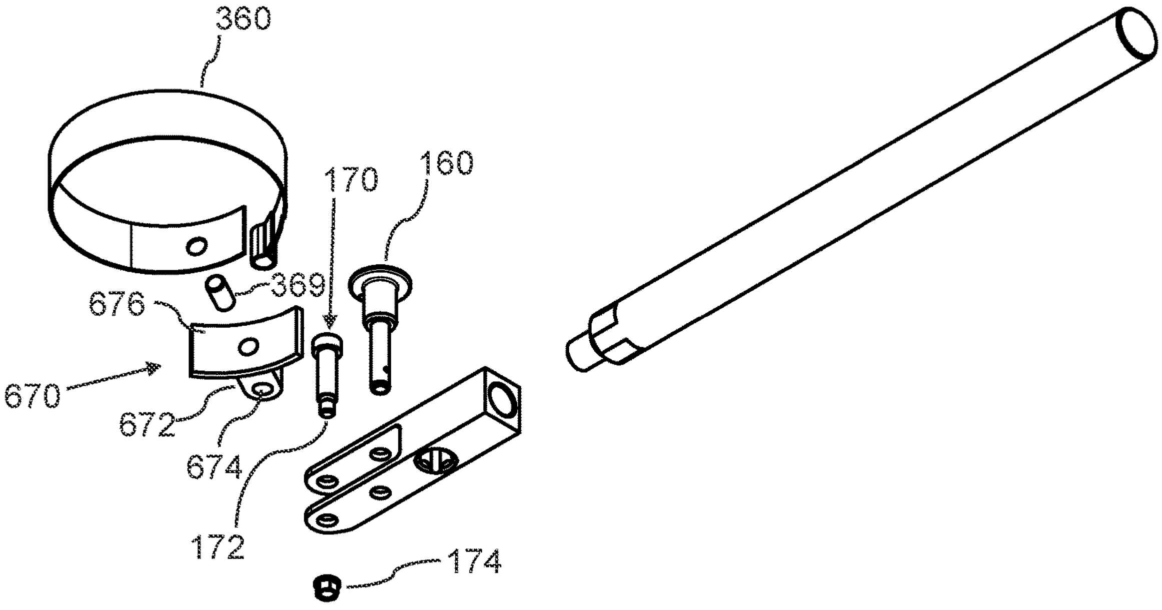
FIG. 6B is a bottom exploded perspective view of a shock adjuster tool, according to an embodiment of the invention.

In a related embodiment, as shown in FIGS. 6A and 6B, the lever arm 152 can further include:

a) a lever shaft 310; and b) a connector member 320, such that an outer end of the connector member 320 is connected to the lever shaft 310, and such that an inner end of the connector member 320 is connected to the tool grip portion 154; wherein the connector member 320 can include:

i. a connector body 622, such that an outer end of the connector body 622 is connected to the lever shaft 310;

ii. an upper flange 623, which protrudes from an inner top end of the connector body 622, wherein the upper flange 623, includes:

1. a rear upper flange aperture 624;

2. a front upper flange aperture 625; and iii. a lower flange 626, which protrudes from an inner bottom end of the connector body 622, below the upper flange 623, wherein the lower flange 626, includes:

1. a rear lower flange aperture 627;

2. a front lower flange aperture 628;

wherein the tool grip portion further comprises a detachable pin 160;

such that the outermost portion 355 of the second end 364 of the elongated band 360, as shown in FIGS. 3A and 3B, is positioned between the upper flange 623 and the lower flange 626, such that the rear upper flange aperture 624, the vertical band aperture 153, and the rear lower flange aperture 627 are aligned;

such that the detachable pin 160 is insertable and can protrude through (i.e., protrudes through) the rear upper flange aperture 624, the vertical band aperture 153, and the rear lower flange aperture 627, to detachably and pivotably connect the second end 364 of the elongated band 360 to the connector member 320.

Figure 1C:
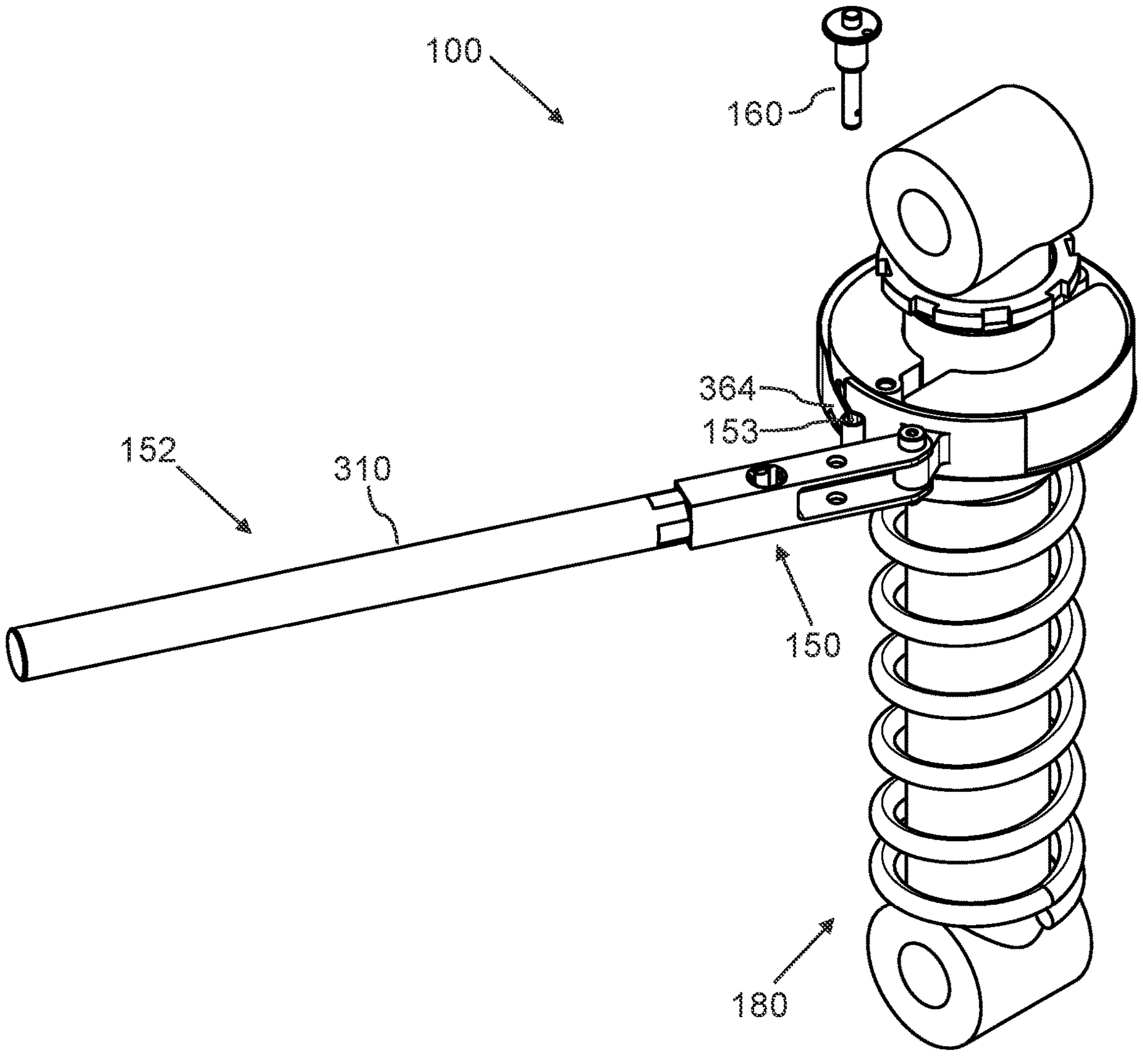
Figure 2A:
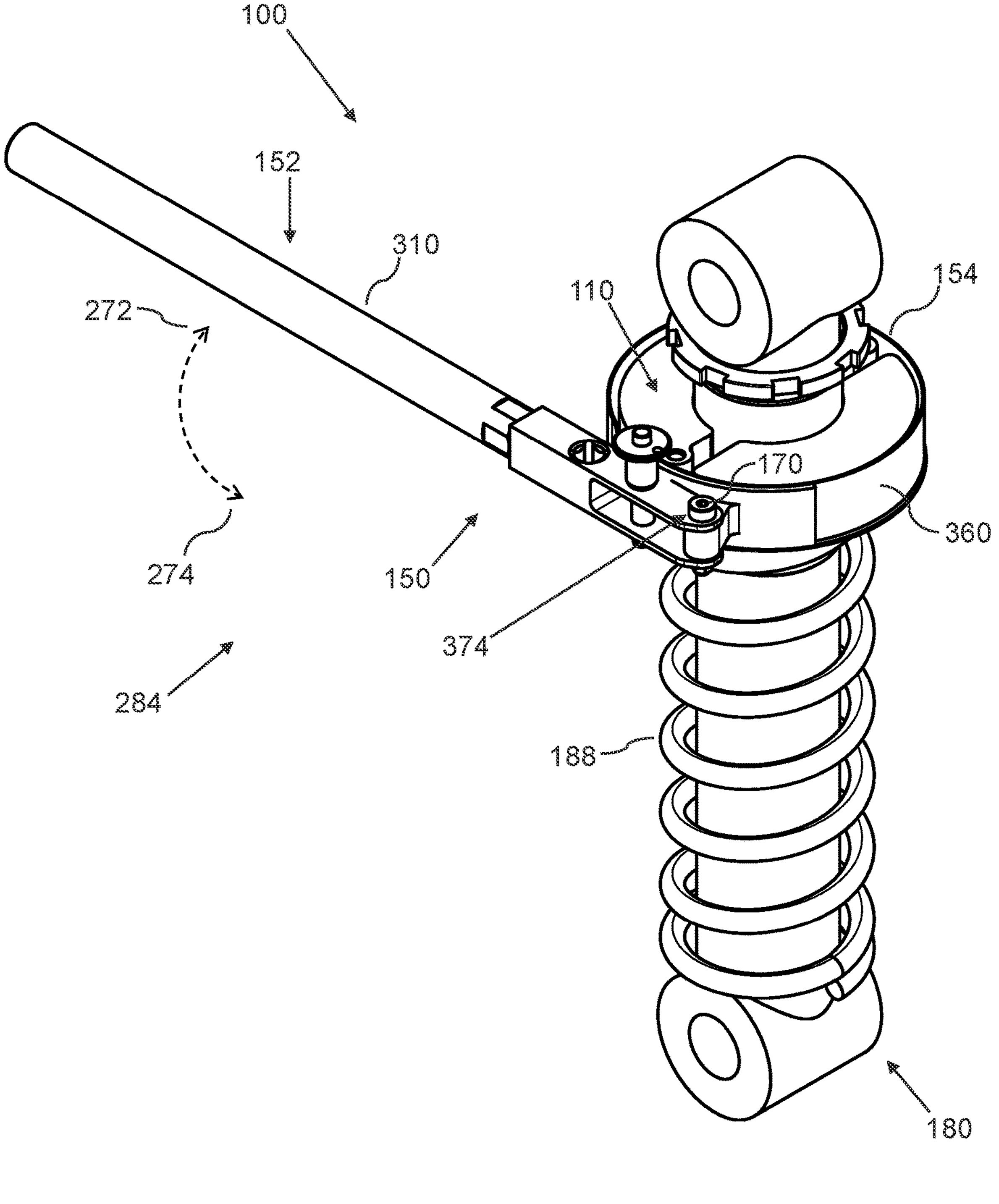
FIG. 2A is a top perspective view of an adjustable shock absorber system, according to the embodiment shown in FIG. 1A.
Figure 2B:
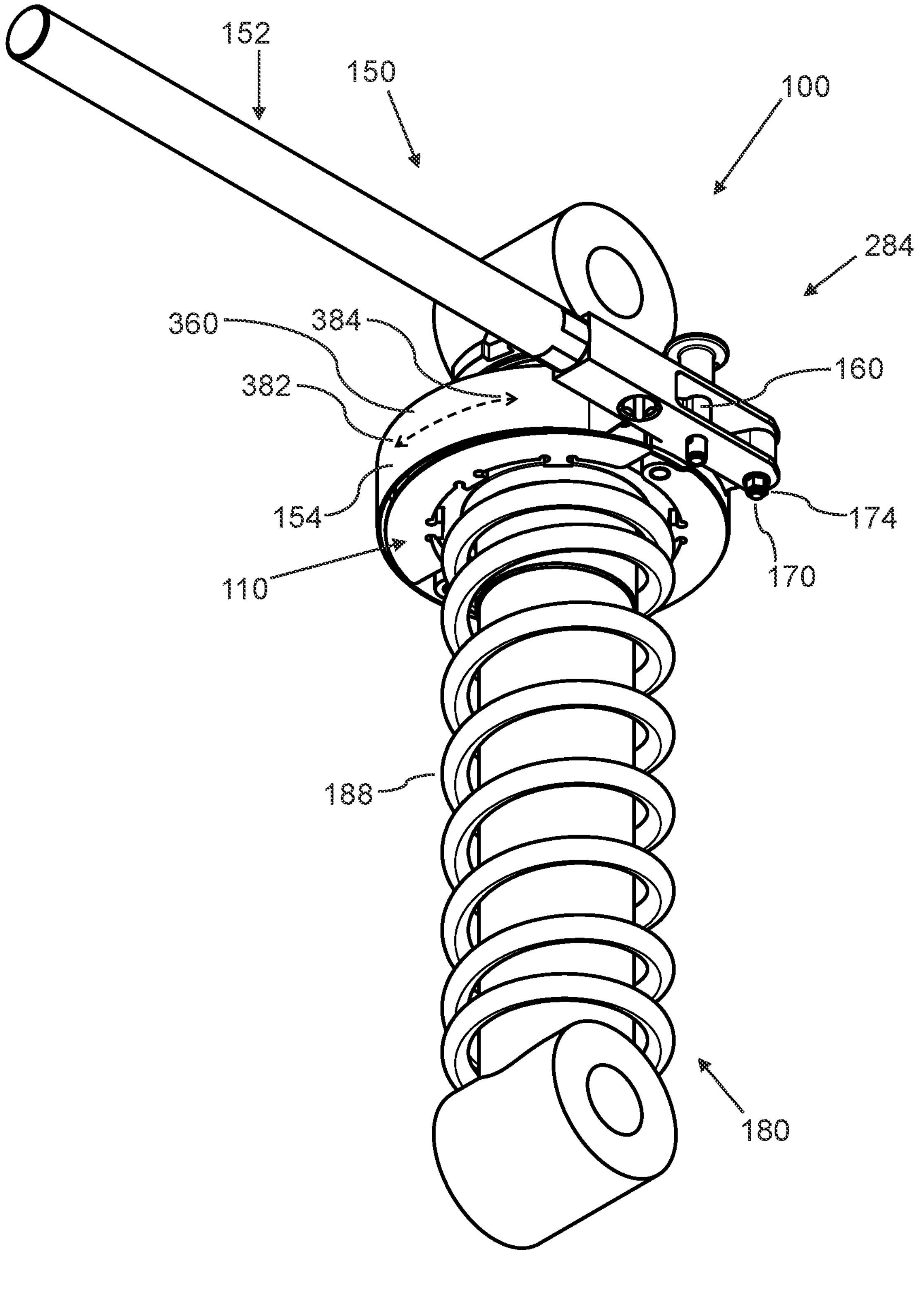
FIG. 2B is a bottom perspective view of an adjustable shock absorber system, according to the embodiment shown in FIG. 1A.
Figure 2C:
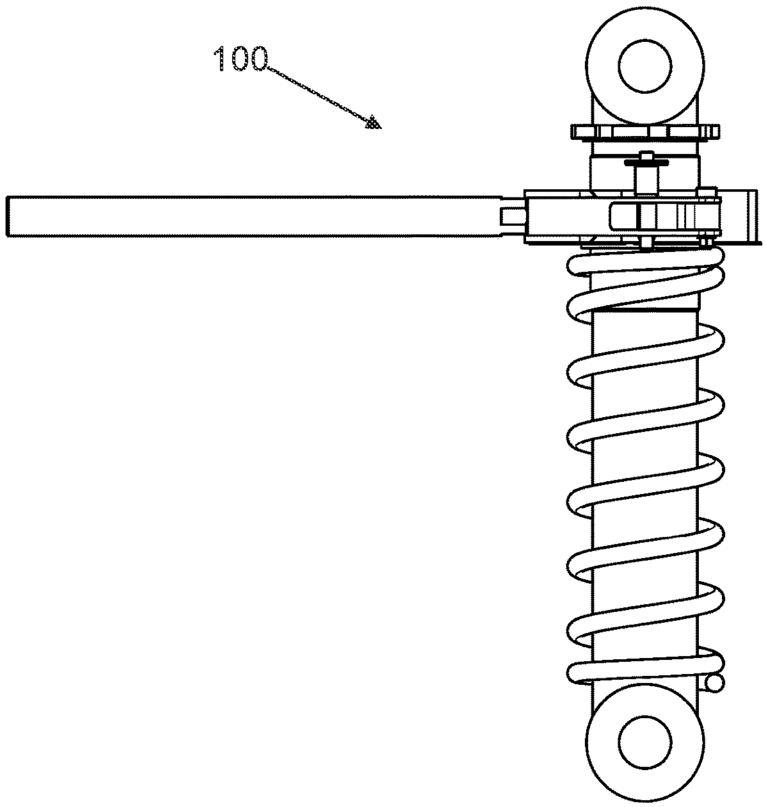
FIG. 2C is a front view of an adjustable shock absorber system, according to the embodiment shown in FIG. 1A.
Figure 2D:
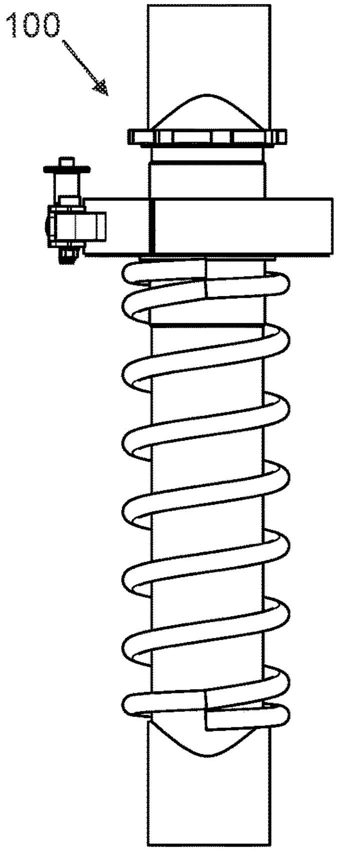
FIG. 2D is a side view of an adjustable shock absorber system, according to the embodiment shown in FIG. 1A.
Figure 2E:
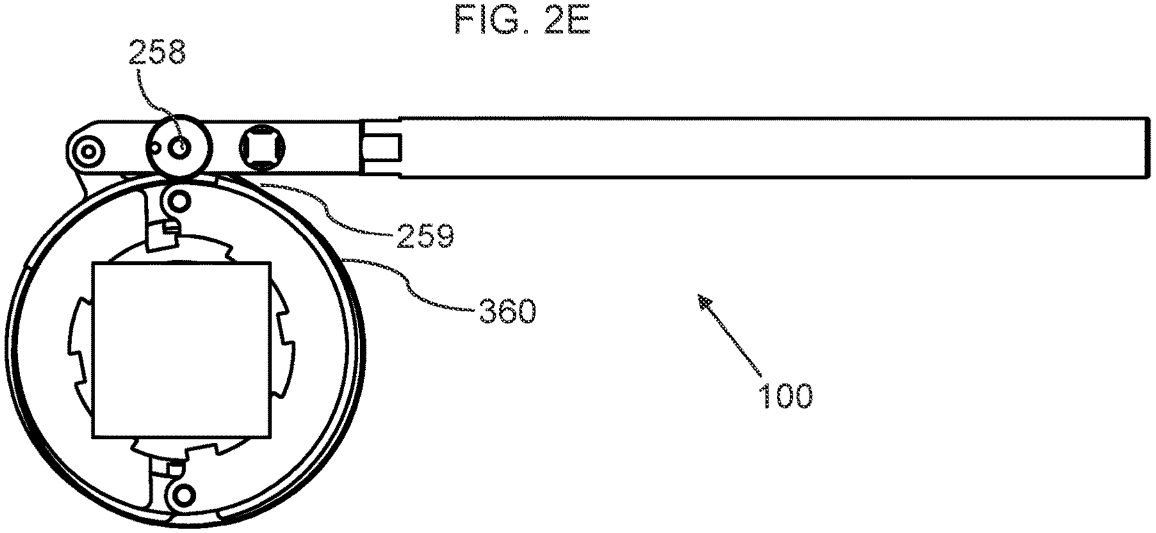
FIG. 2E is a top view of an adjustable shock absorber system, according to the embodiment shown in FIG. 1A.
Figure 5A:
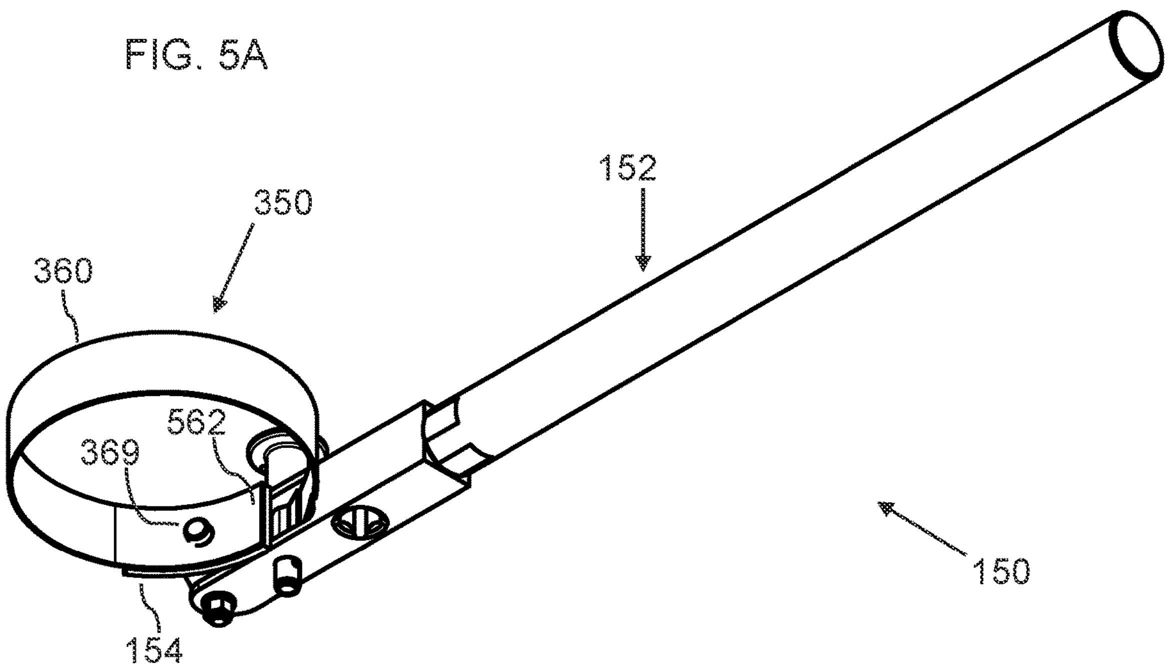
FIG. 5A is a bottom perspective view of a shock adjuster tool, according to an embodiment of the invention.
Figure 5B:
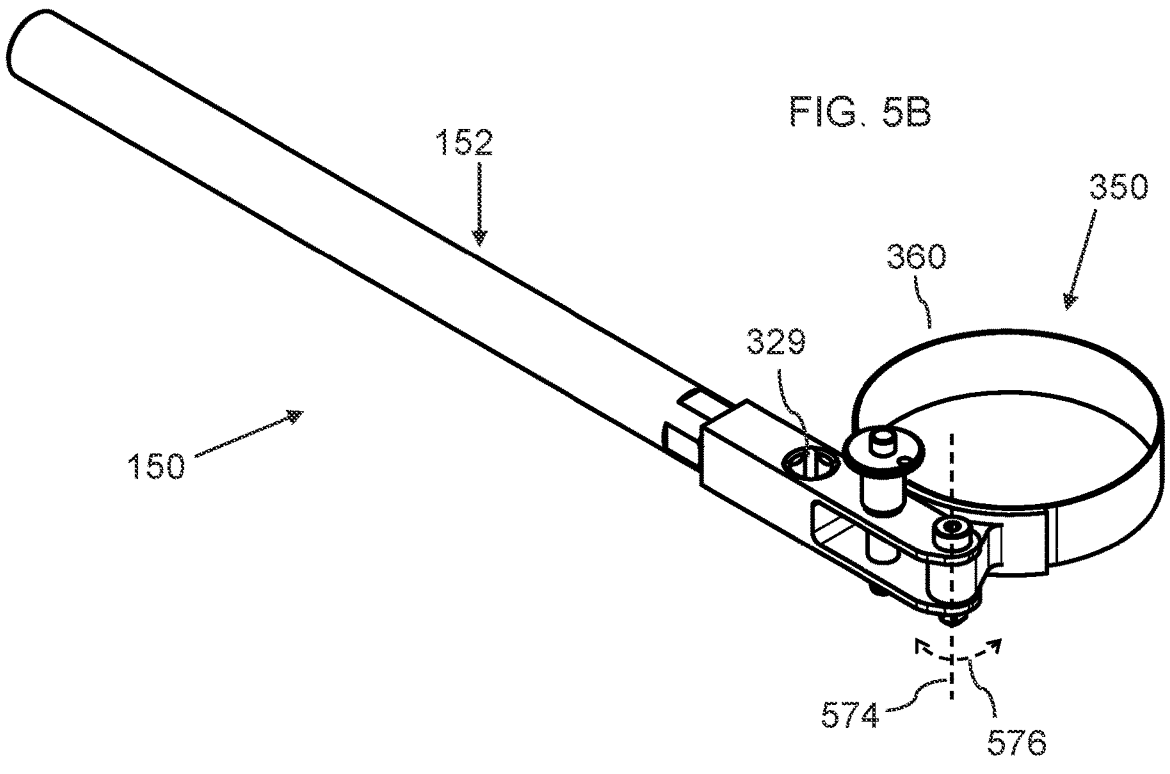
FIG. 5B is a top perspective view of a shock adjuster tool, according to an embodiment of the invention.
Figure 5C:
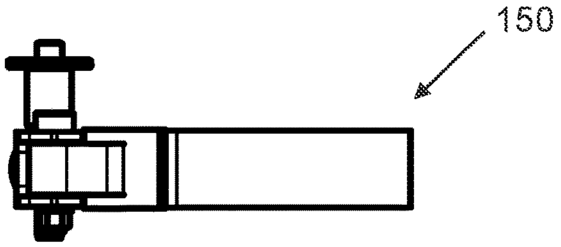
FIG. 5C is a front view of a shock adjuster tool, according to an embodiment of the invention.
Figure 5D:
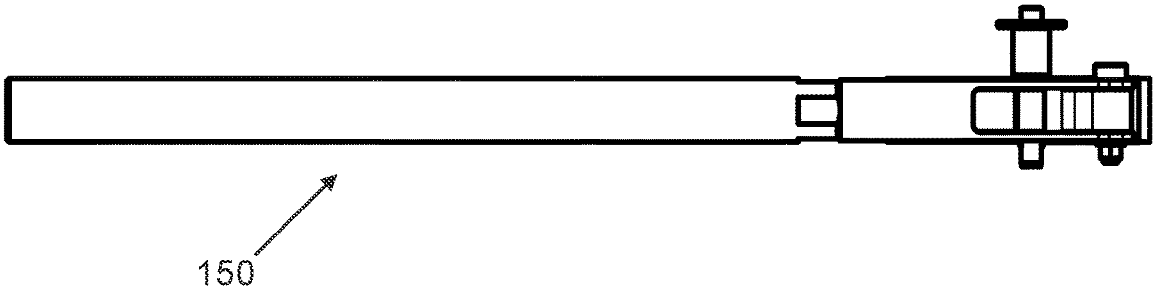
FIG. 5D is a side view of a shock adjuster tool, according to an embodiment of the invention.
Figure 5E:
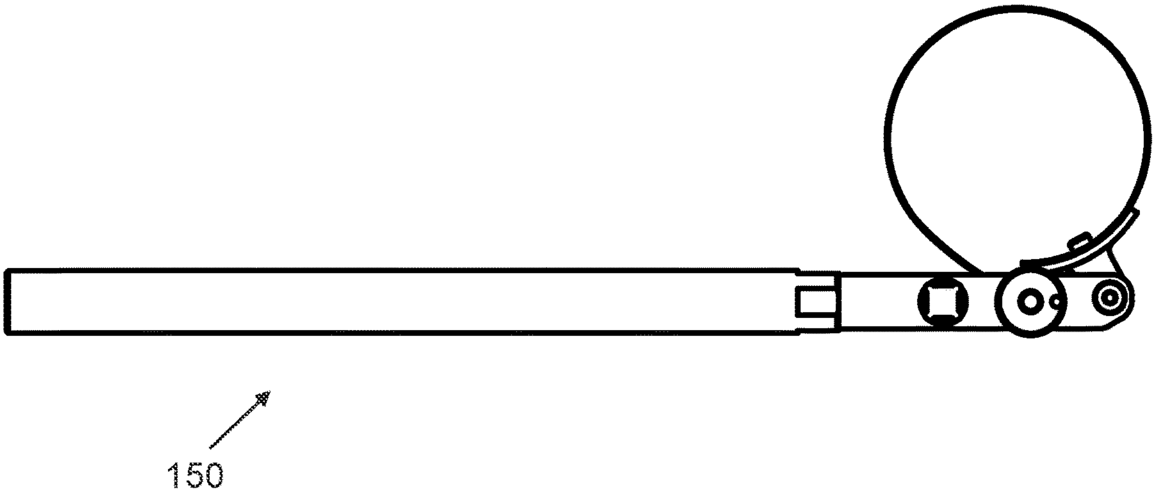
FIG. 5E is a top view of a shock adjuster tool, according to an embodiment of the invention.
Figure 7A:
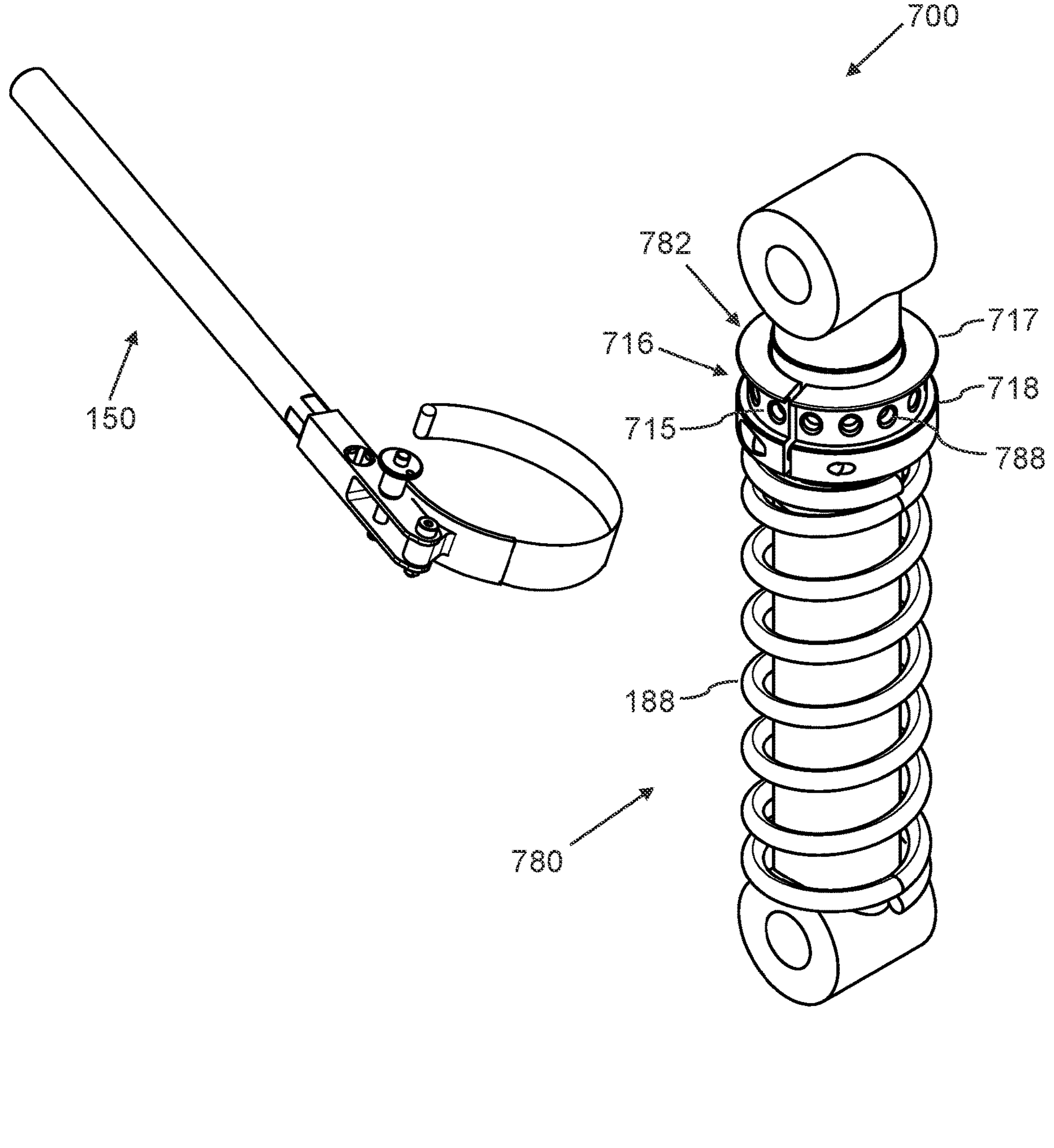
FIG. 7A is a top perspective view of an adjustable shock absorber system including an integrated adjustment ring with a tangential locking screw, and a shock adjuster tool ready for mounting, according to an embodiment of the invention.
Figure 7B:
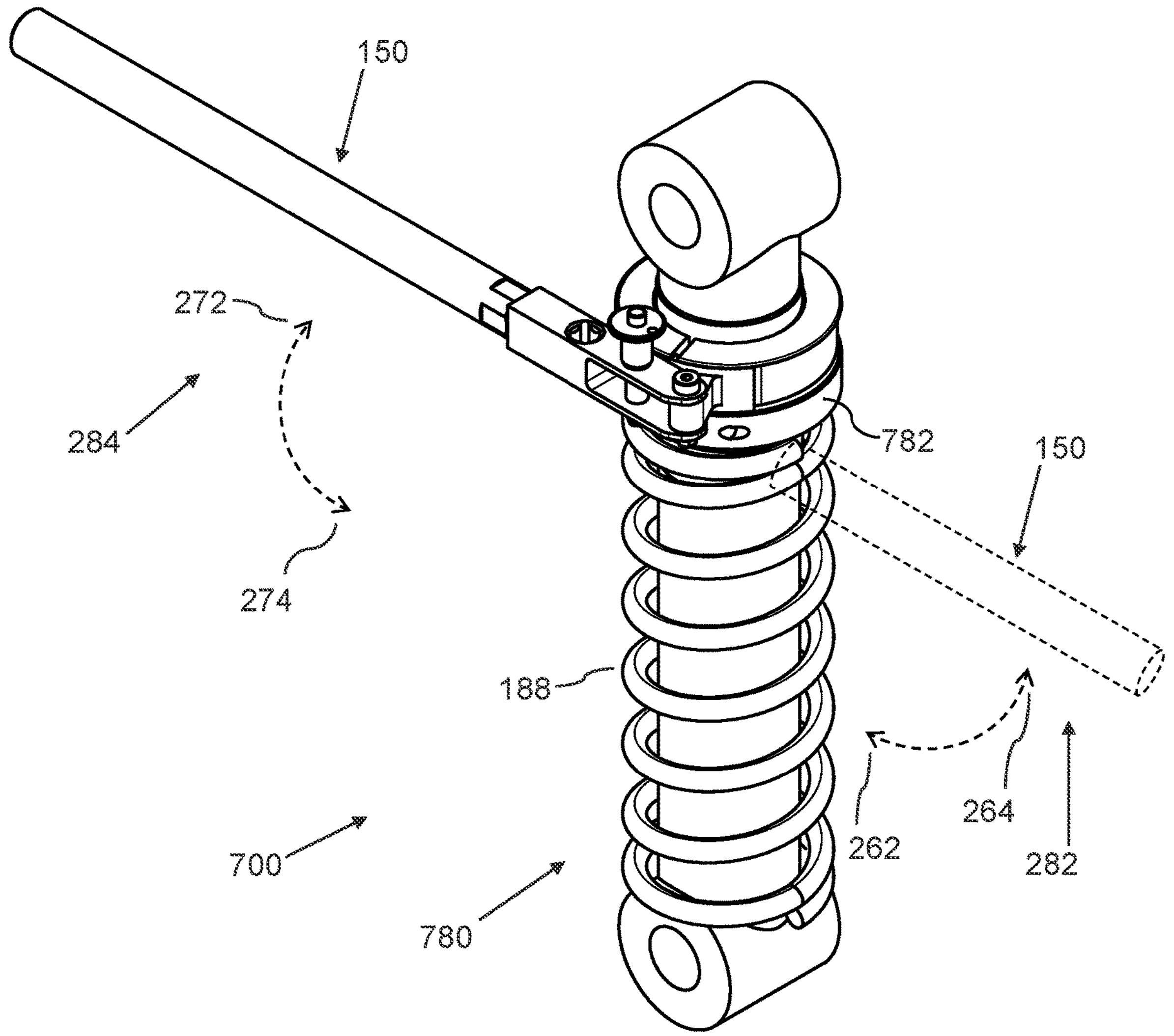
FIG. 7B is a top perspective view of an adjustable shock absorber system including an integrated adjustment ring with a tangential locking screw, and a shock adjuster tool mounted, according to an embodiment of the invention.
Figure 7C:
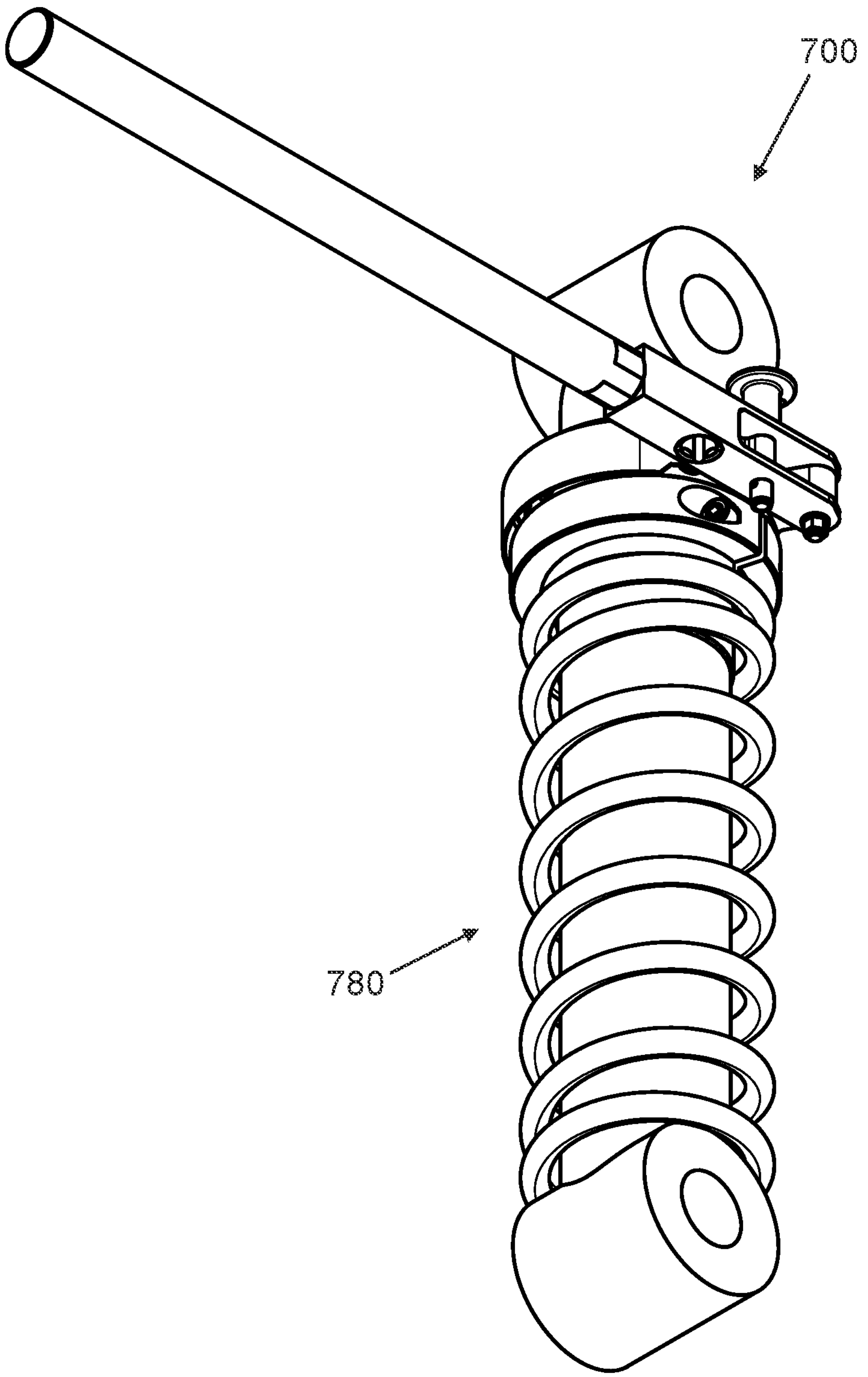
FIG. 7C is a bottom perspective view of an adjustable shock absorber system, according to the embodiment shown in FIG. 7A.
Figure 7D:
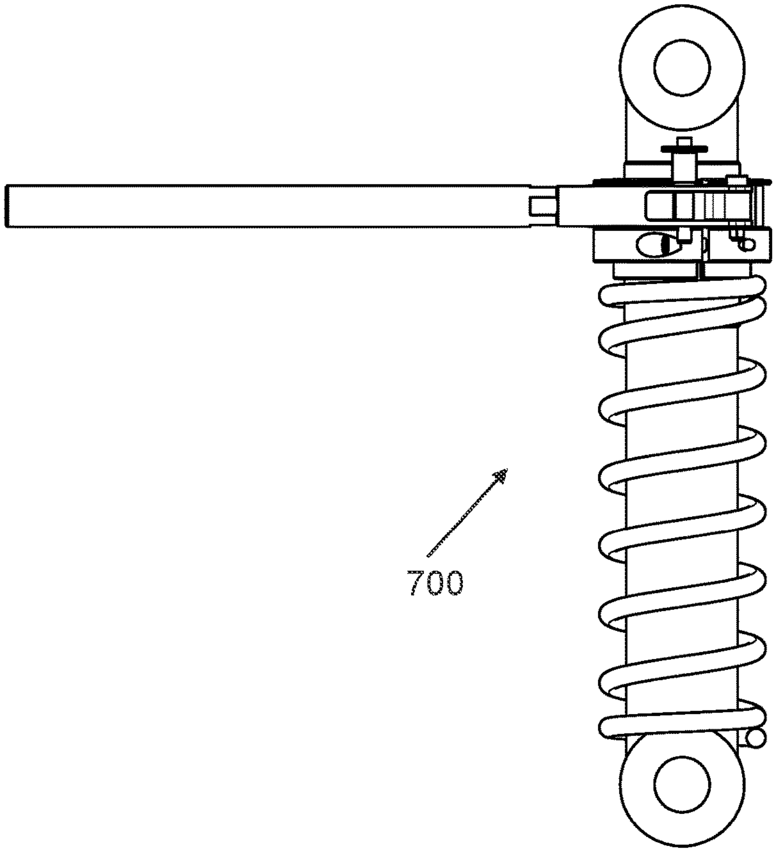
FIG. 7D is a front view of an adjustable shock absorber system, according to the embodiment shown in FIG. 7A.
Figure 7E:
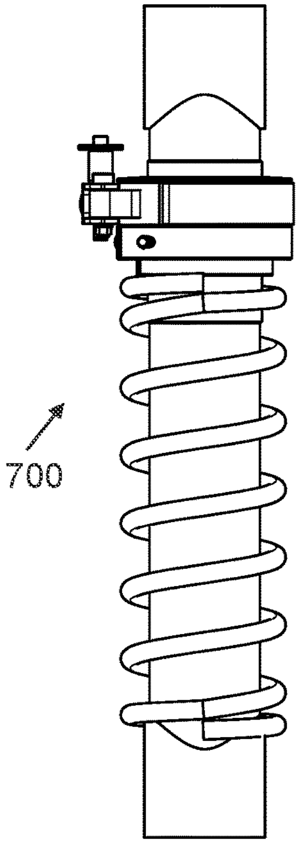
FIG. 7E is a side view of an adjustable shock absorber system, according to the embodiment shown in FIG. 7A.
Figure 7F:
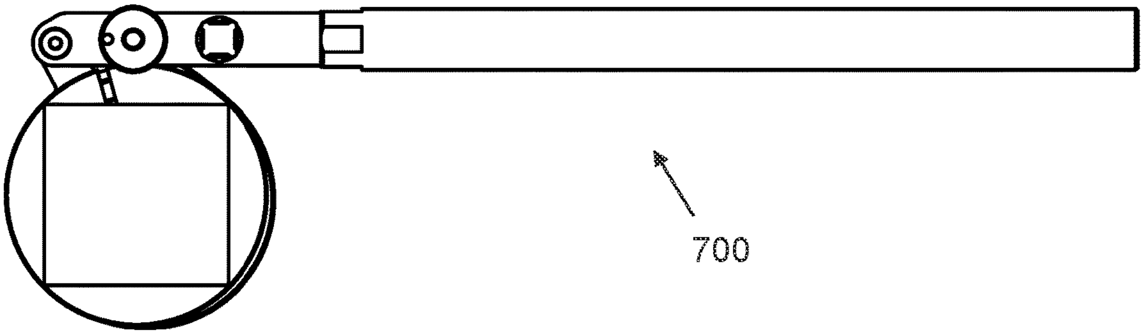
FIG. 7F is a top view of an adjustable shock absorber system, according to the embodiment shown in FIG. 7A.
Figure 14A:
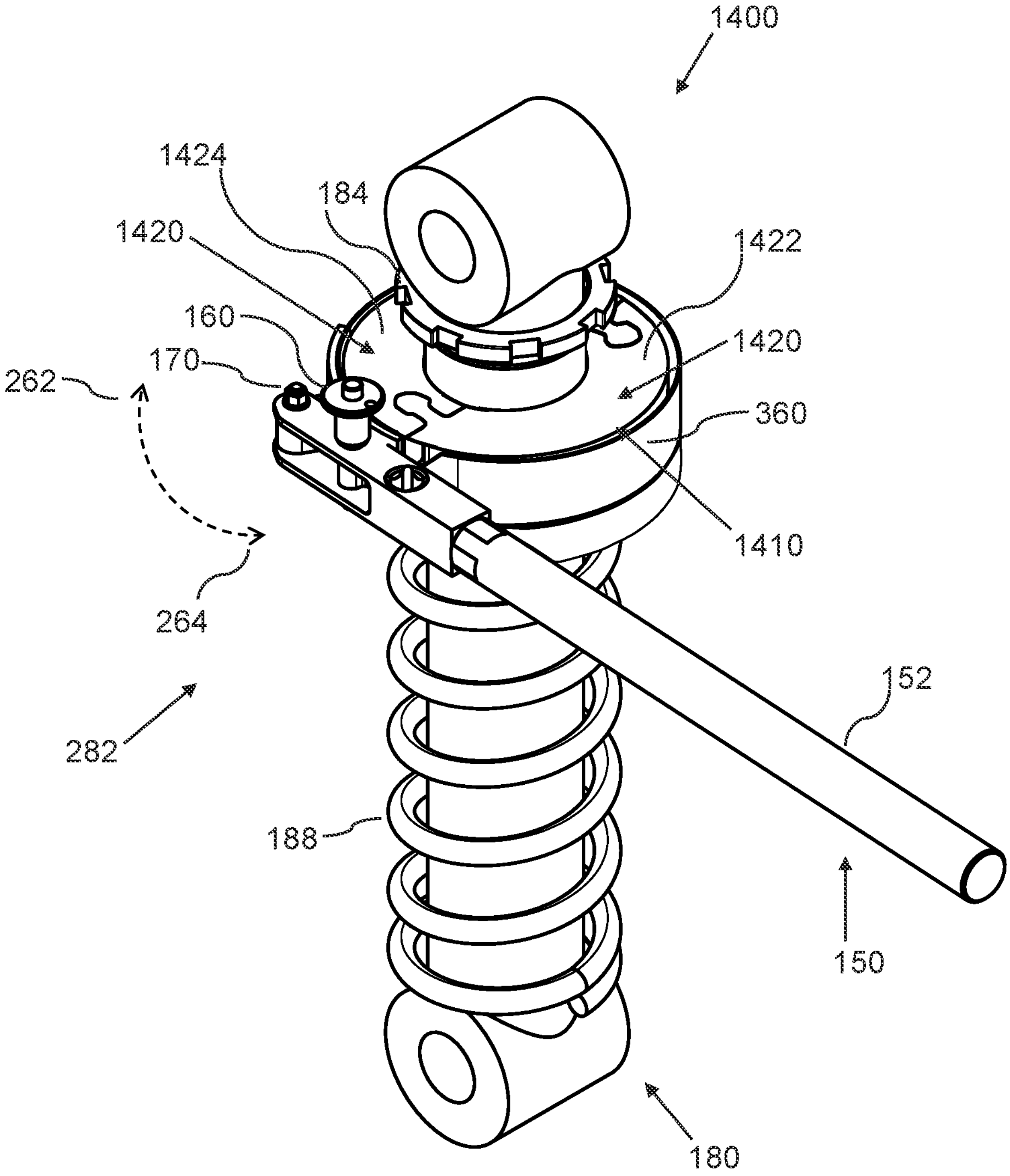
FIG. 14A is a top perspective view of an adjustable shock absorber system, with a dual-part mounting ring attached, and a shock adjuster tool mounted in a first orientation, according to an embodiment of the invention.
Figure 14B:
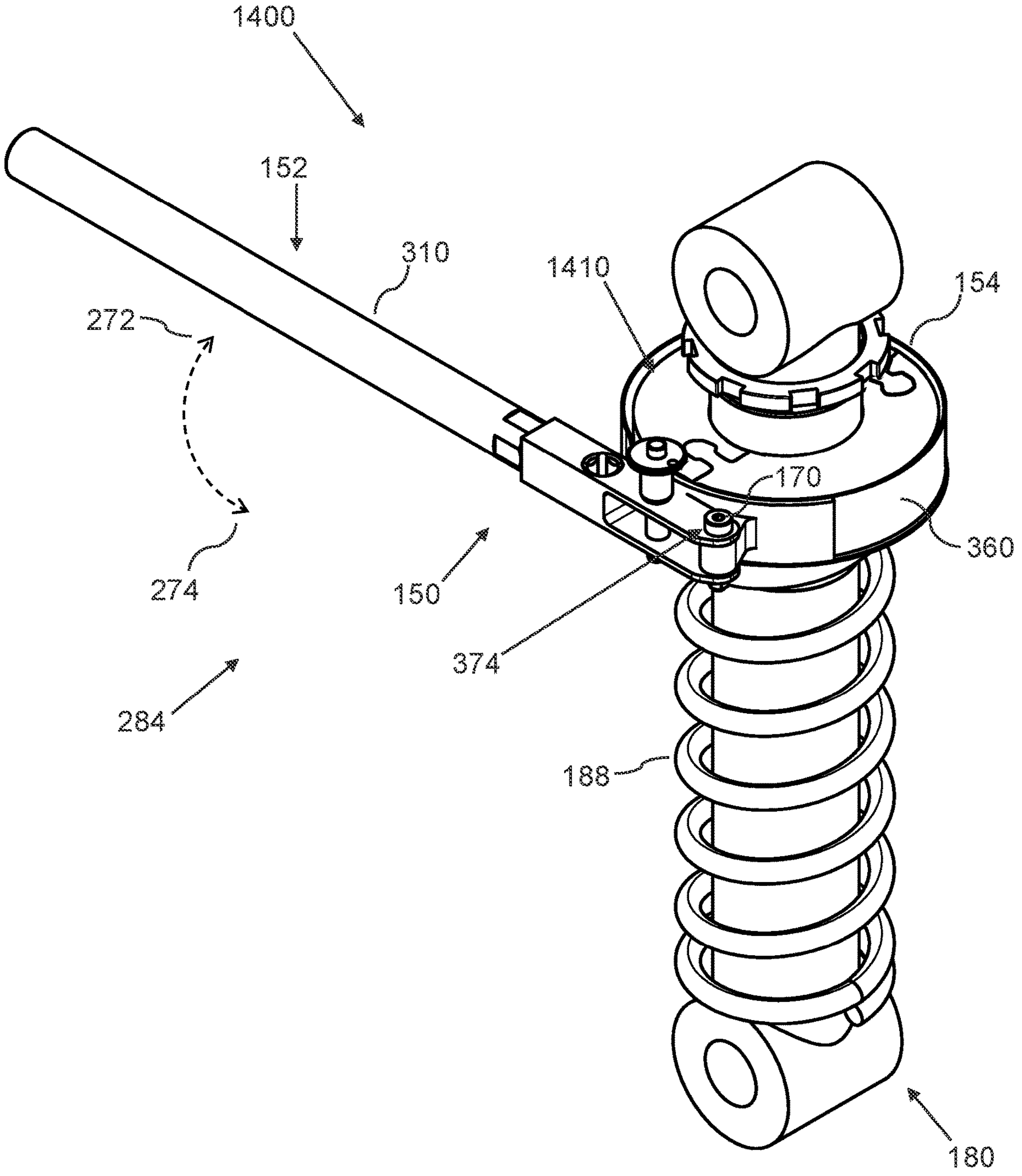
FIG. 14B is a top perspective view of an adjustable shock absorber system, with a dual-part mounting ring attached, and a shock adjuster tool mounted in a second orientation, according to an embodiment of the invention.
Figure 15A:
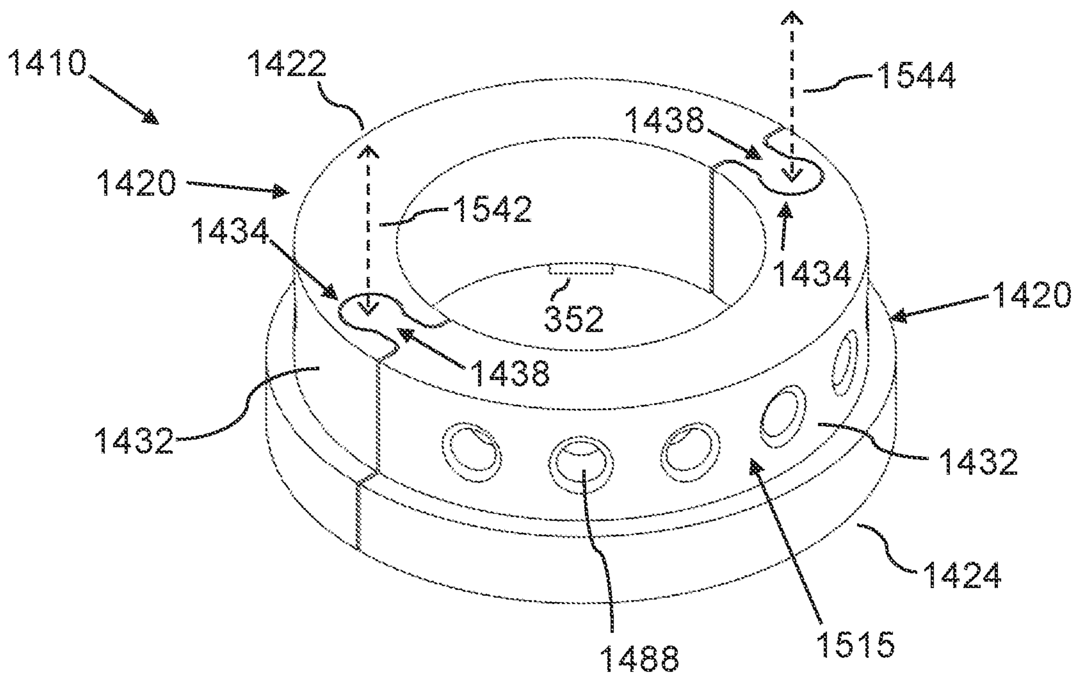
FIG. 15A is a top perspective view of an adjustment ring assembly, according to an embodiment of the invention.
Figure 15B:
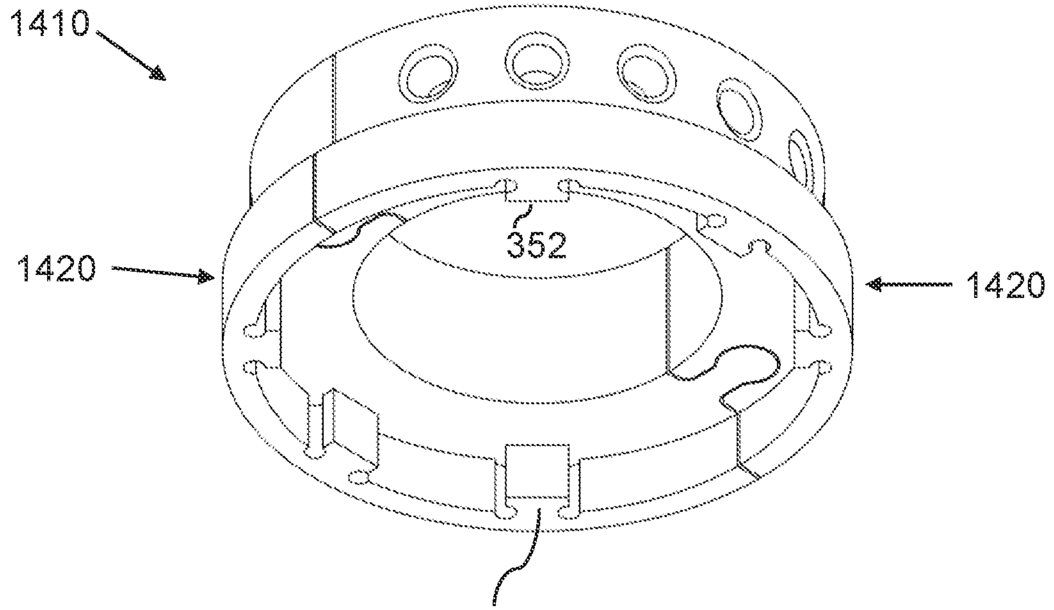
FIG. 15B is a bottom perspective view of an adjustment ring assembly, according to an embodiment of the invention.

In a related embodiment, as shown in FIGS. 6A and 6B, the band assembly 350 can further include:

a) a displacement member 670, which comprises:

i. a displacement arm 672, which comprises a vertical displacement aperture 674 in an outer end of the displacement arm; and ii. a band support 676, which is connected to an inner end of the displacement arm 672, such that the band support 676 is curved to match a curvature of a first end 562 of the elongated band 360, such that an outer surface of the band support 676 is connected to the first end 562 of the elongated band 360, for example using a band pin 369, such that a protruding pin portion of the band pin 369, protrudes through an aperture of the elongated band 360, such that the protruding pin portion protrudes from an inner side from an inner side of the elongated band 360 (as shown in FIGS. 3A and 14), such that the protruding pin portion enables engagement with an aperture 388, 788, 888, 1088, 1488, 1888 of a peripheral mounting surface of an adjustment ring body 820, 821, 920, 1020 or right/left adjustment ring member 120, 130, 1420, 1720;

b) a connection pin 170, which can include a threaded end 172; and c) a connection nut 174, which is configured to screw on to the threaded end 172;

wherein an outer end of the connector member 320 can be pivotably 576 connected to the outer end of the displacement arm 672 along a vertical connection axis 574, as shown in FIG. 513, and a second end 364 of the elongated band 360 can be detachably and pivotably connected to an inner end of the connector member 320;

wherein an outer end of the lever arm 152 is pivotably 576 connected to the outer end of the displacement arm 672 along a vertical connection axis 574 (i.e., with a pin through the vertical displacement aperture 674) of the displacement arm 672 that is connected to the first end 562 of the elongated band 360, as shown in FIGS. 5A-5B and 6A-6B, and a second end 364 of the elongated band 360 is detachably and pivotably connected to an outer portion of the lever arm 152, behind the outer end of the lever arm 152;

such that an inner end of the displacement arm 672 is positioned between the upper flange 623 and the lower flange 626, such that the front upper flange aperture 625, the vertical displacement aperture 674, and the front lower flange aperture 628 are aligned;

such that the connection pin 170 is insertable and can protrude through (i.e., protrudes through) the front upper flange aperture 625, the vertical displacement aperture 674, and the rear lower flange aperture 627, to detachably and pivotably connect the displacement member 670 to the connector member 320, and wherein the connection pin 170 can be secured in place with the connection nut 174 screwed onto the threaded end 172 of the connection pin 170;

such that the elongated band 360 forms a circle which curves frontward and sideward from the outer surface of the lever arm 152, such that the elongated band 360 is configured to form a curve around a portion of the peripheral mounting surface 115, such that the first end 562 of the elongated band 360 is substantially adjacent to the peripheral mounting surface 115, such that the first end 562 of the elongated band 360 follows a curvature 163 of the peripheral mounting surface 115;

such that a second end 364 of the elongated band 360 is radially displaced from the peripheral mounting surface 115, such that the second end 364 of the elongated band 360 is radially separated from the peripheral mounting surface 115, from a second side connection point 258 to a joining point 259 (i.e., where the elongated band 360 starts to touch the peripheral mounting surface 115), as shown in FIGS. 2E and 1B;

Thus, continuing analysis of the preceding embodiment, in the following related configurations, the adjustable shock absorber system 100 will operate:

a) such that the first clockwise rotation 262 of the shock adjuster tool 150, when the tool grip portion 154 is connected to the adjustment ring assembly 110 in the first orientation 282, as shown in FIGS. 1A, 1B, 1C and indicated in dotted lines in FIG. 7B (such that the lever arm 152 pulls the second end 364 of the elongated band 360 in the clockwise direction 382), causes a clockwise rotation 262 of the lever arm 152 around the connection point 374, as shown in FIG. 2A, such that the band support is pressured inwards, such that the first end 562 of the elongated band 360, as shown in FIG. 5A, is pressed into the peripheral mounting surface 115, and such that the second end 364 of the elongated band 360 is tightened along a length of the elongated band 360 around the peripheral mounting surface 115, which causes the frictional grip between the tool grip portion 154 and the adjustment ring assembly 110 to tighten, such that the first clockwise rotation 262 of the shock adjuster tool 150 causes the adjustment ring 182 of the coil-over shock absorber 180 to tighten, thereby increasing a preload of the spring 188 of the coil-over shock absorber 180;

b) such that the first anti-clockwise rotation 264 of the shock adjuster tool 150, when the tool grip portion 154 is connected to the adjustment ring assembly 110 in the first orientation 282, as shown in FIGS. 1A, 1B, 1C and indicated in dotted lines in FIG. 7B (such that the lever arm 152 pushes the first end 562, as shown in FIG. 5A, of the elongated band 360 in the anti-clockwise direction 384), causes an anti-clockwise rotation of the lever arm 152 around the connection point 374, as shown in FIG. 2A, such that the band support is pulled outwards, such that the first end 562 (as shown in FIG. 5A) of the elongated band 360 is lifted from the peripheral mounting surface 115, and such that the second end 364 of the elongated band 360 is loosened along a length of the elongated band 360 around the peripheral mounting surface 115, which causes the frictional grip between the tool grip portion 154 and the adjustment ring assembly 110 to loosen, such that the anti-clockwise rotation of the shock adjuster tool 150 causes a repositioning of the shock adjuster tool 150, to allow space for a repeated clockwise rotation of the shock adjuster tool 150, to allow for further tightening of the adjustment ring 182, as shown in FIG. 3A;

c) such that the second anti-clockwise rotation 274 of the shock adjuster tool 150, when the tool grip portion 154 is connected to the adjustment ring assembly 110 in the second orientation 284, as shown in FIGS. 2A and 7B (such that the lever arm 152 pulls the second end 364 of the elongated band 360 in the anti-clockwise direction 384, as shown in FIG. 1A), causes an anti-clockwise rotation of the lever arm 152 around the connection point 374, such that the band support is pressured inwards, such that the first end 562 (as shown in FIG. 5A), of the elongated band 360 is pressed into the peripheral mounting surface 115 (as shown in FIG. 1B), and such that the second end 364 (as shown in FIG. 1C) of the elongated band 360 is tightened along a length of the elongated band 360 around the peripheral mounting surface 115 (as shown in FIG. 1B), which causes the frictional grip between the tool grip portion 154 and the adjustment ring assembly 110 to tighten, such that the first anti-clockwise rotation 264 (as shown in FIG. 1A) of the shock adjuster tool 150 causes the adjustment ring 182 (as shown in FIG. 3A) of the coil-over shock absorber 180 to loosen, whereby a preload of the spring 188 of the coil-over shock absorber 180 is decreased; and d) such that the second clockwise rotation 272 (as shown in FIGS. 2A and 7B) of the shock adjuster tool 150, when the tool grip portion 154 is connected to the adjustment ring assembly 110 in the second orientation 284, as shown in FIG. 2B (such that the lever arm 152 pushes the first end 562 (as shown in FIG. 5A) of the elongated band 360 in the clockwise direction 382), causes a clockwise rotation of the lever arm 152 around the connection point 374 (as shown in FIG. 2A), such that the band support is pulled outwards, such that the first end 562 (as shown in FIG. 5A) of the elongated band 360 is lifted from the peripheral mounting surface 115 (as shown in FIG. 1B), and such that the second end 364 (as shown in FIG. 1C) of the elongated band 360 is loosened along a length of the elongated band 360 around the peripheral mounting surface 115 (as shown in FIG. 1B), which causes the frictional grip between the tool grip portion 154 and the adjustment ring assembly 110 to loosen, such that the clockwise rotation of the shock adjuster tool 150 causes a repositioning of the shock adjuster tool 150, to allow space for a repeated clockwise rotation of the shock adjuster tool 150, to allow for further tightening of the adjustment ring 182 (as shown in FIG. 3A).

In a Further Related Embodiment, as Shown in FIGS. 3A and 3B:

- a) the right adjustment ring member 120, can further include:
  - i. a right ring body 332;
  - ii. a right first pin 334;
  - iii. a first side lower protruding portion 333, which protrudes from a lower first side of the right ring body 332, such that the right first pin 334 protrudes upward from an outer part of the first side lower protruding portion 333;
  - iv. a right second pin 338; and
  - v. a second side lower protruding portion 337, which protrudes from a lower second side of the right ring body 332, such that the right second pin 338 protrudes upward from an outer part of the second side lower protruding portion 337; and
- b) the left adjustment ring member 130, can further include:
  - i. a left ring body 342;
  - ii. a first side upper protruding portion 343, which protrudes from an upper first side of the left ring body 342, wherein an outer portion of the first side upper protruding portion 343 comprises a first vertical aperture 348; and
  - iii. a second side upper protruding portion 347, which protrudes from an upper second side of the left ring body 342, wherein an outer portion of the second side upper protruding portion 347 comprises a second vertical aperture 344;

wherein the right first pin 334 inserts into the first vertical aperture 348, such that an outer portion of the first side upper protruding portion 343 rests on a top of the first side lower protruding portion 333; and wherein the right second pin 338 inserts into the second vertical aperture 344, such that an outer portion of the second side upper protruding portion 347 rests on a top of the second side lower protruding portion 337;

whereby the left adjustment ring member 130 and the right adjustment ring member 120 are connected (including interlocked).

In other related embodiments, the first and second ring bodies can each include a pin 334, 338 and a vertical aperture 348, 344; or other forms of detachably connecting or interlocking structures 334, 338, 348, 344; and other similar arrangements should be considered included herein, such as including upper protruding portions with downward protruding pins that connect or interlock with apertures of lower protruding portions.

Thus, in Another Further Related Embodiment, as Shown in FIGS. 3A and 3B:

- a) the right/first adjustment ring member 120, can further include:
  - i. a right ring body 332;
  - ii. a right first lock structure 334; and
  - iii. a right second lock structure 338; and
- b) the left/second adjustment ring member 130, can further include:
  - i. a left ring body 342;
  - ii. a left first lock structure 348; and
  - iii. a left second lock structure 344;

wherein the right first lock structure 334 is configured to detachably connect (including detachably interlock) with the left first lock structure 348; and wherein the right second lock structure 338 is configured to detachably connect (including detachably interlock) with the left second lock structure 344;

such that the left adjustment ring member 130 and the right adjustment ring member 120 are detachably connected (including detachably interlocked).

In Another Further Related Embodiment, as Shown in FIGS. 3A and 3B:

- a) the left adjustment ring member 130, can further include:
  - i. a plurality of left connecting structures 352 (which can be left interlocking structures 352), which can for example be configured as teeth, splines, hexagonal shapes, or other well-known interlocking structures; and
- b) the right adjustment ring member 120, can further include:
  - i. a plurality of right connecting structures 354 (which can be right interlocking structures 354), which can for example be configured as teeth, splines, hexagonal shapes, or other well-known interlocking structures;

wherein the left interlocking structures 352 and the right interlocking structures 354 are configured to connect (including detachably interlock) with adjustment interlocking structures 383 of the adjustment ring 182, as shown in FIG. 3A, which can for example be configured as teeth, splines, hexagonal shapes, pins, apertures, or other well-known locking structures (including interlocking structures) that are common for third party adjustment ring types that use tabs, female apertures, and large hex driving mechanisms, etc.

In another related embodiment, an outer portion of the lever arm 152, such as the connector body 622 of the connector member 320, can further include:

- a) a mounting aperture 329, which can be a square aperture;

wherein the mounting aperture 329 can be configured to allow attachment of a wrench tool with a wrench connector that fits into the mounting aperture 329, in order to apply supplemental torque/force to the lever arm 152.

In another related embodiment of an adjustable shock absorber system 1100 with a shock adjuster tool 1150 with a pivotable lever arm, as shown in FIGS. 11A-11B, 12A-12B, and 13A-13B, the lever arm 152 can be pivotably connected to tool grip portion 154, such that the lever shaft 310 can be pivotably connected to the connector member

320, for example via an intermediate connector member 1115, which is mounted on an outer end of the lever shaft 310.

In an embodiment, as shown in FIGS. 7A-7E, 8A-8B, 9A-9E, and 10A-10B an adjustable shock absorber system 700, 900 can include:

a) a coil-over shock absorber 780, 980, which can include:
  i. a spring 188; and
  ii. a lockable adjustment ring 782, 982, which is configured to rotatably adjust a preload of the spring 188 of the coil-over shock absorber 780, 980, wherein the lockable adjustment ring 782, 982 can include:
    2) a peripheral mounting surface 815, 915; and b) a shock adjuster tool 150, which can include:
  i. a lever arm 152; and
  ii. a tool grip portion 154, which is connected to an inner end of the lever arm 152;

wherein the tool grip portion 154 is configured to detachably connect to the peripheral mounting surface 815, 915 of the lockable adjustment ring 782, 982;

such that a first clockwise rotation 262 of the shock adjuster tool 150, when the tool grip portion 154 is connected to the lockable adjustment ring 782, 982 in a first orientation 282 (as indicated in dotted lines in FIG. 7B and shown in FIG. 1A) wherein an inner end of the lever arm 152 of the shock adjuster tool 150 is pointing in a clockwise direction 262, causes a frictional grip between the tool grip portion 154 and the lockable adjustment ring 782, 982 to tighten, such that the clockwise rotation of the shock adjuster tool 150 causes the lockable adjustment ring 782, 982 of the coil-over shock absorber 780, 980 to tighten, thereby increasing a preload of the spring 188 of the coil-over shock absorber 780, 980;

such that a first anti-clockwise rotation 264 of the shock adjuster tool 150, when the tool grip portion 154 is connected to the lockable adjustment ring 782, 982 in the first orientation 282, causes the frictional grip between the tool grip portion 154 and the lockable adjustment ring 782, 982 to loosen, such that the first anti-clockwise rotation 264 of the shock adjuster tool 150 causes a repositioning of the shock adjuster tool 150, to allow space for a repeated clockwise rotation 262 of the shock adjuster tool 150, to allow for further tightening of the lockable adjustment ring 782, 982;

such that a second anti-clockwise rotation 274 of the shock adjuster tool 150, when the tool grip portion 154 is connected to the lockable adjustment ring 782, 982 in a second orientation 284 (as shown in FIGS. 2A and 7B) wherein an inner end of the lever arm 152 of the shock adjuster tool 150 is pointing in an anti-clockwise direction 274, causes a frictional grip between the tool grip portion 154 and the lockable adjustment ring 782, 982 to tighten, such that the second anti-clockwise rotation 274 of the shock adjuster tool 150 causes the adjustment ring 182 of the coil-over shock absorber 780, 980 to loosen, thereby decreasing a preload of the spring 188 of the coil-over shock absorber 780, 980; and such that a second clockwise rotation 272 of the shock adjuster tool 150, when the tool grip portion 154 is connected to the lockable adjustment ring 782, 982 in the second orientation 284, causes the frictional grip between the tool grip portion 154 and the lockable adjustment ring 782, 982 to loosen, such that the second clockwise rotation 272 of the shock adjuster tool 150 causes a repositioning of the shock adjuster tool 150, to allow space for a repeated anti-clockwise rotation of the shock adjuster tool 150, to allow for further loosening of the lockable adjustment ring 782, 982.

Figure 8A:
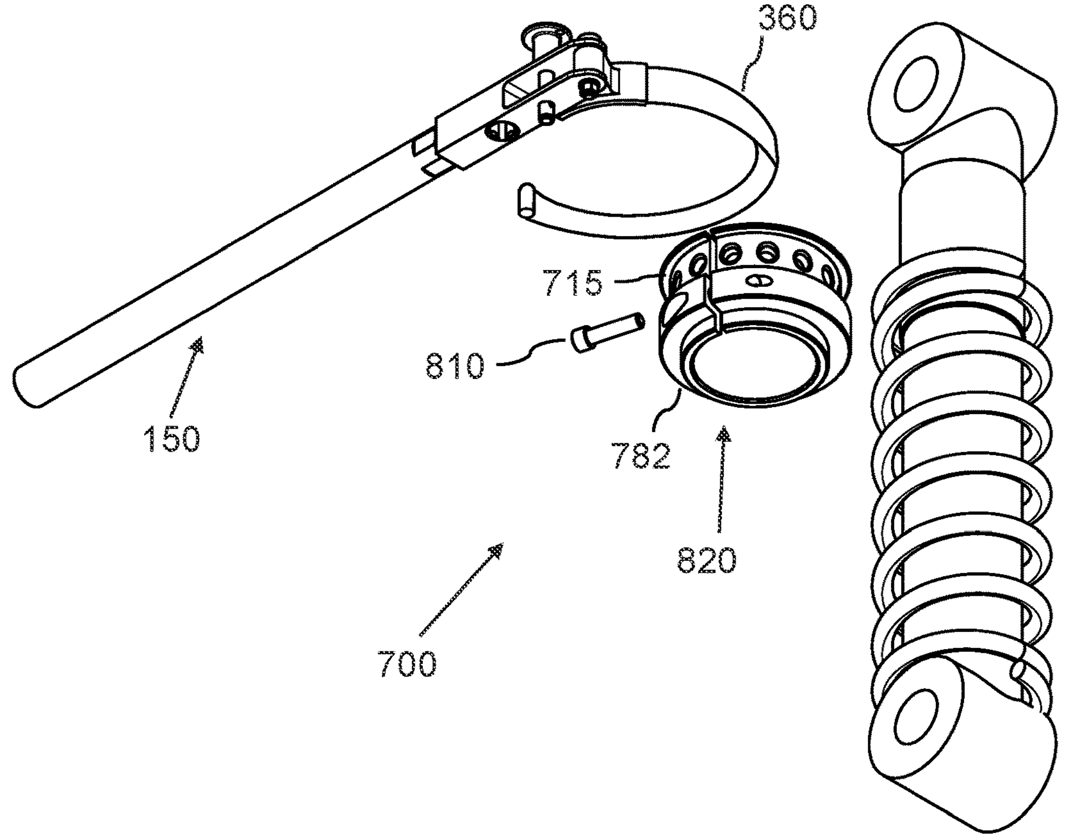
FIG. 8A is an exploded bottom perspective view of an adjustable shock absorber system, according to the embodiment shown in FIG. 7A.
Figure 8B:
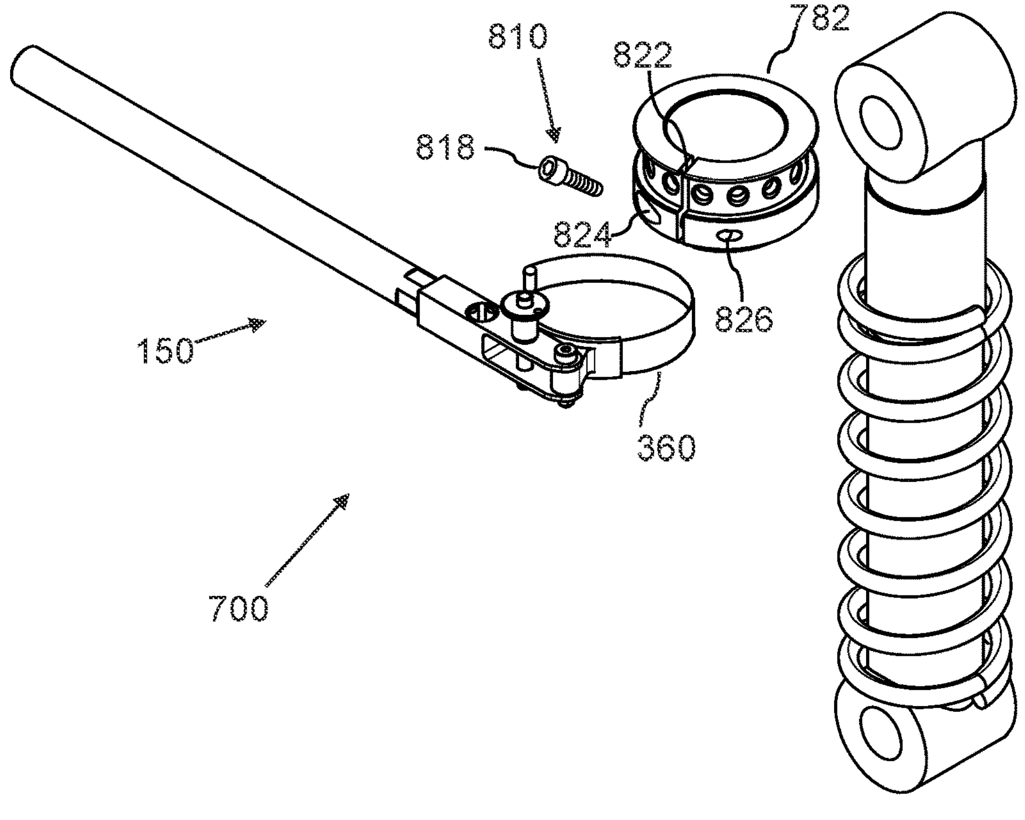
FIG. 8B is an exploded top perspective view of an adjustable shock absorber system, according to the embodiment shown in FIG. 7A.

In a related embodiment, of the adjustable shock absorber system 700, as shown in FIGS. 8A and 8B, the lockable adjustment ring 782 can further include:

a) a locking screw 810; and b) an adjustment ring body 820, which can include:
  i. a ring gap 822, which is configured to allow flexing of the adjustment ring body 820;
  ii. a first lateral aperture 824, which is configured to protrude laterally through an outer corner of a first end of the adjustment ring body 820, on a first side of the ring gap 822; and
  iii. a second lateral aperture 826, which is configured to protrude laterally through an outer corner of a second end of the adjustment ring body 820, on a second side of the ring gap 822;
  wherein the adjustment ring body 820 can be made of a metal or metal alloy, such as ferrous metal, such that the adjustment ring body 820 is flexible;

such that the first lateral aperture 824 and the second lateral aperture 826 are aligned, such that the locking screw 810 screws into the first lateral aperture 824 and the second lateral aperture 826, such that tightening the locking screw 810 decreases a width of the ring gap 822;

such that tightening the locking screw 810 locks the lockable adjustment ring 782 in position, thereby locking a selected preload of the coil-over shock absorber 780.

Figure 8C:
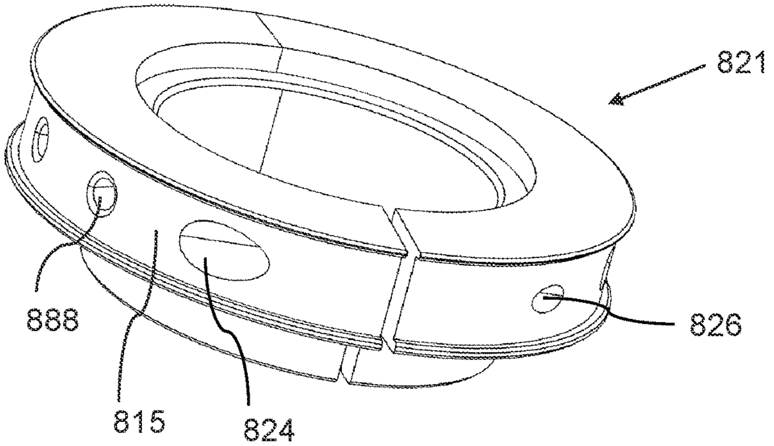
FIG. 8C is a top perspective view of a reduced height adjustment ring body, according to an embodiment of the invention.
Figure 8D:
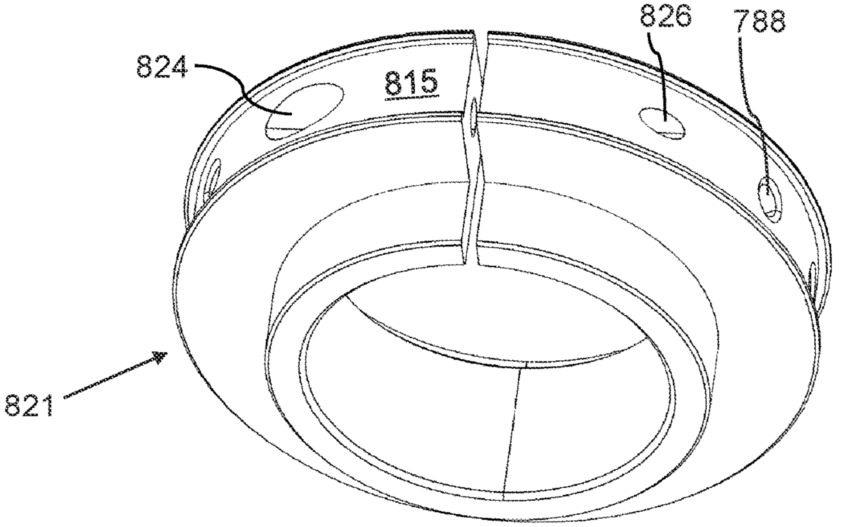
FIG. 8D is a bottom perspective view of a reduced height adjustment ring body, according to an embodiment of the invention.
Figure 8E:
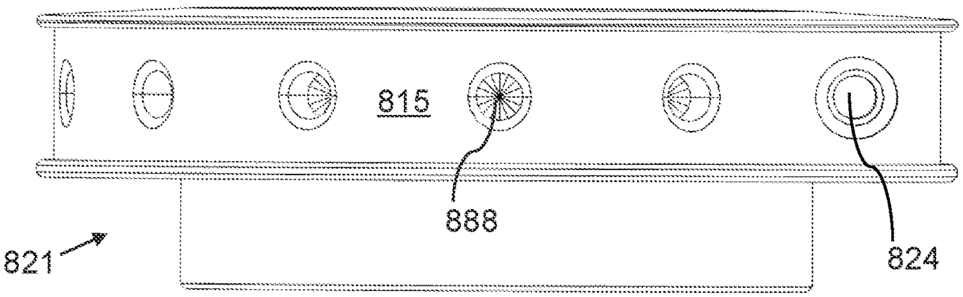
FIG. 8E is a side view of a reduced height adjustment ring body, according to an embodiment of the invention.

In a related embodiment, as shown in FIGS. 8C, 8D, and 8E, a reduced height adjustment ring body 821 can be configured such that the first lateral aperture 824 and the second lateral aperture 826 are positioned within the peripheral mounting surface 815, such that the reduced height adjustment ring body 821 can be made with a reduced height compared to the adjustment ring body 820.

In another related embodiment, of the adjustable shock absorber system 900, as shown in FIGS. 9A-9F and 10A-10B, the lockable adjustment ring 982 can further include:

a) at least one locking screw 910, or a plurality of locking screws 910; and b) an adjustment ring body 920, which can include:
  i. at least one radial threaded aperture 1024, which is configured to protrude radially from an outer surface 1026 of the adjustment ring body 920, such that the at least one radial aperture 1024 penetrates radially through the adjustment ring body 920;

such that the at least one locking screw 910 screws into the radial threaded aperture 1024, such that tightening the locking screw 910 causes the locking screw 910 to screw through the radial threaded aperture 1024 and touch a body 1082 of the coil-over shock absorber 980;

such that tightening the locking screw 910 locks the lockable adjustment ring 982 in position, thereby locking a selected preload of the coil-over shock absorber 980.

Figure 10A:
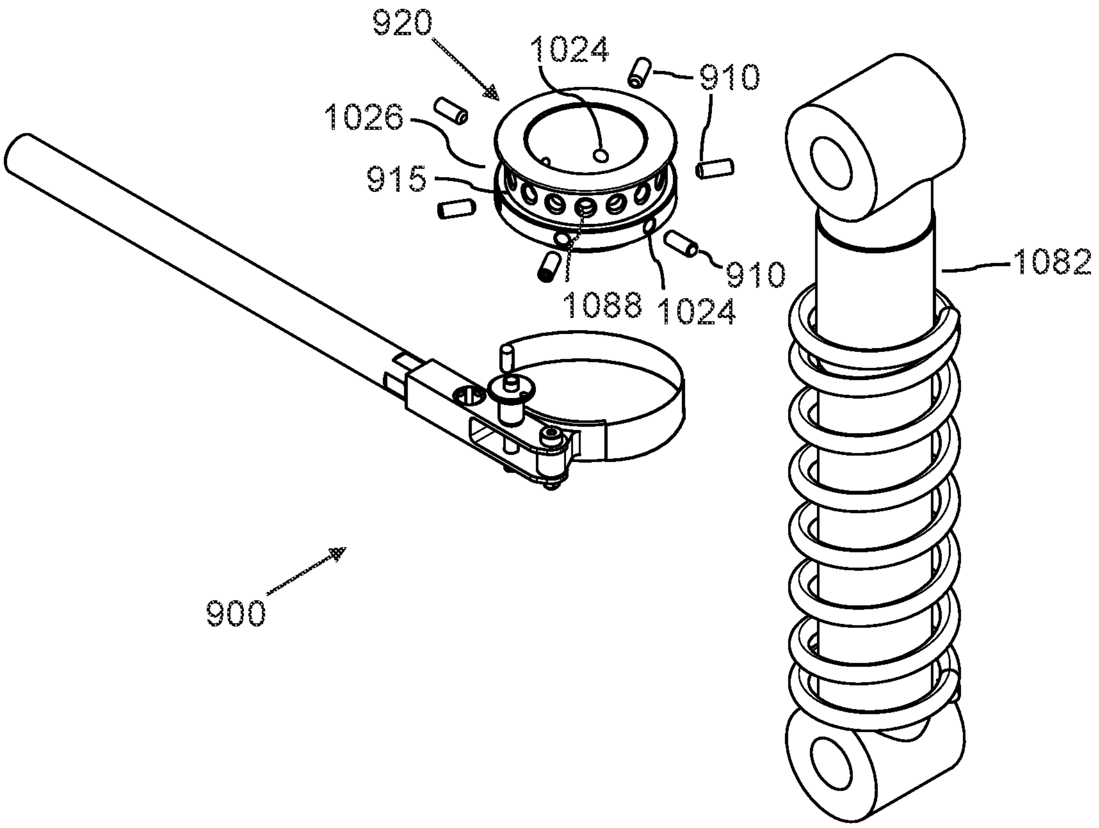
FIG. 10A is an exploded top perspective view of an adjustable shock absorber system, according to the embodiment shown in FIG. 9A.
Figure 10B:
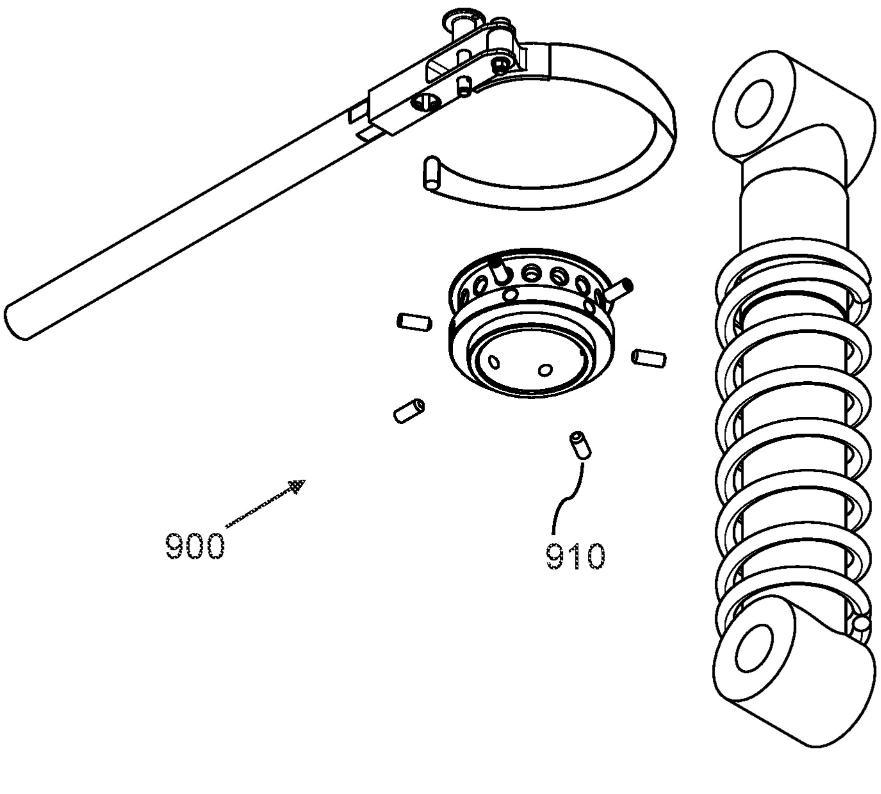
FIG. 10B is an exploded bottom perspective view of an adjustable shock absorber system, according to the embodiment shown in FIG. 9A.
Figure 10C:
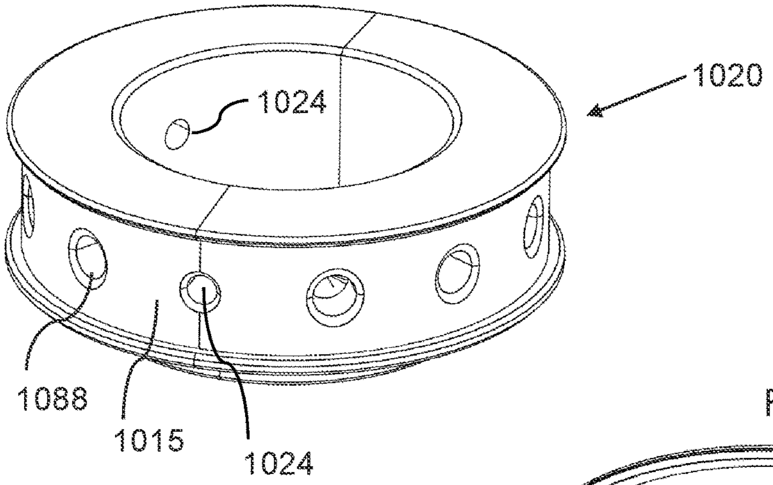
FIG. 10C is a top perspective view of a reduced height adjustment ring body, according to an embodiment of the invention.
Figure 10D:
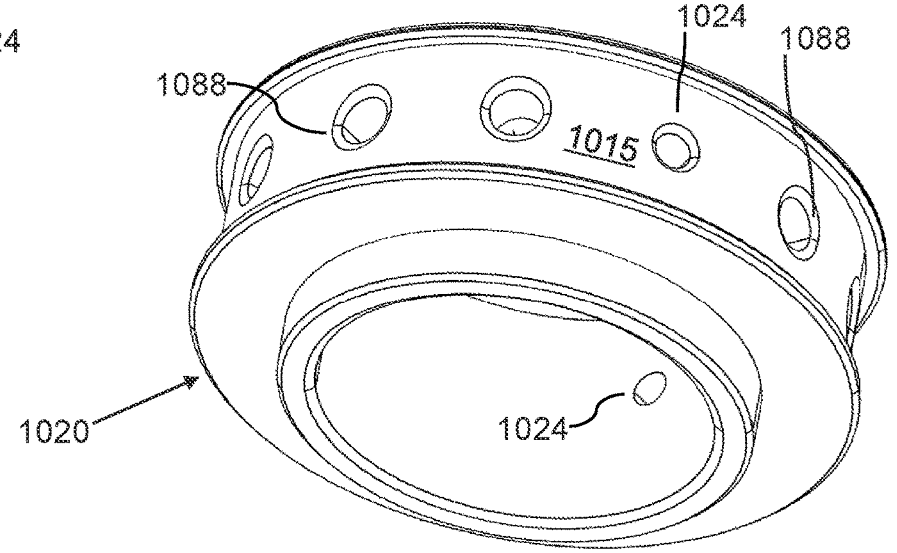
FIG. 10D is a bottom perspective view of a reduced height adjustment ring body, according to an embodiment of the invention.
Figure 10E:
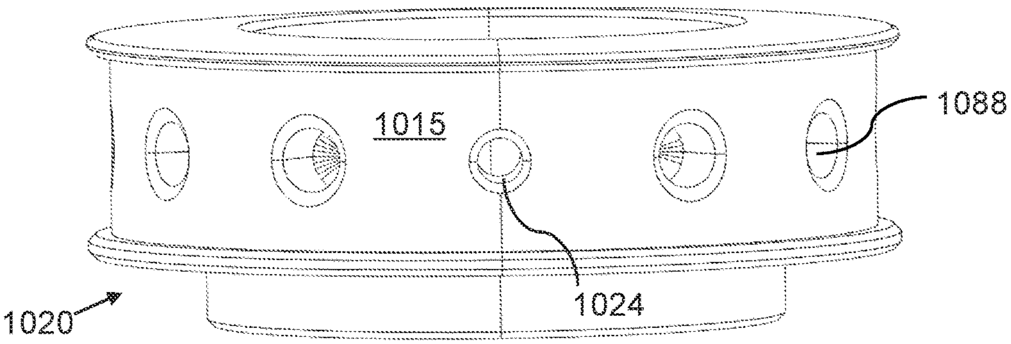
FIG. 10E is a side perspective view of a reduced height adjustment ring body, according to an embodiment of the invention.
Figure 11A:
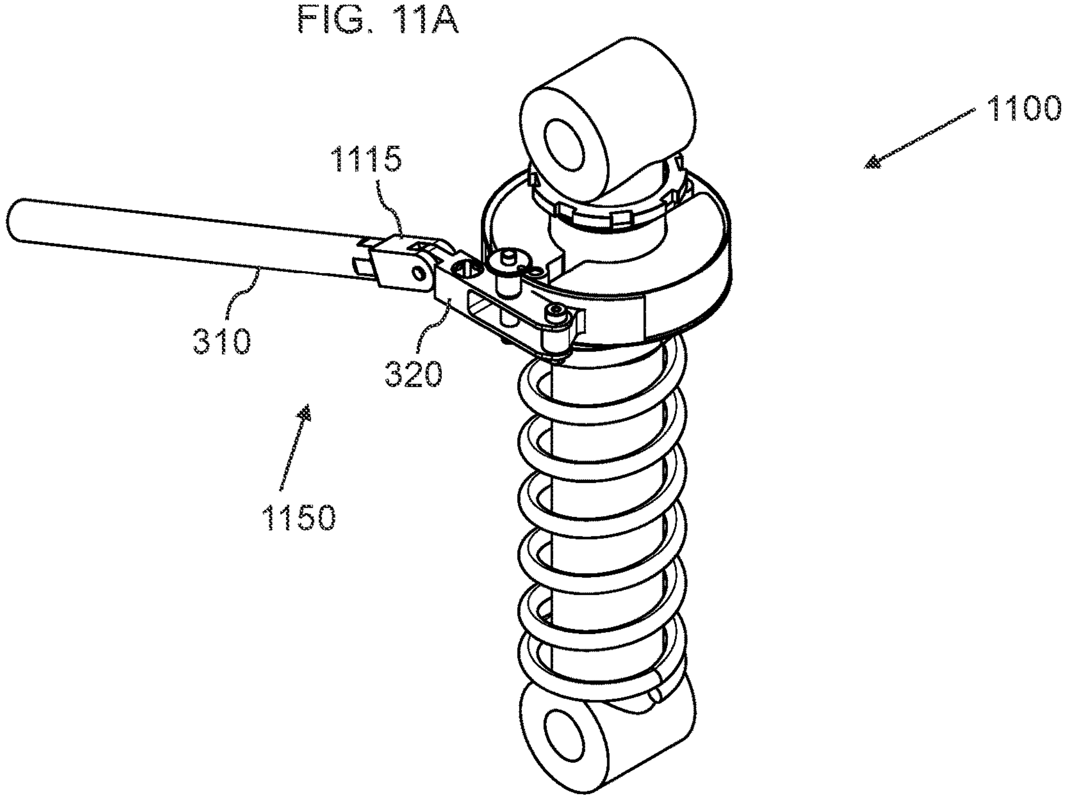
FIG. 11A is a top perspective view of an adjustable shock absorber system, with a shock adjuster tool with a pivotable shaft, according to an embodiment of the invention.
Figure 11B:
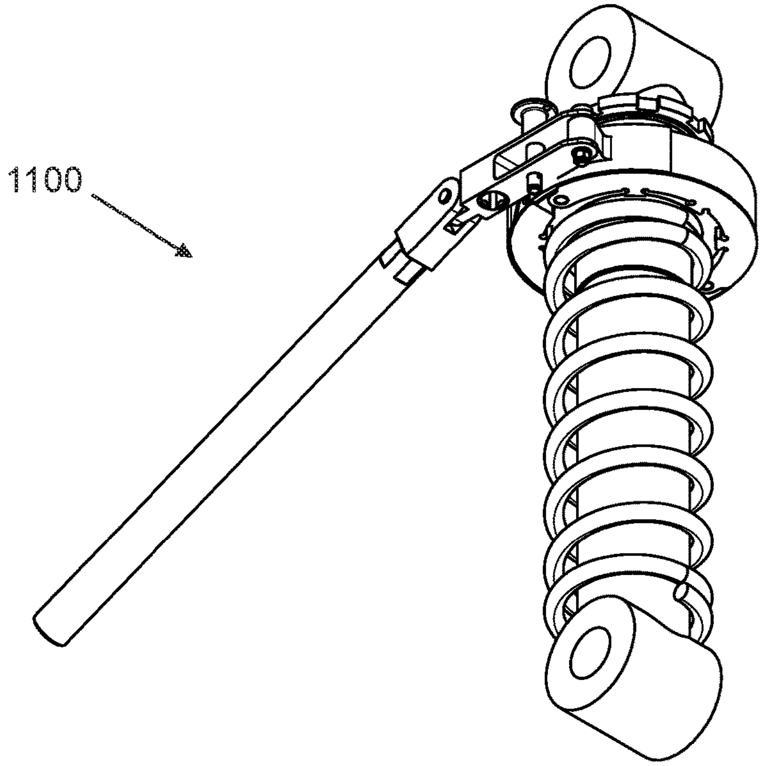
FIG. 11B is a top perspective view of an adjustable shock absorber system, with a shock adjuster tool with a pivotable shaft, according to an embodiment of the invention.
Figure 12A:
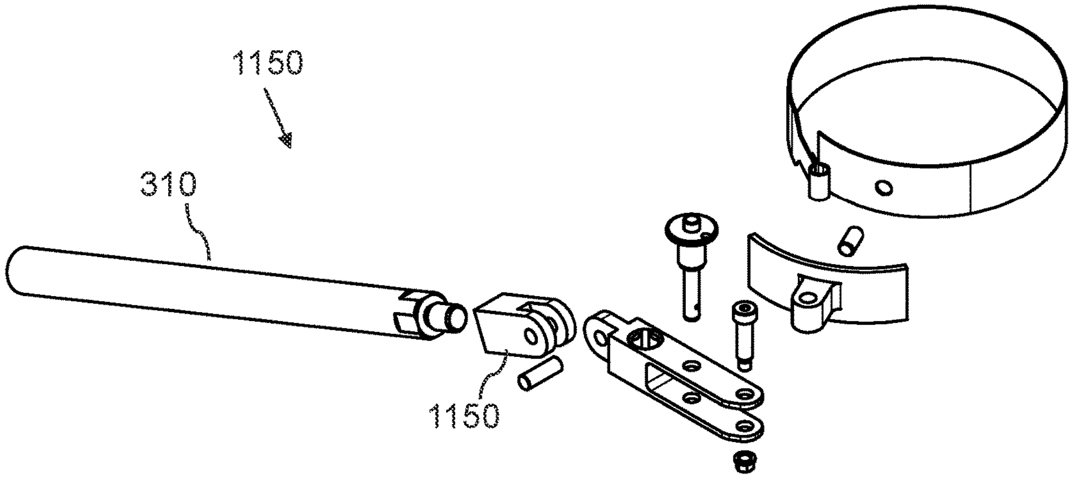
FIG. 12A is a top exploded perspective view of a shock adjuster tool with a pivotable shaft, according to an embodiment of the invention.
Figure 12B:
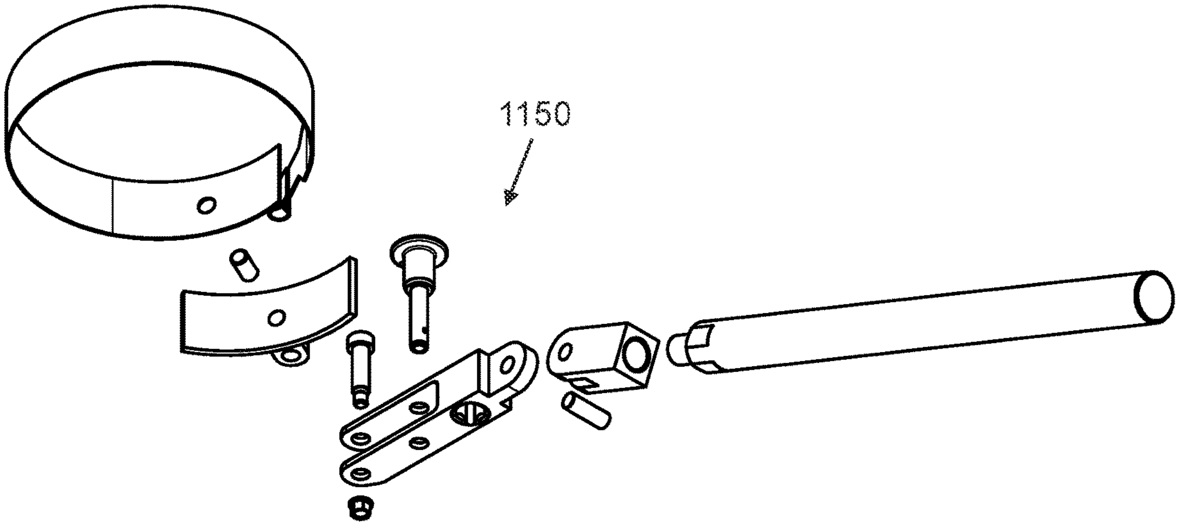
FIG. 12B is a bottom exploded perspective view of a shock adjuster tool with a pivotable shaft, according to an embodiment of the invention.
Figure 13A:
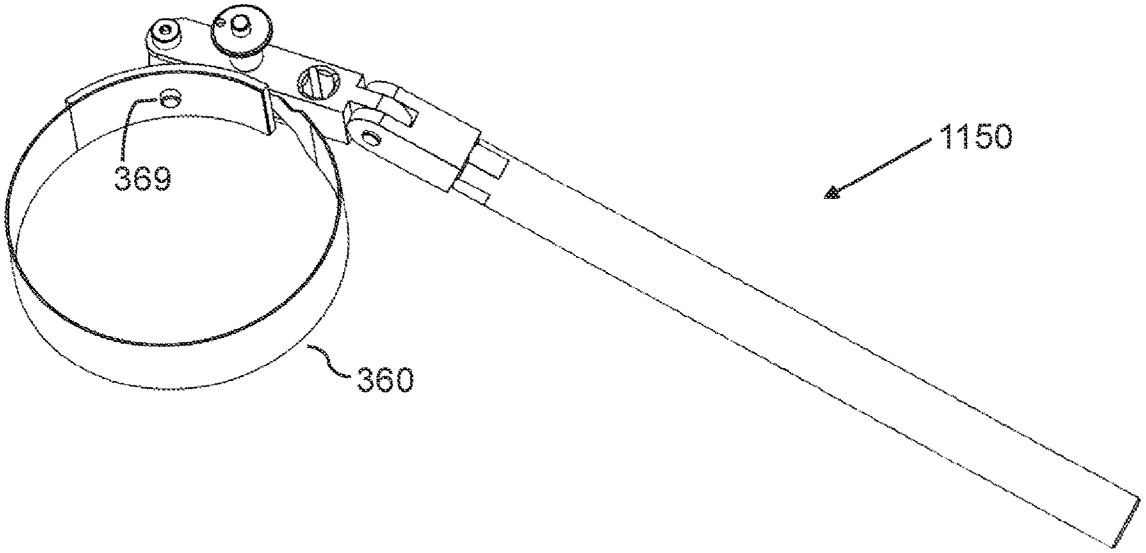
FIG. 13A is a top perspective view of a shock adjuster tool with a pivotable shaft, according to an embodiment of the invention.
Figure 13B:
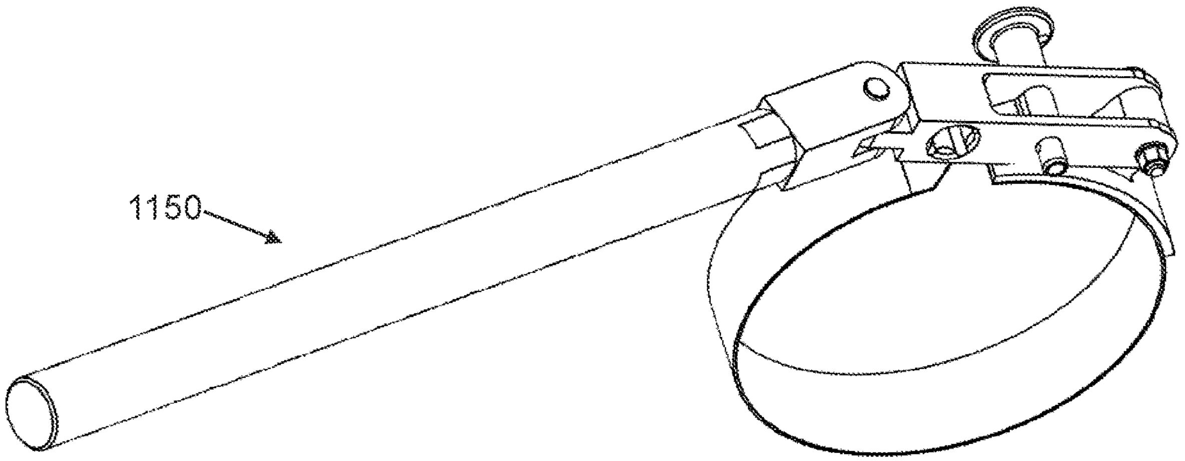
FIG. 13B is a bottom perspective view of a shock adjuster tool with a pivotable shaft, according to an embodiment of the invention.

In a further related embodiment, as shown in FIGS. 10C, 10D, and 10E, a reduced height adjustment ring body 1021 can be configured such that the radial threaded apertures 1024 are positioned within the peripheral mounting surface 1015, such that the reduced height adjustment ring body 1020 can be made with a reduced height compared to the adjustment ring body 920.

Figure 9A:
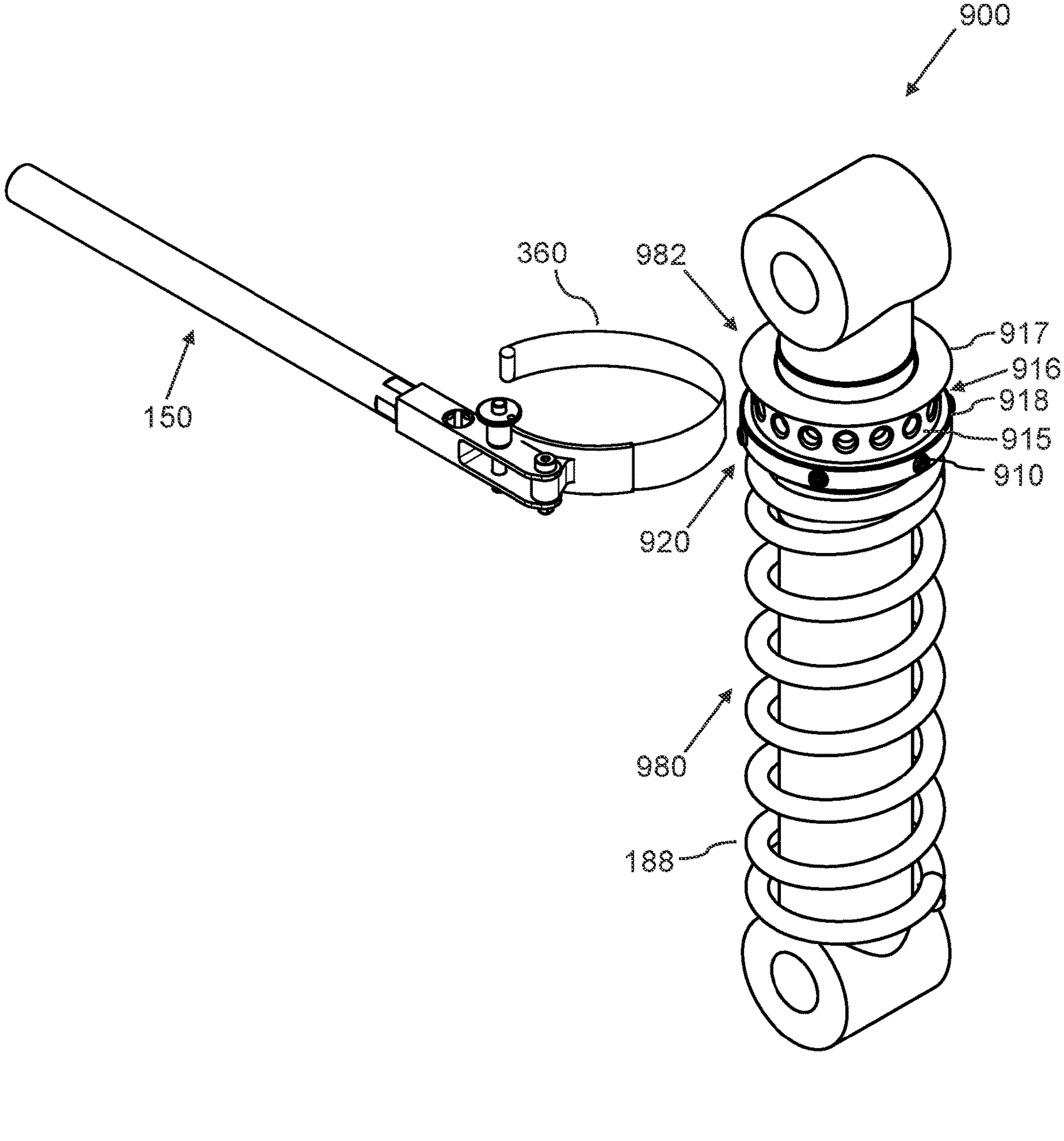
FIG. 9A is a top perspective view of an adjustable shock absorber system including an integrated adjustment ring with radial locking screws, and a shock adjuster tool ready for mounting, according to an embodiment of the invention.
Figure 9B:
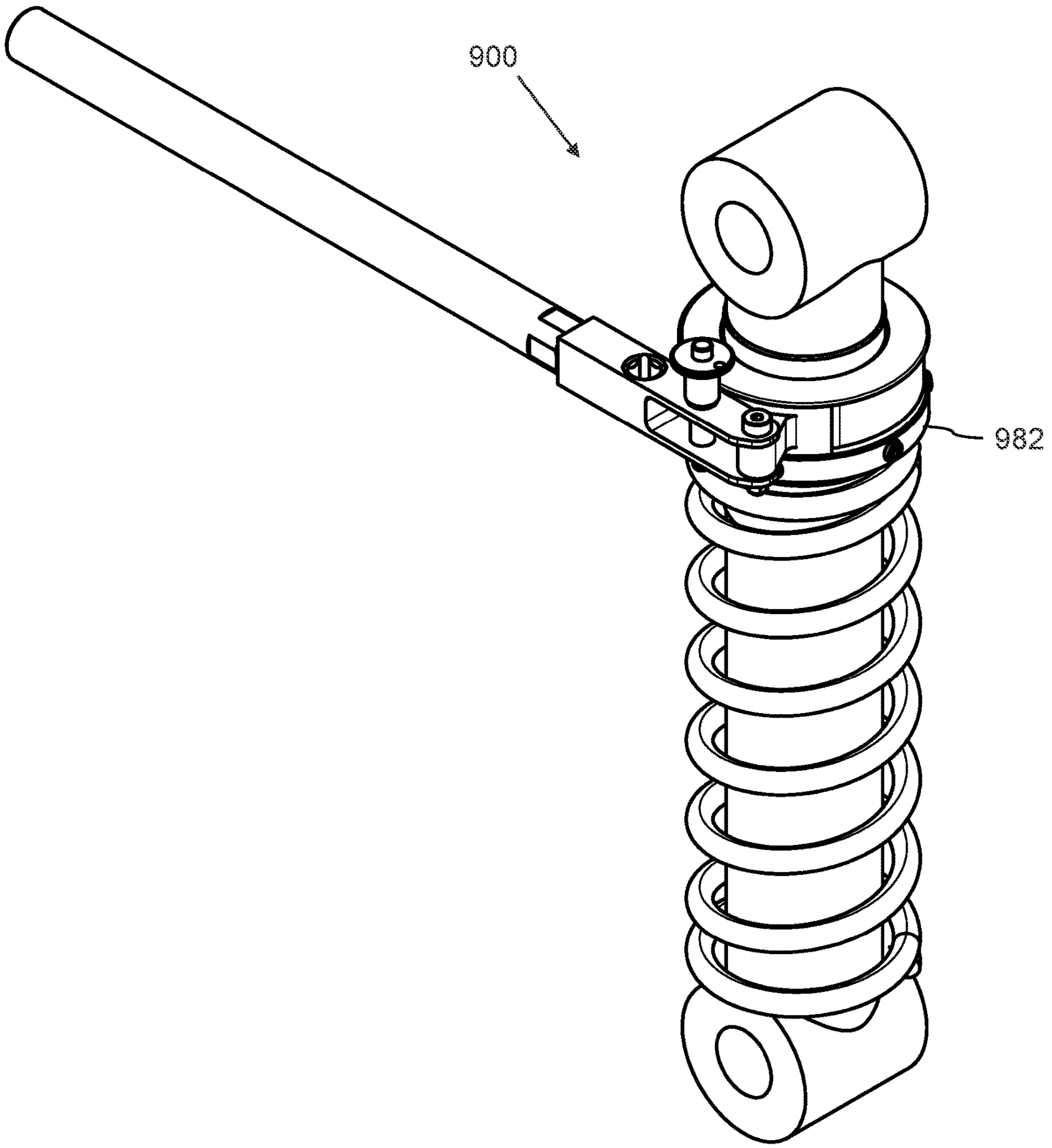
FIG. 9B is a top perspective view of an adjustable shock absorber system including an integrated adjustment ring with radial locking screws, and a shock adjuster tool mounted, according to an embodiment of the invention.
Figure 9C:
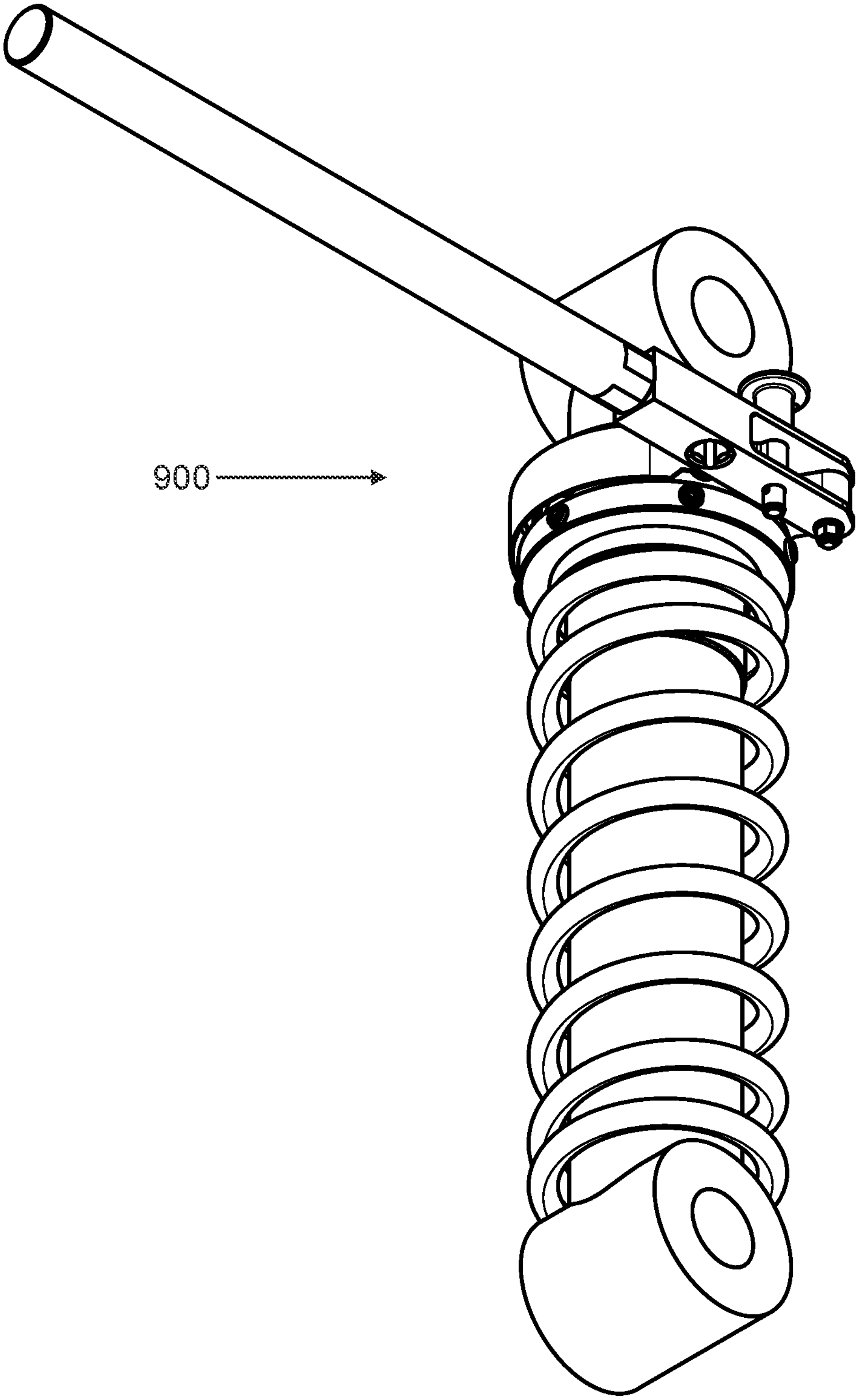
FIG. 9C is a bottom perspective view of an adjustable shock absorber system, according to the embodiment shown in FIG. 9A.
Figure 9D:
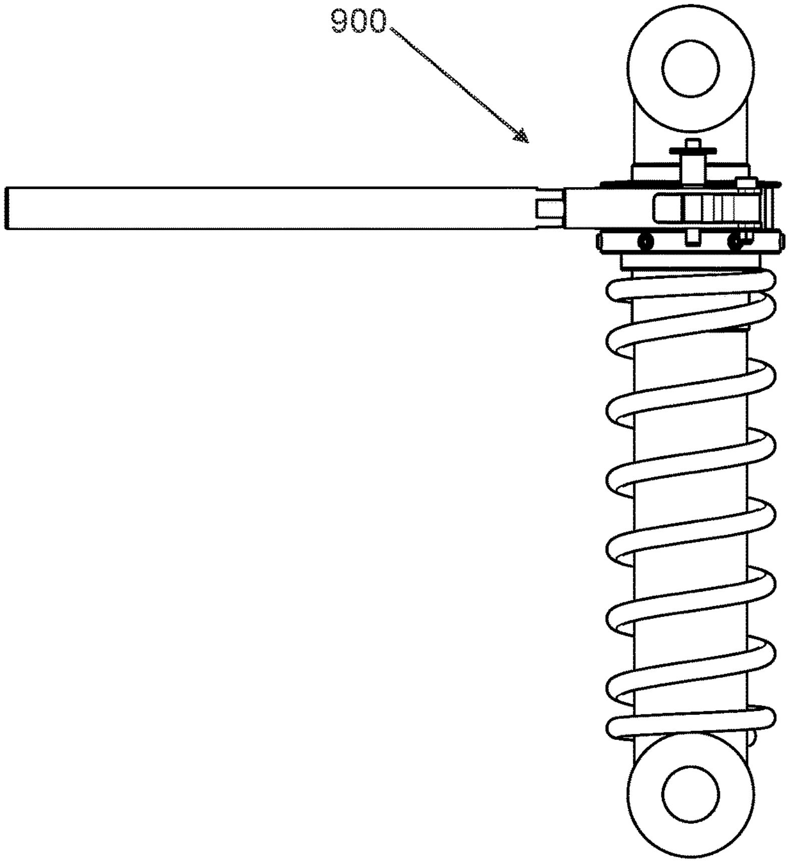
FIG. 9D is a front view of an adjustable shock absorber system, according to the embodiment shown in FIG. 9A.
Figure 9E:
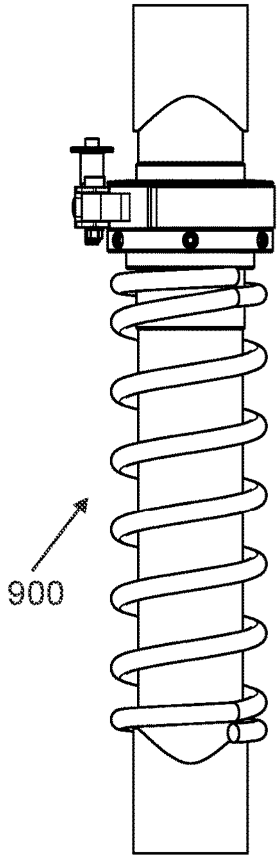
FIG. 9E is a side view of an adjustable shock absorber system, according to the embodiment shown in FIG. 9A.
Figure 9F:
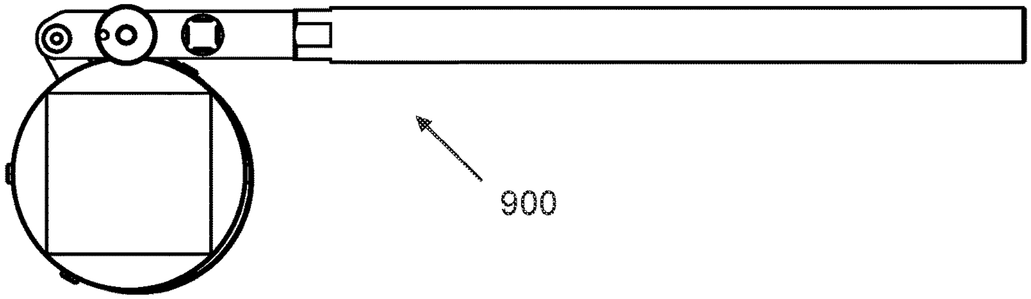
FIG. 9F is a top view of an adjustable shock absorber system, according to the embodiment shown in FIG. 9A.

In another related embodiment, of the adjustable shock absorber system 700, 900, as shown in FIGS. 7A and 9A, the lockable adjustment ring 782, 982 can be configured with an indentation 716, 916, such that the peripheral mounting surface 715, 915 is positioned in a bottom of the indentation 716, 916, such that the lockable adjustment ring 782, 982 can further include:

a) an upper lip 717, 917, which is positioned above the peripheral mounting surface 715, 915; and b) a lower lip 718, 918, which is positioned below the peripheral mounting surface 715, 915;

such that the elongated band 360 is positioned in the indentation 716, 916, between the upper lip 717, 917 and the lower lip 718, 918.

In another related embodiment of an adjustable shock absorber system 1400, comprising an adjustment ring assembly 1410, as shown in FIGS. 14A-14B, 15A-15B, and 16A-16G:

a) the right/first adjustment ring member 1420, 1422, can further include:

i. a right ring body 1432;

ii. a right first lock structure 1434, which is positioned in a first end of the right ring body 1432;

wherein the right first lock structure 1434 can be configured as a right receiving indentation 1434; and iii. a right second lock structure 1438, which is positioned in a second end of the right ring body 1432;

wherein the right second lock structure 1438 can be configured as a right protruding structure 1438; and b) the left/second adjustment ring member 1420, 1424, can further include:

i. a left ring body 1432;

i. a left first lock structure 1434, which can be positioned in a first end of the left ring body 1432;

wherein the left first lock structure 1434 can be configured as a left receiving indentation 1434;

ii. a left second lock structure 1438, which can be positioned in a second end of the left ring body 1432;

wherein the left second lock structure 1438 can be configured as a left protruding structure 1438; and wherein the right first lock structure 1434 is configured to detachably connect (including detachably interlock) with the left second lock structure 1438, such that the left protruding structure 1438 is vertically slidable 1542 into the right receiving indentation 1434; and wherein the right second lock structure 1438 is configured to detachably connect (including detachably interlock) with the left first lock structure 1434, such that the right protruding structure 1438 is vertically slidable 1544 into the left receiving indentation 1434;

such that the right adjustment ring member 1420, 1422 and the left adjustment ring member 1420, 1424 are detachably connected (including detachably interlocked).

Thus, in a related embodiment, the right adjustment ring member 1420, 1422 and the left adjustment ring member 1420, 1424 can be identical, such that when connected, the right adjustment ring member 1420, 1422 is horizontally rotated 180 degrees relative to the left adjustment ring member 1420, 1424 (or vice versa). Note that the left and right designations are arbitrary (due to rotational symmetry) and solely reference the relative positions in FIGS. 14A-14B and 15A (when the coil-over shock absorber 180 is considered to be viewed from a front left side in FIGS. 1A, 7A, 14A).

Figure 16A:
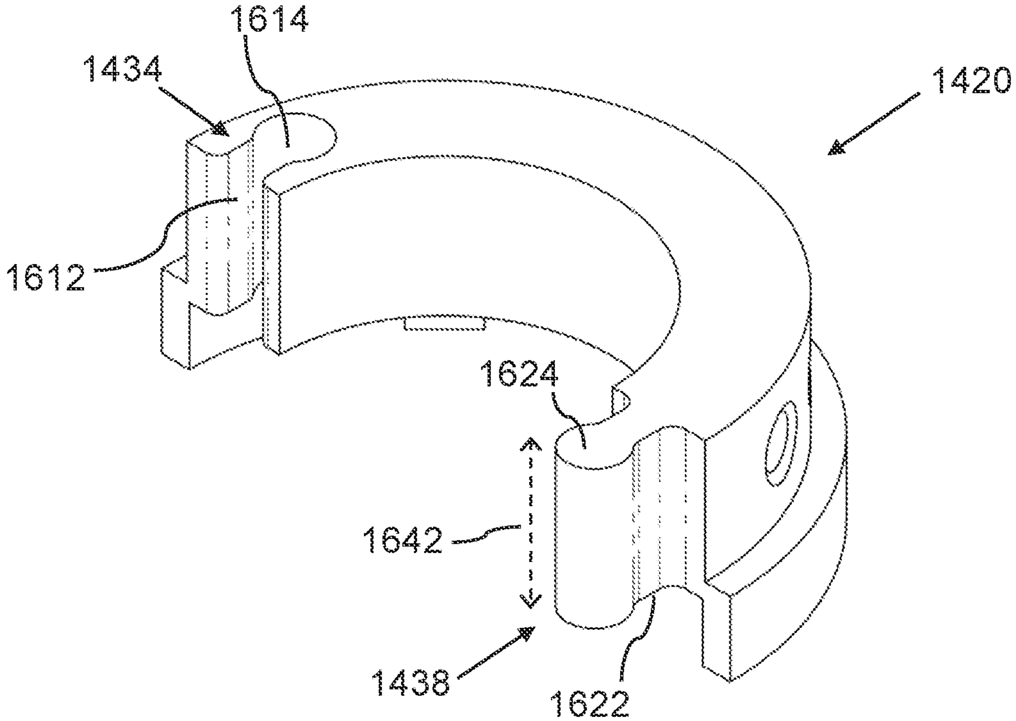
FIG. 16A is a top perspective view of an adjustment ring member, according to an embodiment of the invention.
Figure 16B:
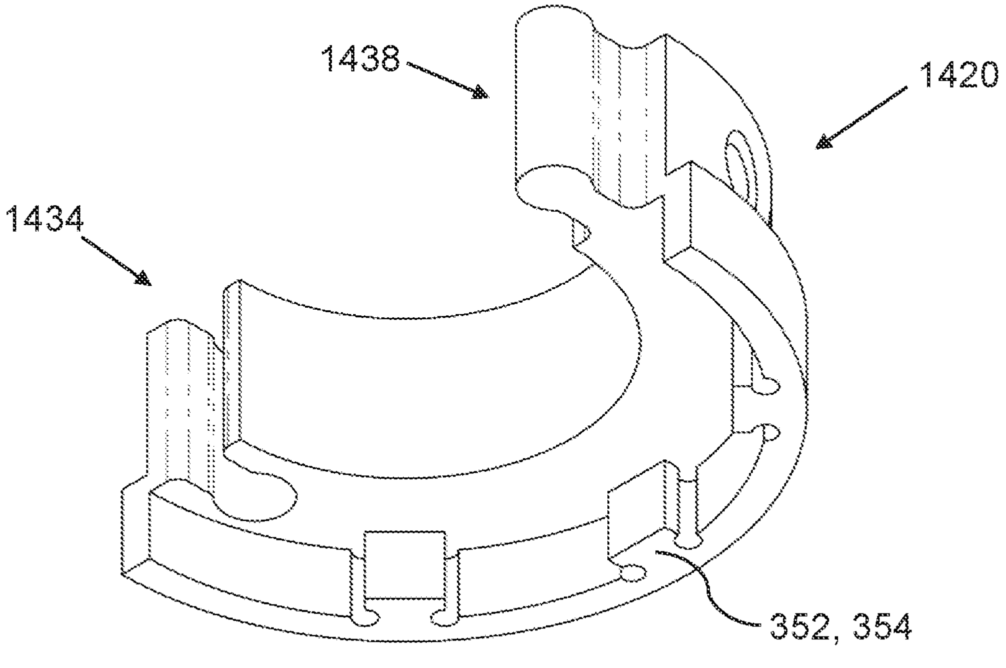
FIG. 16B is a bottom perspective view of an adjustment ring member, according to an embodiment of the invention.
Figure 16C:
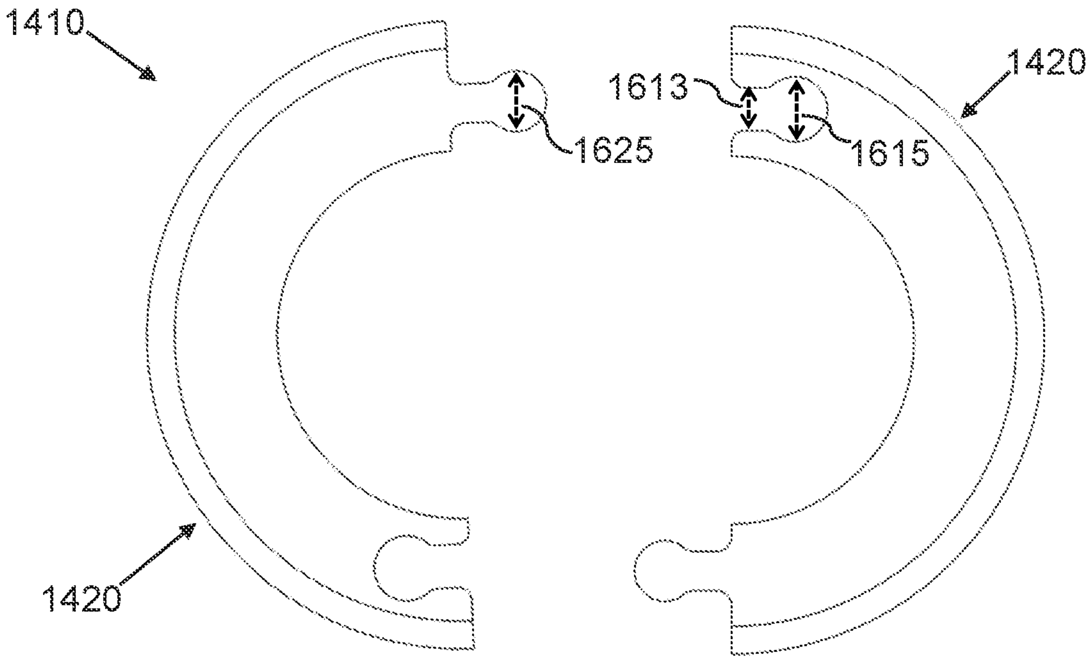
FIG. 16C is a top plan view of a disassembled adjustment ring assembly, according to an embodiment of the invention.

In a further related embodiment, as shown in FIGS. 16A-16B, the right and left protruding structures 1438 and the right and left receiving indentations 1434 can be vertically elongated 1642 and can be configured similar to vertically elongated puzzle piece connectors.

In another further related embodiment, as shown in FIG. 16A, the right receiving indentation 1434 and the left receiving indentation 1434 can each further include:

a) a passageway 1612; and b) a central aperture 1614, such that the passageway 1612 can be vertically connected to the central aperture 1614;

such that a width 1613 of the passageway 1612 is smaller than a width 1615 of the central aperture 1614; and the right protruding structure 1438 and the left protruding structure 1438 can each further include:

c) a connector 1622; and d) a key structure 1624, such that the connector 1622 is vertically connected to the key structure 1624;

such that the connector 1622 is configured to be vertically slidable along the passageway 1612;

such that the key structure 1624 is configured to be vertically slidable along the central aperture 1614;

such that a width 1625 of the key structure 1624 is larger than the width 1613 of the passageway 1612.

In various related embodiments, the central aperture 1614 and the key structure 1624, can be configured as a vertically elongated shape with a cross section that is substantially circular (as shown; i.e. with elongated substantially tubular shape), rectangular, polygonal, star-shaped or another suitable shape. Similarly, the passageway 1612 and the connector 1622 can be vertically elongated.

In another related embodiment of an adjustable shock absorber system 1700, comprising an adjustment ring assembly 1710, as shown in FIGS. 17A-17B, 18A-18B, 19A-19E, and 20A-20B:

a) the right/first adjustment ring member 1720, 1722, can further include:

i. a right ring body 1832, which can include at least one connector aperture 1836, which is configured to removably receive an inner portion of a right connecting structure 1852 (such as a connecting pin);

ii. a right first lock structure 1938, which is positioned in a first end of the right ring body 1832;

wherein the right first lock structure 1938 can be configured as a right protruding structure 1938; and iii. a right second lock structure 1934, which is positioned in a second end of the right ring body 1832;

wherein the right second lock structure 1934 can be configured as a right receiving indentation 1934; and b) the left/second adjustment ring member 1720, 1724, can further include:

i. a left ring body 1832 which can include at least one connector aperture 1836, which is configured to removably receive an inner portion of a left connecting structure 1854 (such as a connecting pin);

ii. a left first lock structure 1938, which can be positioned in a first end of the left ring body 1832;

wherein the left first lock structure 1938 can be configured as a left protruding structure 1938;

iii. a left second lock structure 1934, which can be positioned in a second end of the left ring body 1832;

wherein the left second lock structure 1934 can be configured as a left receiving indentation 1934; and wherein the right first lock structure 1938 is configured to detachably connect with the left second lock structure 1934, such that the right protruding structure 1938 is horizontally slidable 1842, 1844 into the right receiving indentation 1934; and wherein the right second lock structure 1934 is configured to detachably connect with the left first lock structure 1938, such that the right protruding structure 1938 is horizontally slidable 1842, 1844 into the left receiving indentation 1934;

such that the right adjustment ring member 1420, 1422 and the left adjustment ring member 1420, 1424 are detachably connected.

Thus, in a related embodiment, the right adjustment ring member 1720, 1722 and the left adjustment ring member 1720, 1724 can be identical, such that when connected, the right adjustment ring member 1720, 1722 is horizontally rotated 180 degrees relative to the left adjustment ring member 1720, 1724 (or vice versa). Note that the left and right designations are arbitrary (due to rotational symmetry) and solely reference the relative positions in FIGS. 17A-17B and 18A (when the coil-over shock absorber 180 is considered to be viewed from a front left side in FIGS. 1A, 7A, 17A).

Figure 18A:
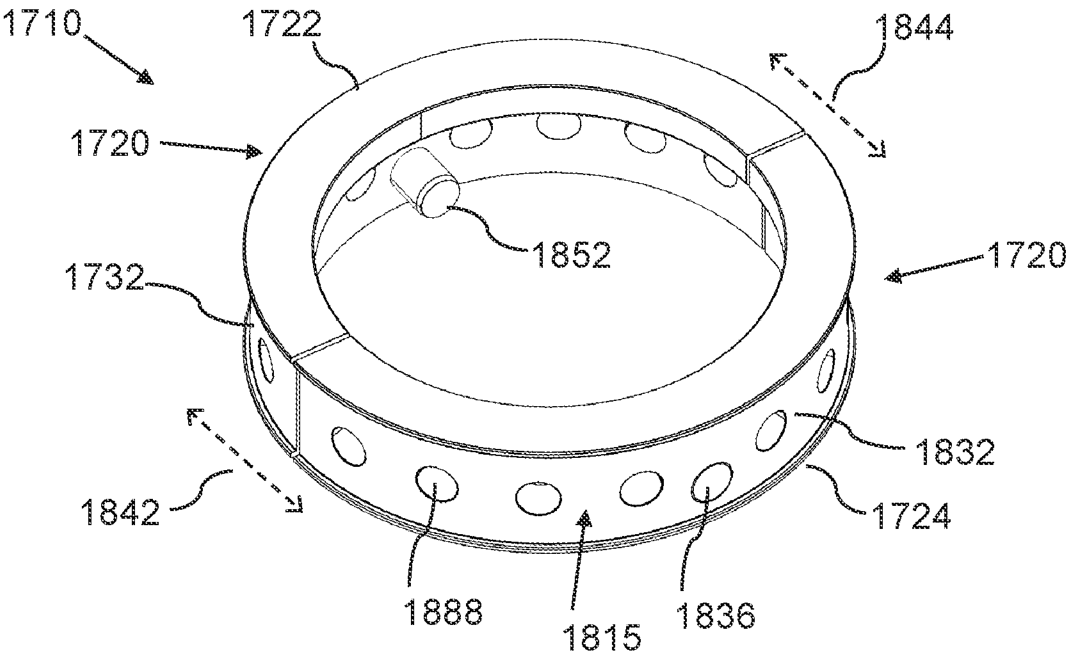
FIG. 18A is a top perspective view of an adjustment ring assembly, according to an embodiment of the invention.
Figure 18B:
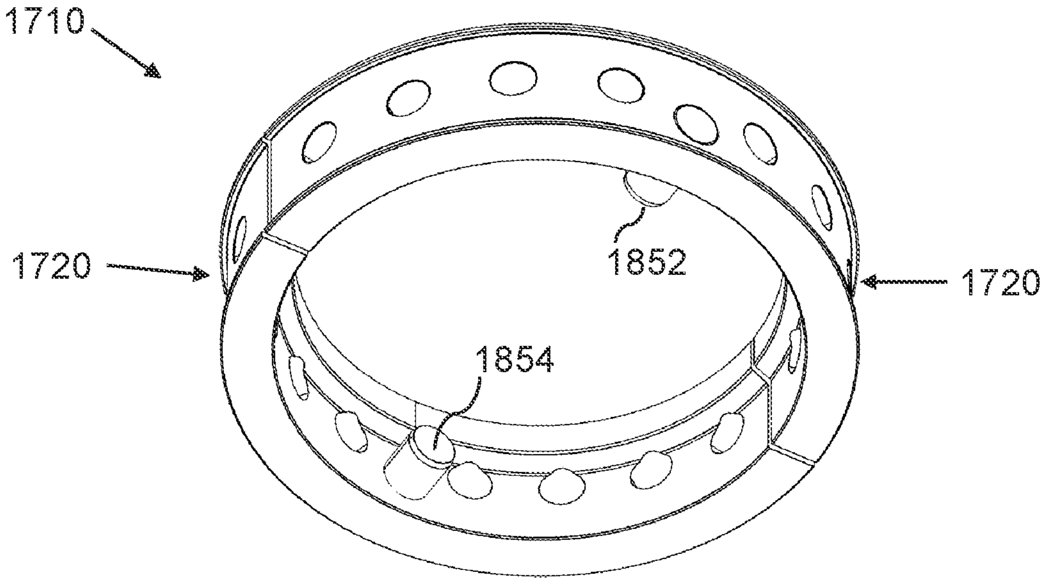
FIG. 18B is a bottom perspective view of an adjustment ring assembly, according to an embodiment of the invention.
Figure 19A:
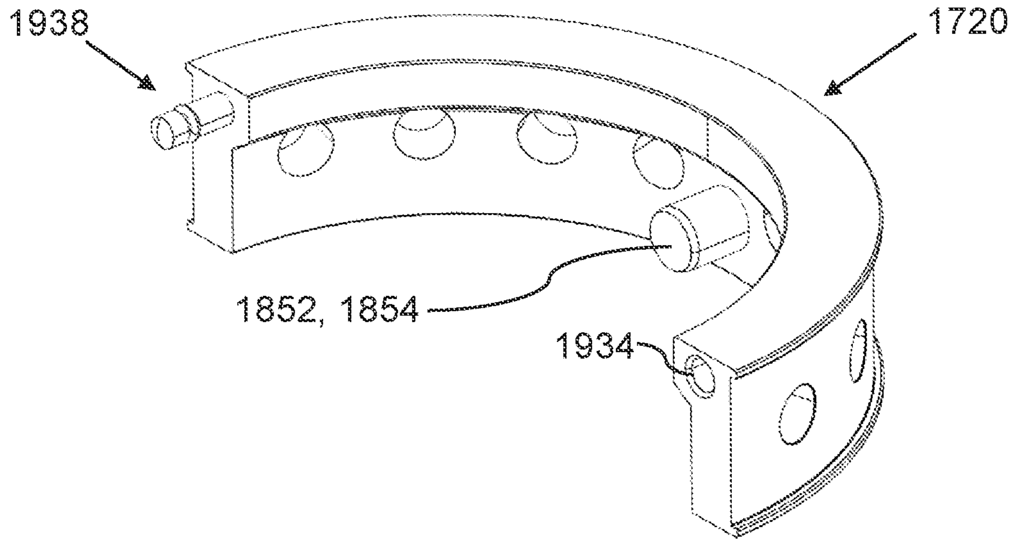
FIG. 19A is a top perspective view of an adjustment ring member, according to an embodiment of the invention.
Figure 19B:
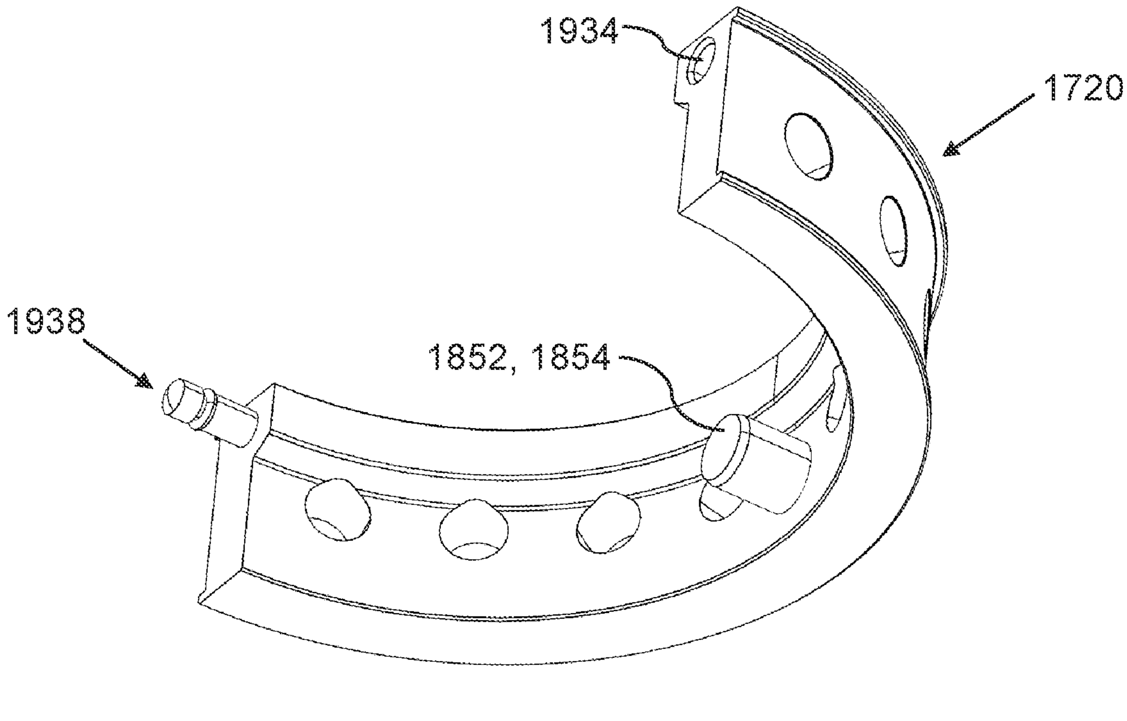
FIG. 19B is a bottom perspective view of an adjustment ring member, according to an embodiment of the invention.
Figure 19C:
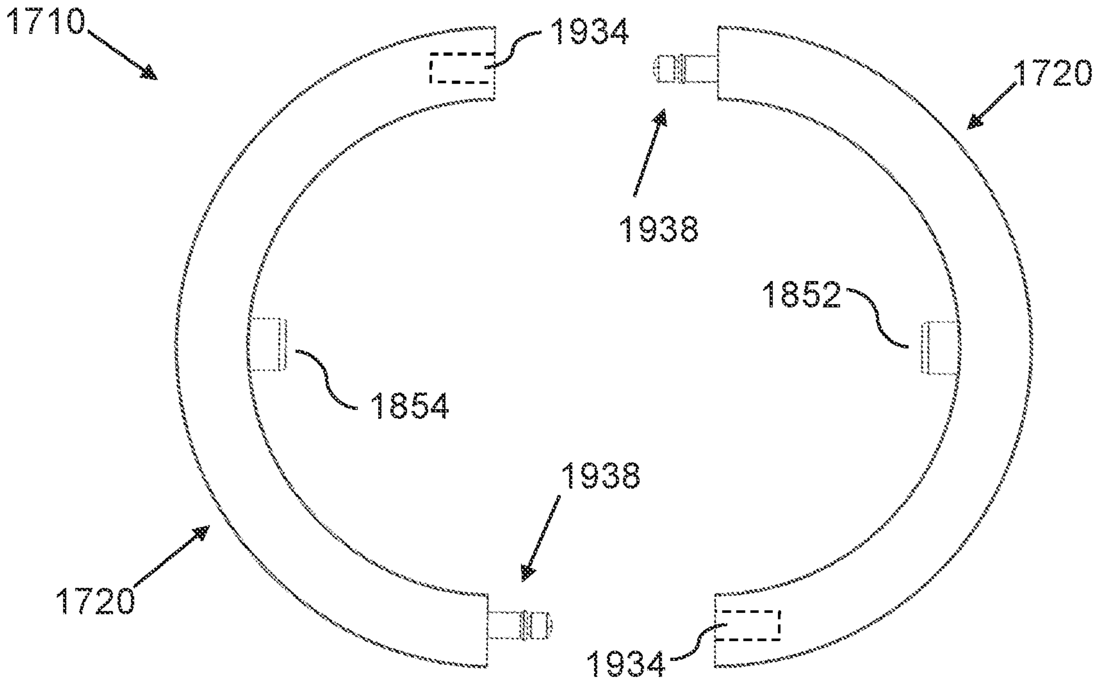
FIG. 19C is a top plan view of a disassembled adjustment ring assembly, according to an embodiment of the invention.
Figure 19D:
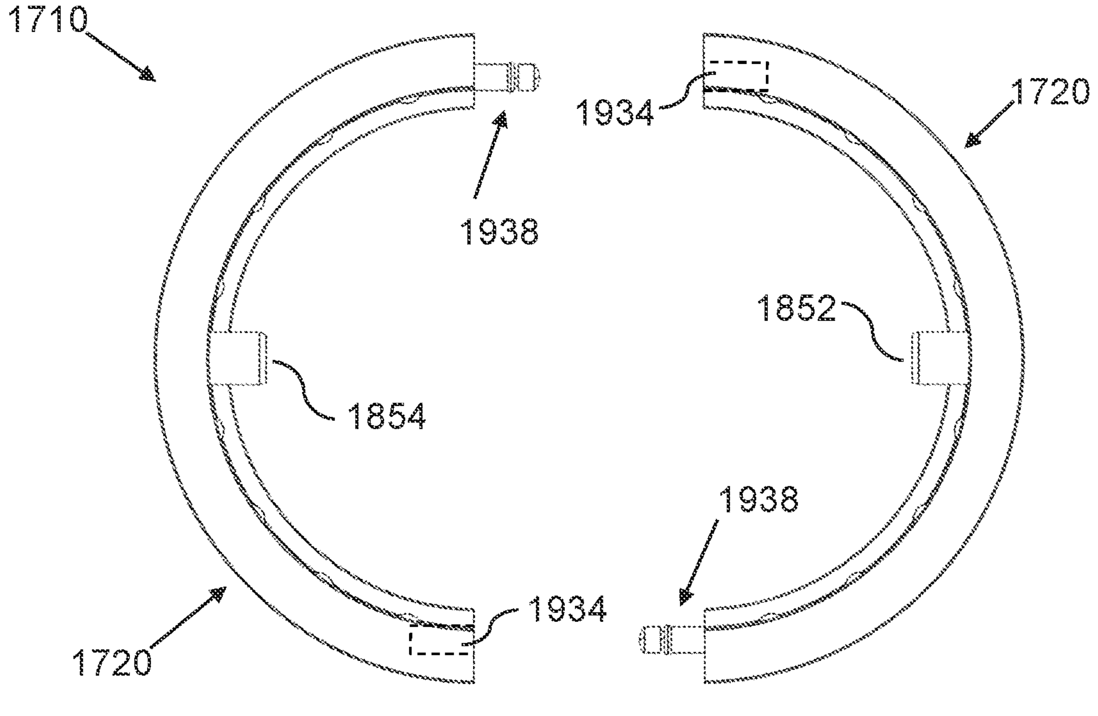
FIG. 19D is a bottom plan view of a disassembled adjustment ring assembly, according to an embodiment of the invention.
Figure 19E:
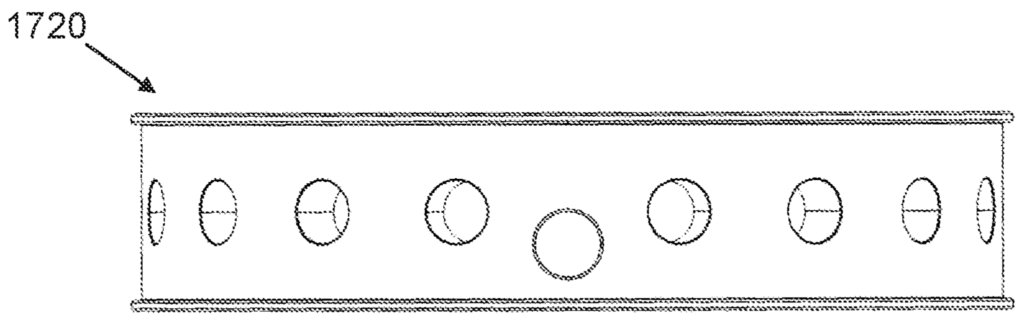
FIG. 19E is an outer side view of an adjustment ring member, according to an embodiment of the invention.
Figure 19F:
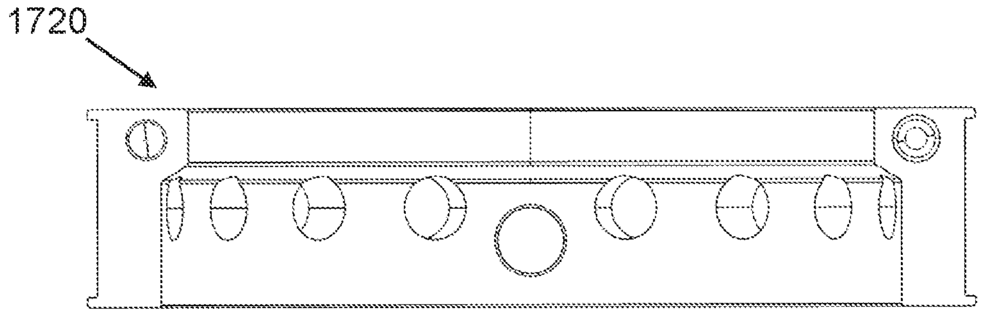
FIG. 19F is an inner side view of an adjustment ring member, according to an embodiment of the invention.
Figure 19G:
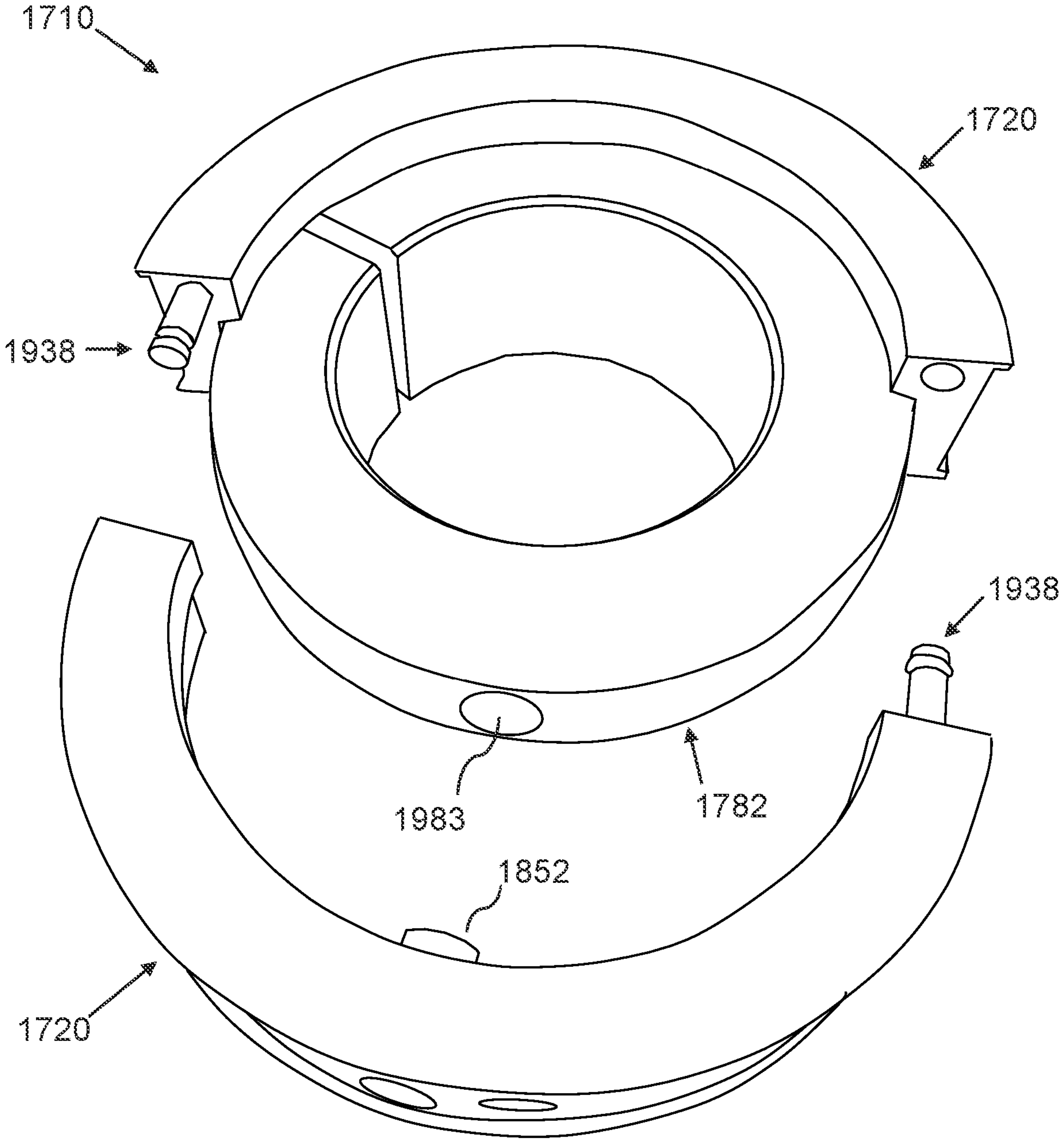
FIG. 19G is a perspective view of a disassembled adjustment ring assembly prior to attachment to an adjustment ring, according to an embodiment of the invention.
Figure 20A:
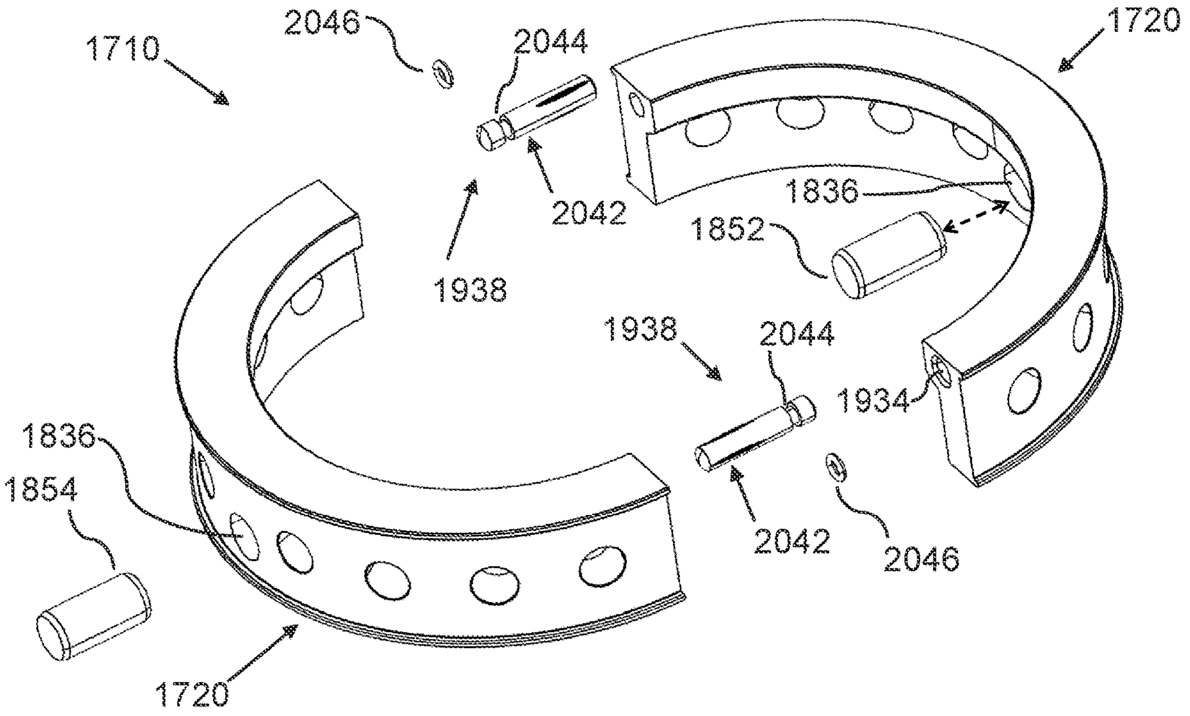
FIG. 20A is a top exploded perspective view of an adjustment ring member, according to an embodiment of the invention.
Figure 20B:
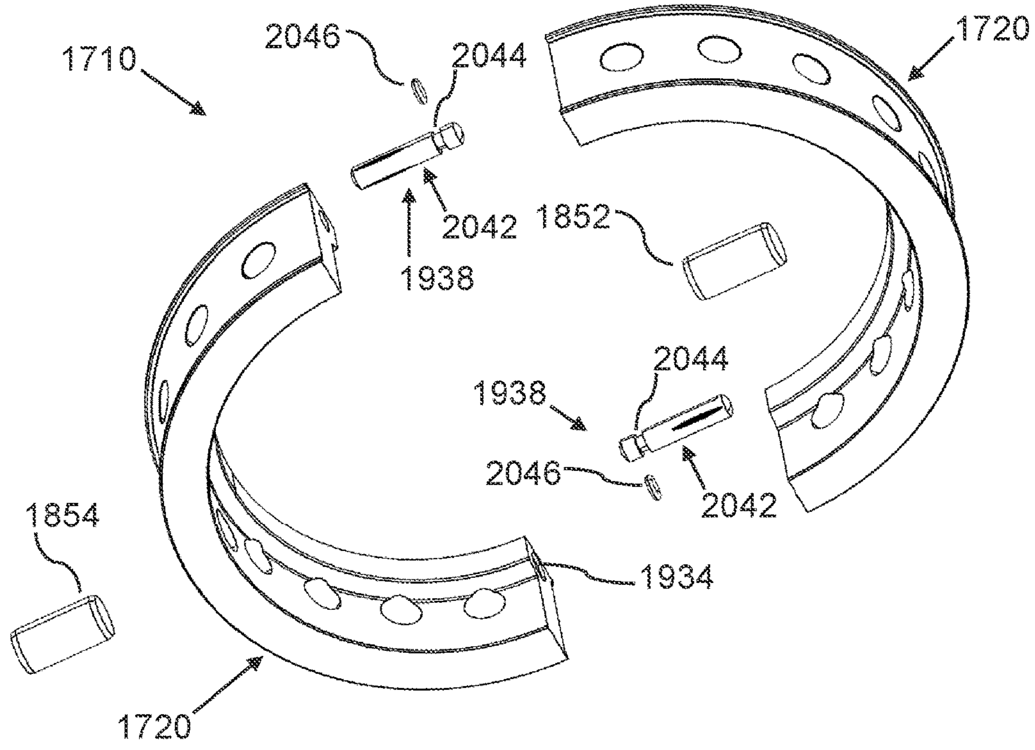
FIG. 20B is a bottom exploded perspective view of an adjustment ring member, according to an embodiment of the invention.

In a Further Related Embodiment, as Shown in FIGS. 18A and 18B:

a) the left adjustment ring member 1720, can further include:
   i. at least one left connecting structure 1854, which can be a protruding connector, including a male connector, such as a connecting pin (which can be referred to as a drive pin), or can be a left connecting structure (including a left interlocking structure), which can for example be configured as teeth, splines, hexagonal shapes, pins, apertures, or other well-known connecting or interlocking structures; and b) the right adjustment ring member 1720, can further include:
   i. at least one right connecting structure 1852, which can be a protruding connector, including a male connector, such as a connecting pin (which can be referred to as a drive pin), or can be a right connecting structure (including a right interlocking structure structure), which can for example be configured as teeth, splines, hexagonal shapes, pins, apertures, or other well-known connecting or interlocking structures;

wherein the left connecting structure 1854 and the right connecting structure 1852 are configured to connect with corresponding adjustment connecting structures 1983 of the adjustment ring 1782, as shown in FIG. 18A-18B, to detachably connect (or detachably interlock) with adjustment interlocking structures 1983 of the adjustment ring 1782, as shown in FIGS. 18A-18B and 19G, which can for example be configured as teeth, splines, hexagonal shapes, pins, apertures, or other well-known connecting or interlocking structures that are common for third party adjustment ring types that use tabs, female apertures, and large hex driving mechanisms, etc.

Figure 16D:
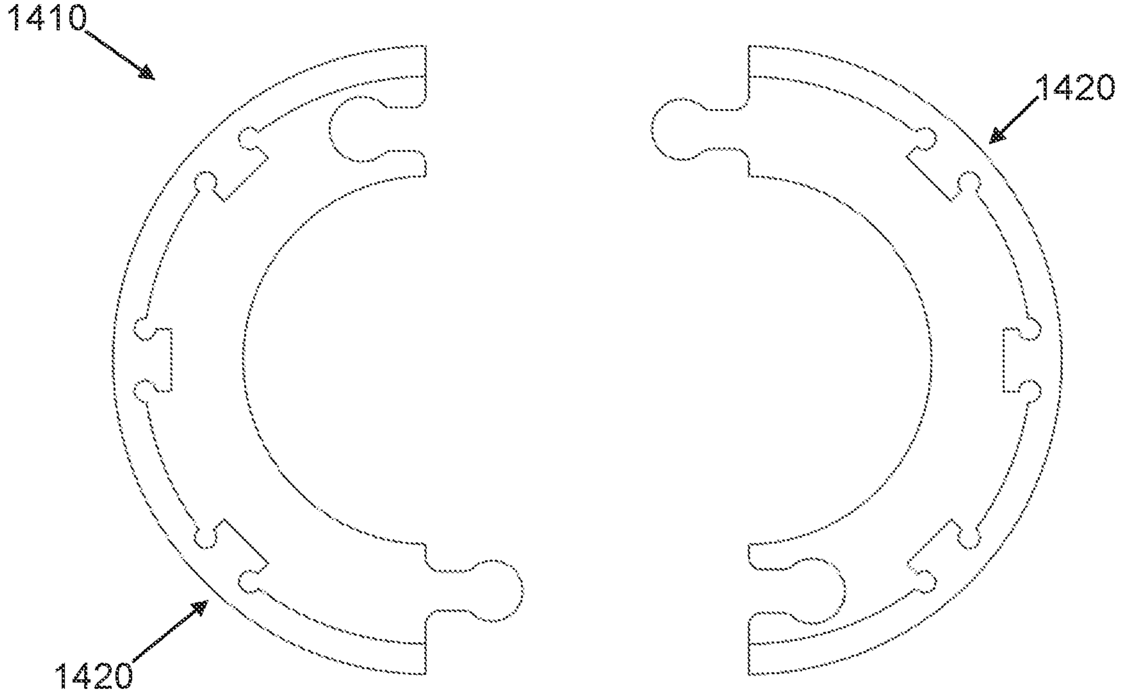
FIG. 16D is a bottom plan view of a disassembled adjustment ring assembly, according to an embodiment of the invention.
Figure 16E:
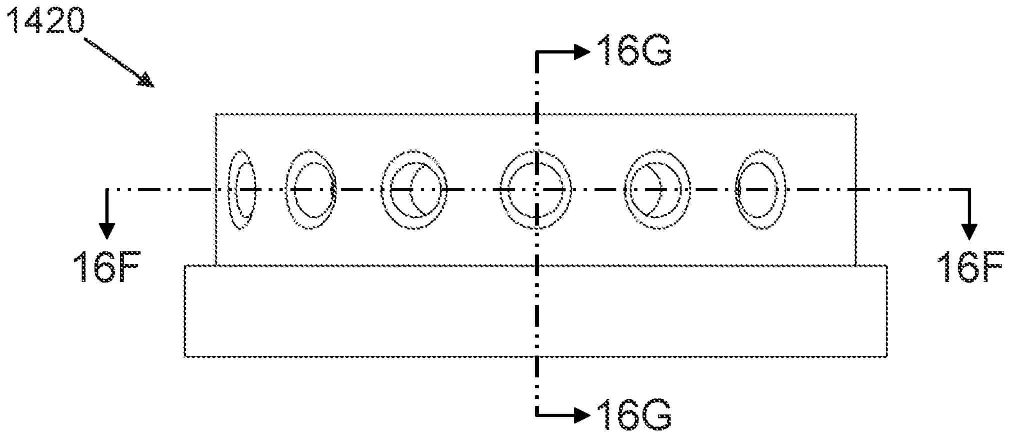
FIG. 16E is a side view of an adjustment ring member, according to an embodiment of the invention.
Figure 16F:
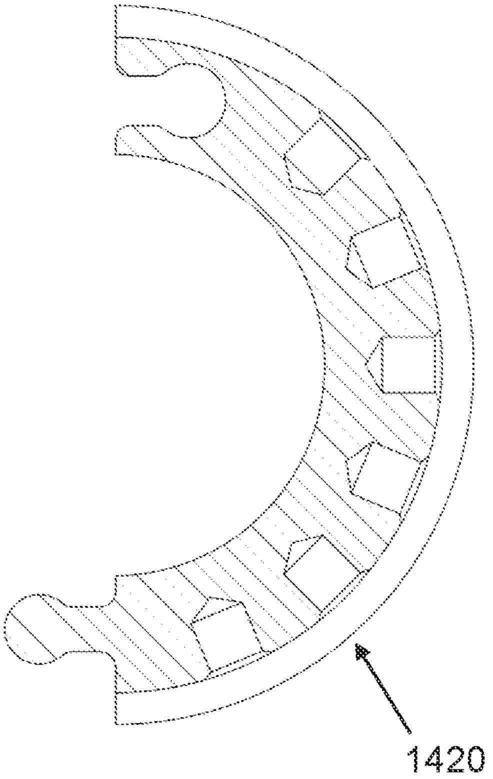
FIG. 16F is a section view of an adjustment ring member taken along section line 16F-16F of FIG. 16E, according to an embodiment of the invention.
Figure 16G:
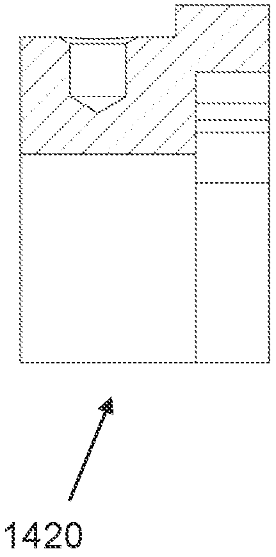
FIG. 16G is a section view of an adjustment ring member taken along section line 16G-16G of FIG. 16E, according to an embodiment of the invention.
Figure 17A:
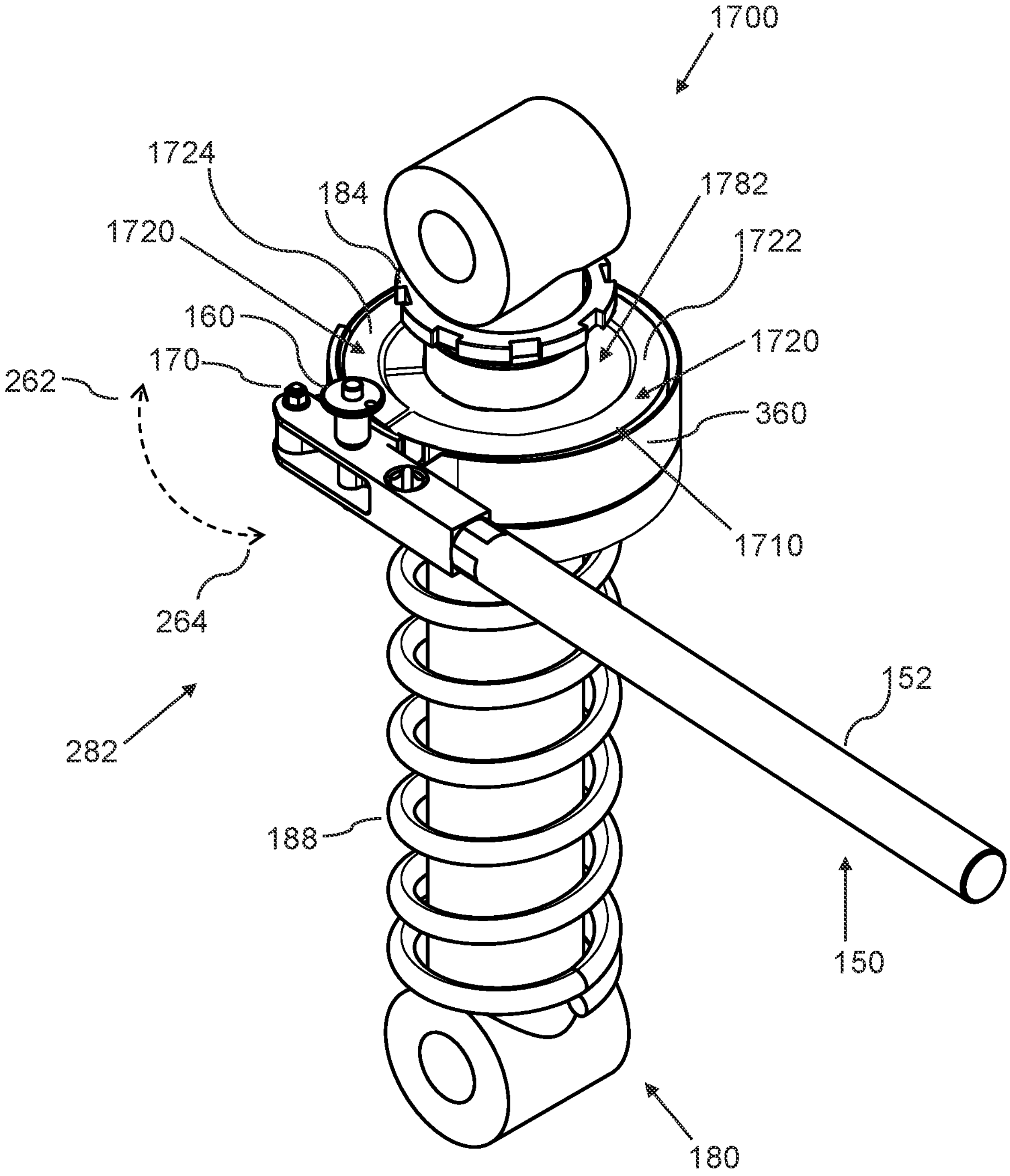
FIG. 17A is a top perspective view of an adjustable shock absorber system, with a dual-part mounting ring attached, and a shock adjuster tool mounted in a first orientation, according to an embodiment of the invention.
Figure 17B:
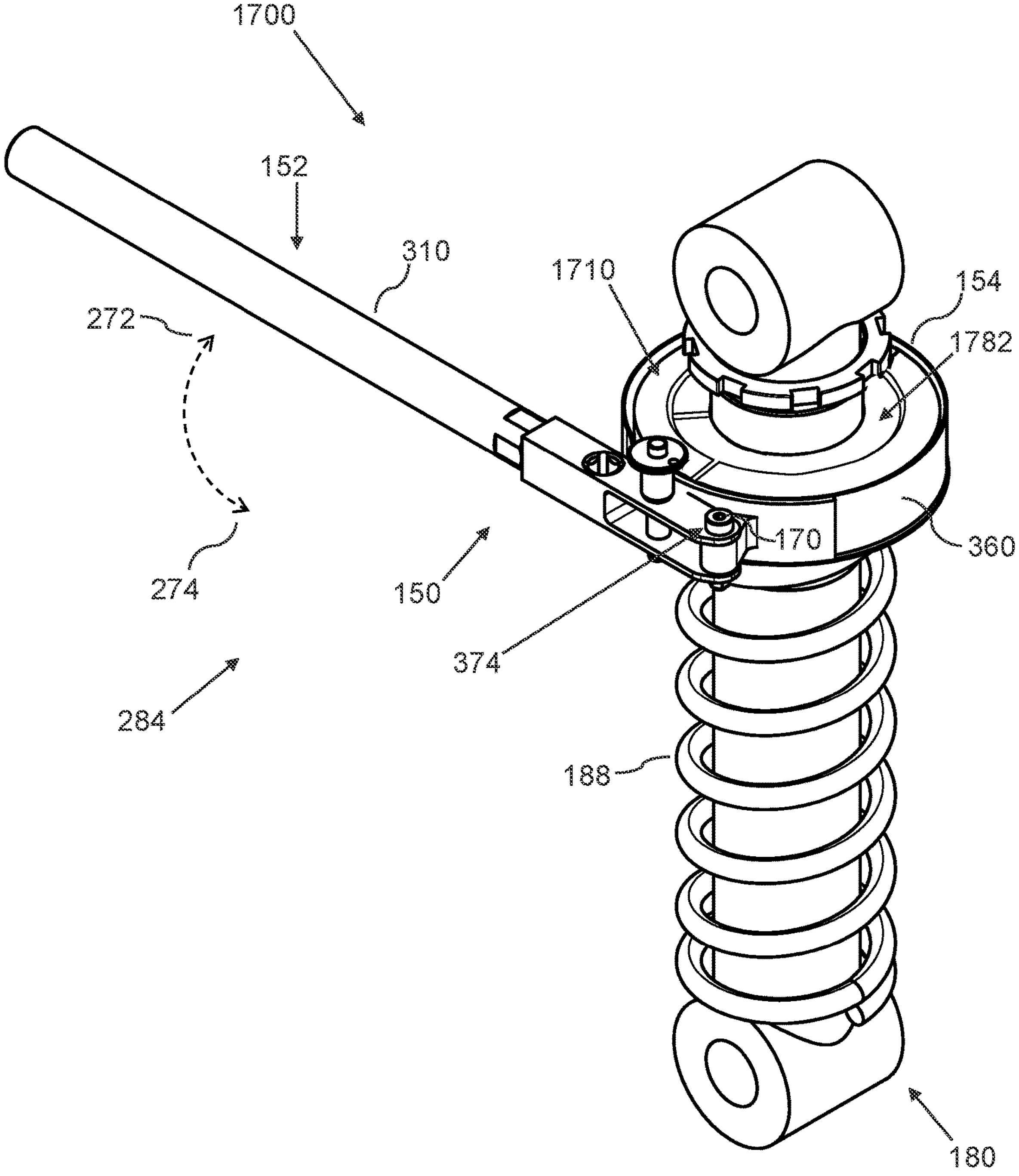
FIG. 17B is a top perspective view of an adjustable shock absorber system, with a dual-part mounting ring attached, and a shock adjuster tool mounted in a second orientation, according to an embodiment of the invention.

In another further related embodiment, as shown in FIGS. 19C-16D, the right and left protruding structures 1938 and the right and left receiving indentations 1934 can be horizontally elongated 1642.

In another further related embodiment, as shown in FIGS. 19A-19D and 20A-20B, the right protruding structure 1938 and the left protruding structure 1938 can each further include:

a) an elongated body 2042, which is configured with a peripheral indentation 2044 in an outer portion of the elongated body 2042; and b) an o-ring 2046, which is positioned in the peripheral indentation 2044 in the outer portion of the elongated body 2042, wherein the o-ring 2046 can be made from a resilient material, such as a natural or synthetic rubber material, include a latex or silicone rubber material;

such that the elongated body 2042 is configured to be slidable into (and out of) a corresponding receiving indentation 1934, such that the o-ring 2046 is configured to provide a friction fit of the outer portion of the elongated body 2042 inside the corresponding receiving indentation 1934.

In another further related embodiment, a peripheral mounting surface 715, 815, 915, 1015 of the adjustment ring body 820, 821, 920, 1020 can be configured with evenly spaced apertures 788, 888, 1088 which enable engagement with a drive pin (such as an outer portion of the band pin 369, as shown in FIGS. 3A and 14), which protrudes from an inner side of the elongated band 360 of the shock adjuster tool 150, such that a connection between the drive pin 369 and a selected aperture 788, 1088, 1888 enable application of increased torque to loosen or tighten the adjustment ring 182.

Similarly, in yet a further related embodiment, peripheral mounting surfaces 115, 1515, 1815 of the right and left adjustment ring members 120, 130, 1420, 1720 can each be configured with evenly spaced apertures 388, 1488, 1888 which enable engagement with a drive pin (such as a protruding portion of the band pin 369, as shown in FIGS. 3A and 14), which protrudes from an inner side of the elongated band 360 of the shock adjuster tool 150, such that a connection between the drive pin 369 and a selected aperture 788, 1088, 1888 enable application of increased torque to loosen or tighten the adjustment ring 182.

Thus, in a related embodiment, the shock adjuster tool 150, 1150 can further include:

a) a protruding pin (such as an inner portion of the band pin 369), which is connected to an inner side of the elongated band 360, such that the protruding pin protrudes from the inner side of the elongated band 360;

wherein the peripheral mounting surface 115, 715, 815, 915, 1015, 1515, 1815 can include at least one aperture 388, 788, 888, 1088, 1488, 1888;

such that the protruding pin is configured to engage with the at least one aperture 388, 788, 888, 1088, 1488, 1888 of the peripheral mounting surface.

In a related embodiment, the left connecting structure and the right connecting structure can be pins, and the adjustment connecting structures can be apertures Thus, in various related embodiments, the adjustable shock absorber system 100 can provide a novel way of wrapping the entire adjustment ring with a secure tool, and using a lever arm to apply torque, resulting in a consistent amount of torque applied in a full range of motion, to achieve a controlled method of raising or lowering the adjustment ring while the ring and spring remain attached on the shock body. Thereby the adjustable shock absorber system 100 can provide for efficient preload adjustment of a coil spring mounted on a coil-over shock absorber while the shock absorbing device remains installed on vehicle or machinery structure.

In related embodiments, the threaded coil spring adjustment ring with torque lock pin and cavity approach can include:

a) a threaded coil spring adjustment ring with multiple cavities positioned around its outside radial surface, with a fixing method to prevent adjustment ring rotation of the adjustment ring to shock body. The outside radial surface accepts an actuating band which when placed over the installed threaded coil spring adjustment ring can be used to rotate the adjustment ring when torque is applied. Note that the threaded coil spring adjustment ring is also a spring perch (a coil over shock has two perches, one for each end of the spring);
b) an actuating band is placed around the outside diameter of the threaded coil spring adjustment ring, then secured to the threaded coil spring adjustment ring using a pin 369; and
c) when the actuating band is leveraged, such that it clasps tightly around the threaded coil spring adjustment ring, the detent pin 369 will self-locate into a cavity 388, 788, 888, 988, 1088 on the adjustment ring. Following an application of torque to a tool handle will cause the complete threaded coil spring adjustment ring to rotate.

In other related embodiments, the coil spring adjustment tool approach can include:

a) a three-part tool comprised of a first ring half, a second ring half, and a band which when placed over the installed first and second ring halves can be used to actuate an adjustment nut;
b) a first ring half with engagement mechanism such that the tool locks in to the adjustment nut which is affixed to the shock absorbing system;
c) a second ring half with engagement mechanisms that a) securely interlock with the first ring half and b) the tool locks into the adjustment nut, which is affixed to the shock absorbing system;
d) an actuating band which is placed around the circular plane formed by the interlocked first ring half and second ring half, then secured using a pin to the actuating mechanism with handle; and
e) an adjustment ring that attaches to the shock absorbing system (for preload adjustment), and to which has a friction surface on its outer dimension on to which the interlocked first ring half and second ring half is installed.

In a related embodiment, a coil over shock utilizes a wire wound coil spring. The coil spring is attached with a spring perch on the lower and upper ends of the coil over shock.

In a further related embodiment, when the coil over shock is mounted on a vehicle, the preload applied by the adjustment ring can change vehicle dynamics such as ride height. Due to coil spring rate, efficiently changing spring preload is a challenge.

In another related embodiment, a coil spring preload adjustment ring, as shown in FIG. 3A, can be installed on a coil over shock. The adjustment ring can have multiple cavities 388, 788, 888, 988, 1088 spaced around the outside edge to allow for a wrench attachment 369 to lock into said cavities 388, 788, 888, 988, 1088 and affect a turning torque to apply or remove preload to the spring.

In another related embodiment, a preload adjustment ring wrench 150, as shown in FIG. 1A, can be utilized to turn the coil spring preload adjustment ring. The wrench has a strap with locating eyelets and removable quick disconnect pins. The strap is attached to the wrench body using quick disconnect pins that utilize spring ball retainers. A thrust pin 369 can be attached to the inside diameter of the strap 360, such that the thrust pin 369 locks into the coil spring preload adjustment ring, such that:

a) the preload adjustment ring wrench is prepared for installation around the outside surface of the coil spring preload adjustment ring by removing the latch pin. The strap portion of the wrench is then fitted around the coil spring preload adjustment ring, with the strap end hole fitted into the wrench body followed by installing the latch pin, with the wrench thrust pin 369 locking in to a cavity 388, 788, 888, 988, 1088 on the coil spring preload adjustment ring;
b) at this point, with the preload adjustment ring wrench installed, the operator can apply force to the wrench handle which applies turning torque to the coil spring adjustment ring. The wrench achieves torque input by the leverage action of the linkage. When the wrench handle is moved away from the shock body, strap linkage takes up slack and tightens its grip on the preload adjustment ring. With further torque application to the handle, the wrench thrust pin engages a cavity in the preload adjustment ring which causes a preload change on the coil spring itself; and
c) removing the preload adjustment ring wrench from the shock absorber, then flipping it over and reinstalling the preload adjustment ring wrench on to the shock absorber, will cause the preload adjustment ring to rotate in the opposite direction. The solution allows for adding preload to or removing preload from the coil spring.

Here has thus been described a multitude of embodiments of the adjustable shock absorber system 100, 700, 900, 1400 and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. An adjustable shock absorber system, comprising:

an adjustment ring assembly, which is configured to detachably connect with an adjustment ring of a coil-over shock absorber, such that a rotation of the adjustment ring assembly causes a rotation of the adjustment ring, such that the rotation of the adjustment ring adjusts a preload of a spring of the coil-over shock absorber, wherein the adjustment ring assembly further comprises:

a right adjustment ring member, which comprises a first peripheral surface; and a left adjustment ring member, which comprises a second peripheral surface;

wherein the left adjustment ring member and the right adjustment ring member are configured to be mounted around the adjustment ring of the coil-over shock absorber, such that the left adjustment ring member and the right adjustment ring member are detachably connected;

such that the first peripheral surface and the second peripheral surface form a peripheral mounting surface, which encircles the adjustment ring assembly, when the left adjustment ring member and the right adjustment ring member are mounted around the adjustment ring;

wherein:

the right adjustment ring member further comprises:

a right ring body;

a right first pin;

a first side lower protruding portion, which protrudes from a lower first side of the right ring body, such that the right first pin protrudes upward from an outer part of the first side lower protruding portion;

a right second pin; and a second side lower protruding portion, which protrudes from a lower second side of the right ring body, such that the right second pin protrudes upward from an outer part of the second side lower protruding portion; and the left adjustment ring member, further comprises:

a left ring body;

a first side upper protruding portion, which protrudes from an upper first side of the left ring body, wherein an outer portion of the first side upper protruding portion comprises a first vertical aperture; and a second side upper protruding portion, which protrudes from an upper second side of the left ring body, wherein an outer portion of the second side upper protruding portion comprises a second vertical aperture;

wherein the right first pin inserts into the first vertical aperture, such that an outer portion of the first side upper protruding portion rests on a top of the first side lower protruding portion;

wherein the right second pin inserts into the second vertical aperture, such that an outer portion of the second side upper protruding portion rests on a top of the second side lower protruding portion; and wherein the adjustment ring assembly is configured to accept a detachable connection of a tool grip portion of a shock adjuster tool, when the adjustment ring assembly is connected with the adjustment ring of the coil-over shock absorber.

2. The adjustable shock absorber system of claim 1, wherein the adjustment ring assembly further comprises a peripheral mounting surface, wherein the tool grip portion further comprises:

a band assembly, which comprises:

an elongated band, which is configured to detachably wrap around the peripheral mounting surface of the adjustment ring assembly.

3. The adjustable shock absorber system of claim 1, wherein:

a) the right adjustment ring member further comprises:

a right ring body;

a right first lock structure, which is positioned in a first end of the right ring body; and a right second lock structure, which is positioned in a second end of the right ring body; and b) the left adjustment ring member, further comprises:

a left ring body;

a left first lock structure, which is positioned in a first end of the left ring body; and a left second lock structure, which is positioned in a second end of the left ring body;

wherein the right first lock structure is configured to detachably connect with the left second lock structure; and wherein the right second lock structure is configured to detachably connect with the left first lock structure.

4. The adjustable shock absorber system of claim 3, wherein the right first lock structure is configured as a right protruding structure and the right second lock structure is configured as a right receiving indentation; and wherein the left first lock structure is configured as a left protruding structure and the left second lock structure is configured as a left receiving indentation;

such that the left protruding structure is configured to be detachably connectable with the right receiving indentation; and such that the right protruding structure is configured to be detachably connectable with the left receiving indentation.

5. The adjustable shock absorber system of claim 4, wherein the right protruding structure and the left protruding structure each further comprise:

an elongated body; and such that the elongated body is configured to be slidable into a corresponding receiving indentation.

6. The adjustable shock absorber system of claim 5, wherein the elongated body is configured with a peripheral indentation in an outer portion of the elongated body, wherein the right protruding structure and the left protruding structure each further comprise:

an o-ring, which is positioned in the peripheral indentation;

such that the o-ring is configured to provide a friction fit of the outer portion of the elongated body inside the corresponding receiving indentation.

7. The adjustable shock absorber system of claim 1, wherein the adjustment ring comprises adjustment connecting structures, and wherein:

a) the left adjustment ring member further comprises:

a left connecting structure; and b) the right adjustment ring member further comprises:

a right connecting structure;

wherein the left connecting structure and the right connecting structure are configured to connect with the adjustment connecting structures of the adjustment ring.

8. The adjustable shock absorber system of claim 7, wherein the left connecting structure and the right connecting structure are pins, and wherein the adjustment connecting structures are apertures.

9. An adjustable shock absorber system, comprising:

a) a shock adjuster tool, which comprises:

a lever arm; and a tool grip portion, which is connected to an inner end of the lever arm;

wherein the tool grip portion is configured to detachably connect to a peripheral mounting surface of an adjustment ring assembly, when the adjustment ring assembly is detachably connected with an adjustment ring of a coil-over shock absorber;

wherein the tool grip portion further comprises:

a band assembly, which comprises:

an elongated band, which is configured to detachably wrap around the peripheral mounting surface of the adjustment ring assembly;

wherein the lever arm further comprises:
a lever shaft; and
a connector member, such that an outer end of the connector member is connected to the lever shaft, and such that an inner end of the connector member is connected to the tool grip portion, wherein the connector member further comprises:
a mounting aperture;
wherein the mounting aperture is configured to allow attachment of a wrench tool with a wrench connector that fits into the mounting aperture, in order to apply a supplemental torque to the lever arm.

10. The adjustable shock absorber system of claim 9, wherein the band assembly further comprises:
a displacement member, which comprises:
a displacement arm; and
a band support, which is connected to an inner end of the displacement arm, such that the band support is curved to match a curvature of a first end of the elongated band, such that an outer surface of the band support is connected to the first end of the elongated band;
wherein an outer end of the connector member is pivotably connected to the outer end of the displacement arm along a connection axis, and a second end of the elongated band is detachably and pivotably connected to an inner end of the connector member;
such that the elongated band is configured to form a curve around a portion of the peripheral mounting surface, such that the first end of the elongated band is adjacent to the peripheral mounting surface, such that the first end of the elongated band follows a curvature of the peripheral mounting surface.

11. The adjustable shock absorber system of claim 10, wherein the displacement arm, further comprises a vertical displacement aperture in an outer end of the displacement arm, and wherein the connector member further comprises:
a) a connector body, such that an outer end of the connector body is connected to the lever shaft;
b) an upper flange, which protrudes from an inner top end of the connector body, wherein the upper flange comprises:
a rear upper flange aperture; and
a front upper flange aperture; and
c) a lower flange, which protrudes from an inner bottom end of the connector body, below the upper flange, wherein the lower flange comprises:
a rear lower flange aperture; and
a front lower flange aperture;
wherein the tool grip portion further comprises a detachable pin;
wherein the band assembly further comprises a connection pin;
wherein the elongated band further comprises a vertical band aperture in an outermost portion of the second end of the elongated band;
such that an inner end of the displacement arm is positioned between the upper flange and the lower flange, such that the front upper flange aperture, the vertical displacement aperture, and the front lower flange aperture are aligned;
such that the connection pin protrudes through the front upper flange aperture, the vertical displacement aperture, and the rear lower flange aperture, to detachably and pivotably connect the displacement member to the connector member;
such that the outermost portion of the second end of the elongated band is positioned between the upper flange and the lower flange, such that the rear upper flange aperture, the vertical band aperture, and the rear lower flange aperture are aligned;
such that the detachable pin protrudes through the rear upper flange aperture, the vertical band aperture, and the rear lower flange aperture, to detachably and pivotably connect the second end of the elongated band to the connector member.

12. The adjustable shock absorber system of claim 9, wherein the shock adjuster tool further comprises:
a protruding pin, which is connected to an inner side of the elongated band, such that the protruding pin protrudes from the inner side of the elongated band;
wherein the peripheral mounting surface comprises at least one aperture;
such that the protruding pin is configured to engage with the at least one aperture of the peripheral mounting surface.

13. The adjustable shock absorber system of claim 9, wherein the lever shaft is pivotably connected to the connector member.

14. An adjustable shock absorber system, comprising:
an adjustment ring assembly, which is configured to detachably connect with an adjustment ring of a coil-over shock absorber, such that a rotation of the adjustment ring assembly causes a rotation of the adjustment ring, such that the rotation of the adjustment ring adjusts a preload of a spring of the coil-over shock absorber, wherein the adjustment ring assembly further comprises:
a right adjustment ring member, which comprises a first peripheral surface; and
a left adjustment ring member, which comprises a second peripheral surface;
wherein the left adjustment ring member and the right adjustment ring member are configured to be mounted around the adjustment ring of the coil-over shock absorber, such that the left adjustment ring member and the right adjustment ring member are detachably connected;
such that the first peripheral surface and the second peripheral surface form a peripheral mounting surface, which encircles the adjustment ring assembly, when the left adjustment ring member and the right adjustment ring member are mounted around the adjustment ring;
wherein:
the right adjustment ring member further comprises:
a right ring body;
a right first lock structure, which is positioned in a first end of the right ring body; and
a right second lock structure, which is positioned in a second end of the right ring body; and
the left adjustment ring member, further comprises:
a left ring body;
a left first lock structure, which is positioned in a first end of the left ring body; and
a left second lock structure, which is positioned in a second end of the left ring body;
wherein the right first lock structure is configured to detachably connect with the left second lock structure; and
wherein the right second lock structure is configured to detachably connect with the left first lock structure;

wherein the right first lock structure is configured as a right protruding structure and the right second lock structure is configured as a right receiving indentation; and wherein the left first lock structure is configured as a left protruding structure and the left second lock structure is configured as a left receiving indentation;

such that the left protruding structure is configured to be detachably connectable with the right receiving indentation; and such that the right protruding structure is configured to be detachably connectable with the left receiving indentation;

wherein the adjustment ring assembly is configured to accept a detachable connection of a tool grip portion of a shock adjuster tool, when the adjustment ring assembly is connected with the adjustment ring of the coil-over shock absorber.

15. An adjustable shock absorber system, comprising:

a shock adjuster tool, which comprises:

a lever arm; and a tool grip portion, which is connected to an inner end of the lever arm;

wherein the tool grip portion is configured to detachably connect to a peripheral mounting surface of an adjustment ring assembly, when the adjustment ring assembly is detachably connected with an adjustment ring of a coil-over shock absorber;

wherein the tool grip portion further comprises:

a band assembly, which comprises:

an elongated band, which is configured to detachably wrap around the peripheral mounting surface of the adjustment ring assembly;

wherein the lever arm further comprises:

a lever shaft; and a connector member, such that an outer end of the connector member is connected to the lever shaft, and such that an inner end of the connector member is connected to the tool grip portion;

wherein the band assembly further comprises:

a displacement member, which comprises:

a displacement arm; and a band support, which is connected to an inner end of the displacement arm, such that the band support is curved to match a curvature of a first end of the elongated band, such that an outer surface of the band support is connected to the first end of the elongated band;

wherein an outer end of the connector member is pivotably connected to the outer end of the displacement arm along a connection axis, and a second end of the elongated band is detachably and pivotably connected to an inner end of the connector member;

such that the elongated band is configured to form a curve around a portion of the peripheral mounting surface, such that the first end of the elongated band is adjacent to the peripheral mounting surface, such that the first end of the elongated band follows a curvature of the peripheral mounting surface.

* * * * *